(12) United States Patent
Sugai et al.

(10) Patent No.: US 11,470,637 B2
(45) Date of Patent: Oct. 11, 2022

(54) COMMUNICATION APPARATUS AND COMMUNICATION METHOD

(71) Applicant: SONY CORPORATION, Tokyo (JP)

(72) Inventors: Ren Sugai, Kanagawa (JP); Yusuke Tanaka, Tokyo (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/474,862

(22) PCT Filed: Nov. 1, 2017

(86) PCT No.: PCT/JP2017/039514
§ 371 (c)(1),
(2) Date: Jun. 28, 2019

(87) PCT Pub. No.: WO2018/128007
PCT Pub. Date: Jul. 12, 2018

(65) Prior Publication Data
US 2019/0327763 A1   Oct. 24, 2019

(30) Foreign Application Priority Data

Jan. 6, 2017  (JP) .............................. JP2017-001255

(51) Int. Cl.
*H04W 74/02*   (2009.01)
*H04L 1/16*     (2006.01)
(Continued)

(52) U.S. Cl.
CPC ........... *H04W 74/02* (2013.01); *H04L 1/1607* (2013.01); *H04L 5/0055* (2013.01); *H04W 16/28* (2013.01); *H04W 74/06* (2013.01)

(58) Field of Classification Search
CPC ......... H04L 1/188; H04L 1/1812; H04L 5/14; H04L 1/1864; H04L 1/1896;
(Continued)

(56) References Cited

U.S. PATENT DOCUMENTS 8,441,975 B2 * 5/2013 Amini .................. H04L 12/413
370/312
9,439,219 B2 9/2016 Amini et al.
(Continued)

FOREIGN PATENT DOCUMENTS

CN   103037450 A   4/2013
CN   103609182 A   2/2014
(Continued)

OTHER PUBLICATIONS

Extended European Search Report of EP Application No. 17890267.2, dated Nov. 18, 2019, 11 pages of EESR.
(Continued)

*Primary Examiner* — Kibrom T Hailu
(74) *Attorney, Agent, or Firm* — Chip Law Group

(57) ABSTRACT

A communication apparatus includes a transition information generation unit that generates a plurality of pieces of different transition information related to transition from a first mode in which centralized communication is performed by an access point to a second mode in which no centralized communication by an access point is performed and a frame generation unit that generates a frame containing the transition information.

10 Claims, 36 Drawing Sheets

(51) Int. Cl.
*H04L 5/00* (2006.01)
*H04W 16/28* (2009.01)
*H04W 74/06* (2009.01)

(58) Field of Classification Search
CPC ... H04L 5/0053; H04L 5/0091; H04L 1/1825; H04L 5/1469; H04L 1/607; H04L 5/0055; H04W 24/02; H04W 24/08; H04W 52/365; H04W 72/042; H04W 24/10; H04W 52/04; H04W 74/02; H04W 16/28; H04W 74/06; H04W 52/02; H04W 28/12
See application file for complete search history.

(56) References Cited

U.S. PATENT DOCUMENTS

| | | | | |
|---|---|---|---|---|
| 2004/0147223 | A1* | 7/2004 | Cho | H04L 12/66 455/41.2 |
| 2005/0002373 | A1* | 1/2005 | Watanabe | H04W 74/02 370/346 |
| 2010/0061334 | A1* | 3/2010 | Gault | H04L 5/0005 370/330 |
| 2011/0268094 | A1 | 11/2011 | Gong et al. | |
| 2012/0314663 | A1 | 12/2012 | Dwivedi et al. | |
| 2014/0213221 | A1 | 7/2014 | Chai et al. | |
| 2014/0226550 | A1* | 8/2014 | He | H04W 52/0232 370/311 |
| 2015/0146654 | A1 | 5/2015 | Chu et al. | |
| 2015/0351032 | A1* | 12/2015 | Homchaudhuri | G06F 1/3206 370/311 |
| 2016/0029429 | A1 | 1/2016 | Peng et al. | |
| 2016/0127997 | A1* | 5/2016 | Ang | H04W 76/28 370/311 |
| 2016/0192422 | A1 | 6/2016 | Liu | |
| 2016/0360443 | A1* | 12/2016 | Hedayat | H04B 7/0404 |
| 2016/0381602 | A1* | 12/2016 | Torab Jahromi | H04W 28/12 370/311 |
| 2017/0086252 | A1 | 3/2017 | Chai et al. | |
| 2017/0105208 | A1* | 4/2017 | Hedayat | H04W 28/18 |
| 2018/0167882 | A1* | 6/2018 | Choi | H04W 72/121 |

FOREIGN PATENT DOCUMENTS

| | | |
|---|---|---|
| CN | 104066126 A | 9/2014 |
| CN | 104427489 A | 3/2015 |
| CN | 106604336 A | 4/2017 |
| EP | 2719238 A1 | 4/2014 |
| EP | 2763495 A1 | 8/2014 |
| EP | 2978259 A1 | 1/2016 |
| EP | 3041286 A1 | 7/2016 |
| JP | 5437307 B2 | 3/2014 |
| JP | 5735177 B2 | 6/2015 |
| JP | 5804585 B2 | 11/2015 |
| JP | 2016-540439 A | 12/2016 |
| JP | 2019-527514 A | 9/2019 |
| KR | 20140019029 A | 2/2014 |
| WO | 2012/170350 A1 | 12/2012 |
| WO | 2013/044864 A1 | 4/2013 |
| WO | 2014/146556 A1 | 9/2014 |
| WO | 2015/027927 A1 | 3/2015 |
| WO | 2015/081179 A1 | 6/2015 |

OTHER PUBLICATIONS

International Search Report and Written Opinion of PCT Application No. PCT/JP2017/039514, dated Jan. 23, 2018, 07 pages of ISRWO.

Office Action for AU Patent Application No. 2017390890, dated Nov. 16, 2020, 05 pages.

Office Action for AU Patent Application No. 2017390890, dated Feb. 26, 2021, 5 pages of Office Action.

Office Action for ID Patent Application No. PID201905621, dated Dec. 6, 2021, 05 pages of Office Action.

Office Action for JP Patent Application No. 2018-560324, dated May 10, 2022, 02 pages of English Translation and 02 pages of Office Action.

* cited by examiner

FIG. 11

| Length | Cascade Indicaton | CS Required | HE-SIG-A Info | CP and LTF Type | Trigger Type | Trigger-dependent Common info | TRANSITION INFORMATION |

FIG. 17

| BA Ack Policy | Multi-TID | Compressed Bitmap | GCR | Reserved | TID_INFO | TRANSITION INFORMATION |

*FIG. 24*

| User Indentifier | RU Allocation | Coding Type | MCS | DCM | SS Allocation | Trigger dependent per User Info | TRANSITION INFORMATION PER STA |

COMMUNICATION APPARATUS AND COMMUNICATION METHOD

CROSS REFERENCE TO RELATED APPLICATIONS

This application is a U.S. National Phase of International Patent Application No. PCT/JP2017/039514 filed on Nov. 1, 2017, which claims priority benefit of Japanese Patent Application No. JP 2017-001255 filed in the Japan Patent Office on Jan. 6, 2017. Each of the above-referenced applications is hereby incorporated herein by reference in its entirety.

TECHNICAL FIELD

The present disclosure relates to a communication apparatus and a communication method.

BACKGROUND ART

In recent years, a wireless local area network (LAN) represented by Institute of Electrical and Electronics Engineers (IEEE) 802.11 has been widely used. In the wireless LAN, autonomous decentralized communication control such as carrier sense multiple access with collision avoidance (CSMA/CA) is performed.

Meanwhile, as an example of a technique for enhancing communication efficiency, there is a proposed communication using multi-user multiple-input multiple-output (multiuser MIMO or MU-MIMO) in which communication is centralized by an access point, such as a technique disclosed in Patent Document 1.

CITATION LIST

Patent Document

Patent Document 1: Japanese Patent No. 5437307

SUMMARY OF THE INVENTION

Problems to be Solved by the Invention

The multi-user MIMO communication system disclosed in Patent Document 1 implements communication centralized by an access point together with the autonomous decentralized communication mode. Furthermore, in the communication mode in which communication is centralized by the access point, a duration of the centralized communication mode is preliminarily set as TXOP or NAV.

In the wireless communication system disclosed in Patent Document 1, the length of the duration of the centralized communication mode is predetermined by the TXOP or NAV to a predetermined length. Therefore, a communication terminal under an access point has had difficulty in flexibly transitioning to another mode in which autonomous decentralized communication control is performed. In view of the above, the present disclosure proposes a communication apparatus and a communication method capable of generating a plurality of different types of information regarding the transition from the centralized communication mode to another mode and thereby enabling flexible transition from a centralized communication mode to another mode.

Solutions to Problems

According to the present disclosure, there is provided a communication apparatus including: a transition information generation unit that generates a plurality of pieces of different transition information related to transition from a first mode in which centralized communication is performed by an access point to a second mode in which no centralized communication by an access point is performed; and a frame generation unit that generates a frame containing the transition information.

Furthermore, according to the present disclosure, there is provided a communication method including causing a processor to: generate a plurality of pieces of different transition information related to transition from a first mode in which centralized communication is performed by an access point to a second mode in which no centralized communication by an access point is performed; and generate a frame containing the transition information.

Furthermore, according to the present disclosure, there is provided a communication apparatus including: a reception unit that receives, from an access point, a plurality of pieces of different transition information related to transition from a first mode in which centralized communication is performed by the access point to a second mode in which no centralized communication by the access point is performed; and a mode determination unit that determines transition from the first mode to the second mode on the basis of the received transition information.

Furthermore, according to the present disclosure, there is provided a communication method including: receiving, from an access point, a plurality of pieces of different transition information related to transition from a first mode in which centralized communication is performed by the access point to a second mode in which no centralized communication by the access point is performed; and causing a processor to determine transition from the first mode to the second mode on the basis of the received transition information.

Effects of the Invention

As described above, according to the present disclosure, it is possible to flexibly allow a communication terminal to transition from a centralized communication mode to another mode.

Note that the above-described effect is not necessarily limited, and it is also possible to use any one of the effects illustrated in this specification together with the above-described effect or in place of the above-described effect, or other effects that can be assumed from this specification.

BRIEF DESCRIPTION OF DRAWINGS

FIG. 11 is a diagram illustrating an example of a format of a trigger frame in an embodiment of the present disclosure.

FIG. 17 is a diagram illustrating an example of a format of an M-BA frame in an embodiment of the present disclosure.

FIG. 24 is a diagram illustrating an example of a format of a trigger frame in an embodiment of the present disclosure.

MODE FOR CARRYING OUT THE INVENTION

Figure 1:
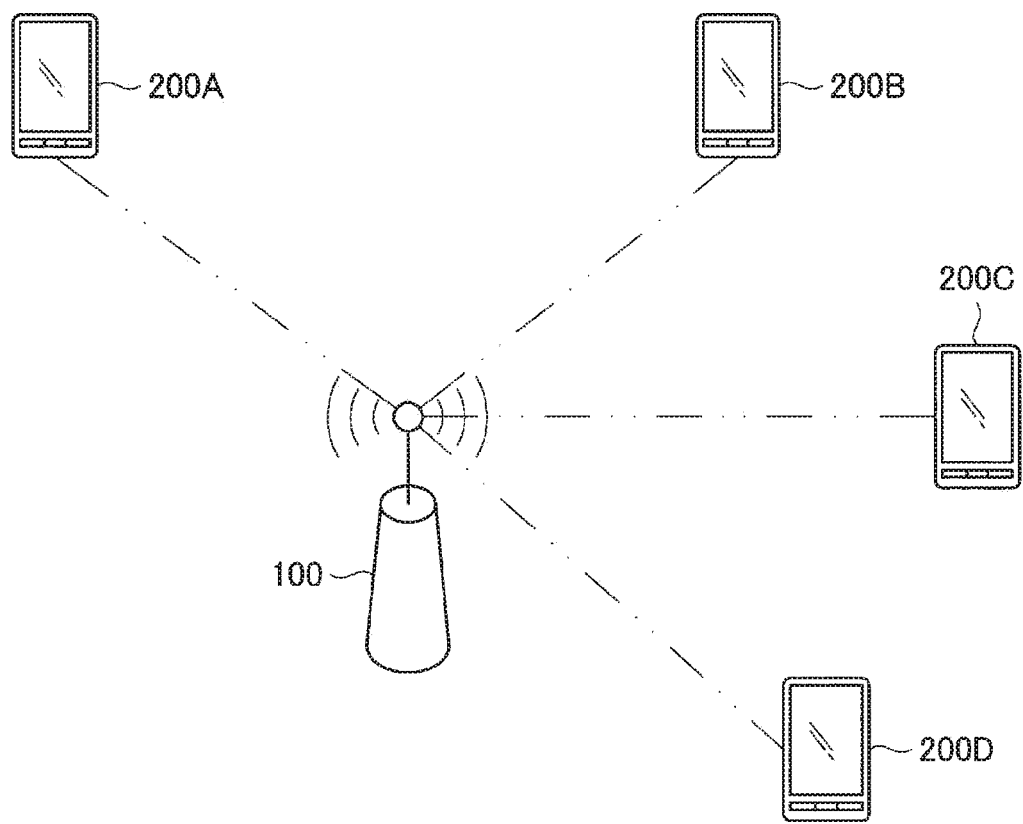
FIG. 1 is a diagram schematically illustrating a wireless system according to an embodiment of the present disclosure.

Preferred embodiments of the present disclosure will be described in detail below with reference to the accompanying drawings. Note that same reference numerals are given to constituent elements having substantially a same functional configuration, and redundant description is omitted in the present specification and the drawings.

Furthermore, in this specification and the drawings, a plurality of elements having substantially the same function may be distinguished by giving the same reference numerals followed by different numbers in some cases. For example, a plurality of elements having substantially the same function is distinguished as necessary, such as a STA 200A and a STA 200B. However, a same reference numeral is given in a case where there is no need to distinguish elements having substantially the same function. For example, in a case where it is unnecessary to distinguish between the STA 200A and the STA 200B, it is simply referred to as the STA 200.

Note that description will be presented in the following order.

1. Outline of wireless LAN system
2. Configuration of communication apparatus
3. First Embodiment
4. Modification of first embodiment
5. Second Embodiment
6. Modification of second embodiment
7. Third Embodiment
8. Application example
9. Supplementary matter
10. Conclusion

1. Outline of Wireless LAN System

One embodiment of the present disclosure relates to a wireless LAN system. First, an outline of a wireless LAN system according to an embodiment of the present disclosure will be described.

(1-1. Configuration of Wireless LAN System)

FIG. 1 is a diagram illustrating a configuration of a wireless LAN system according to an embodiment of the present disclosure. As illustrated in FIG. 1, a wireless LAN system according to an embodiment of the present disclosure includes: an access point (hereinafter referred to as "AP (abbreviation for access point)" for convenience) 100 and stations (hereinafter referred to as "STAs (abbreviation for station)") 200A to 200D. Note that the number of STAs 200 illustrated in FIG. 1 is an example, and the number of STAs 200 is not limited to four.

Note that the AP 100 according to the present embodiment may be a communication apparatus that communicates with the STA 200, and the STA 200 may be any communication apparatus. For example, the STA 200 may be a display having a display function, a memory having a storage function, a keyboard and a mouse having an input function, a speaker having a sound output function, and a smartphone having a function of executing advanced calculation processing.

Furthermore, the wireless LAN system according to one embodiment of the present disclosure can be installed at any location. For example, the wireless LAN system according to the present embodiment may be installed in an office building, a house, a commercial facility, a public facility, or the like. Furthermore, in the wireless LAN system according to the present embodiment, the AP 100 and the STA 200 may be mobile bodies.

The AP 100 can communicate with each of the STAs 200A to 200D. Furthermore, the AP 100 individually transmits unicast frames to each of the STA 200A to 200D, or transmits a multicast frame addressed to a multicast group to which the STAs 200A to 200D belong.

Furthermore, the wireless LAN system performs autonomous decentralized access control such as CSMA/CA. The CDMA/CA performs carrier sensing of sensing transmission from another communication apparatus before the AP 100 or STAs 200A to 200D start transmitting frames. In addition, in a case where transmission of a frame by another communication apparatus is sensed, the AP 100 or STA 200A to 200D would not transmit frames.

Meanwhile, there has been proposed a centralized communication mode by the AP 100 different from the autonomous decentralized access control described above. The AP 100 serves as a control station. The AP 100 controls other terminals (for example, STAs 200A to 200D) to enable wireless terminals to communicate with each other without causing data collision even in an environment where a plurality of terminals exists. The centralized communication mode by the AP 100 is used to implement multi-user communication using MU-MIMO or orthogonal frequency division multiple access (OFDMA), for example. Furthermore, as described above, the AP 100 that performs communication in the centralized communication mode and the other controlled terminals (for example, the STA 200A to 200D) may perform autonomous decentralized communication during communicating in the centralized communication mode. Note that centralized communication is performed preferentially over autonomous decentralized communication in the centralized communication mode.

At this time, the STAs 200A to 200D communicating in the centralized communication mode by the AP 100 may report buffer states of the STAs 200A to 200D to the AP 100 in order to request resource allocation or the like by the AP 100. Next, the AP 100 allocates resources to the STAs 200A to 200D in accordance with the received buffer states, and then, the STAs 200A to 200D transmit data using the allocated resources.

(1-2. Background of Present Disclosure)

In a case where communication is performed in the centralized communication mode in the wireless LAN system configured as described above, the AP 100 sets a duration of the centralized communication mode, for the STA 200. The STA 200 cannot transition to another mode in which autonomous decentralized communication control is performed in the duration of the set centralized communication mode. Accordingly, the STA 200 has difficulty in obtaining an opportunity to communicate by autonomous decentralized communication. Furthermore, the duration in which the centralized communication mode set by the AP 100 continues is a predetermined duration. This has made it difficult to perform flexible communication control. Hereinafter, communication control as a background of the present disclosure will be described with reference to FIG. 2.

Figure 2:
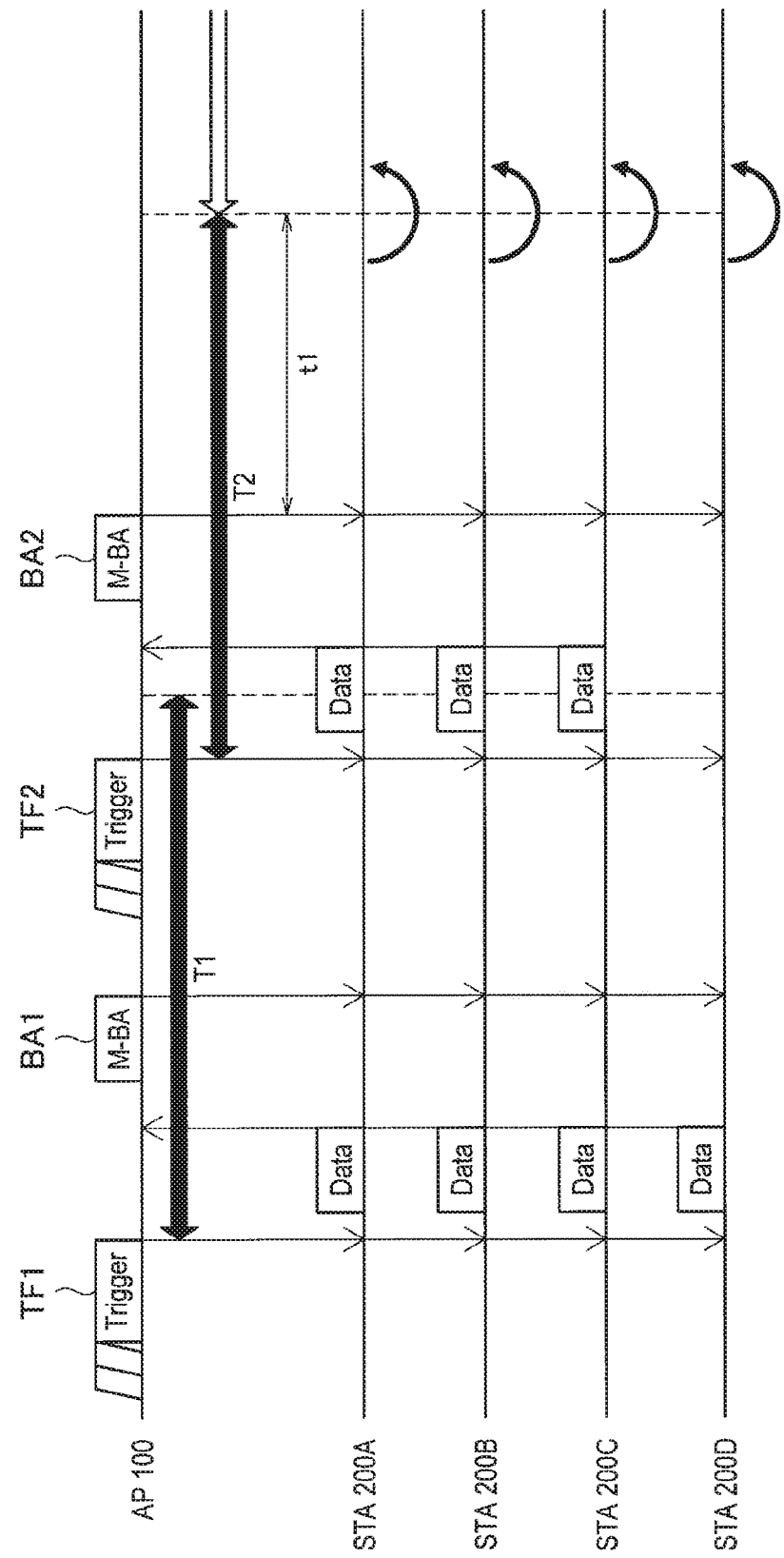
FIG. 2 is a diagram illustrating an example of communication performed by a centralized communication mode in a wireless system according to an embodiment of the present disclosure.

FIG. 2 is a diagram illustrating communication in the above-described centralized communication mode. FIG. 2 illustrates communication in the centralized communication mode that performs multi-user communication in an uplink. Note that each of rectangles indicates a frame, and the parallelogram indicates a back-off period in the following figures. Furthermore, the arrow in the vertical direction indicates the direction of transmission. Specifically, upward arrows indicate uplinks (transmission from the STA 200 to the AP 100), while downward arrows indicate downlinks (transmission from the AP 100 to the STA 200). Furthermore, a duration illustrated by the black double arrow indicates a duration of the centralized communication mode, while a duration illustrated in the open arrow indicates a duration of another mode different from the centralized communication mode. In addition, the semicircular arrows indicate switching of modes of the STA 200. In addition, in the diagrams illustrated in FIGS. 2, 4, 6, 8, 12, 14, 18, and 19, information applied to all of the STAs 200A to 200D is added to the frame. Therefore, in FIGS. 2, 4, 6, 8, 12, 14, 18, and 19, the duration illustrated the black double arrow (duration of the centralized communication mode) and the duration illustrated in the open double arrow (duration of another mode) are applied to all of the STAs 200A to 200D.

In the centralized communication mode, the AP 100 transmits a trigger frame instructing the STAs 200A to 200D to communicate with the AP 100 that communication is to be performed in a centralized communication mode. The trigger frame contains information regarding duration of the centralized communication mode, information regarding permission to transmit data for each of STA 200A to 200D, traffic for permission of transmission, resources used for data transmission by the STAs 200A to 200D (frequency resources or spatial resources, for example), the transmission power used at the time of transmission, the modulation coding scheme, and the like. Note that the trigger frame contains a region that can be referred to by all of the STAs 200 under the control of the AP 100 and a region that can individually be referred to by each of the STAs 200, as described later. Additionally, the information regarding the duration of the centralized communication mode may be arranged in the region that can be referred to by all of the STAs 200, for example. Furthermore, the information regarding resources used for data transmission by the STAs 200A to 200D may be arranged in the region that can be individually referred to by the STAs 200.

After receiving a trigger frame (TF1), the STAs 200A to 200D enters the centralized communication mode triggered by reception of the trigger frame (TF1). Here, the STAs 200A to 200D refer to the information regarding the duration included in the trigger frame (TF1), and continue the centralized communication mode in accordance with the information. In FIG. 2, since the duration is set to the length of T1 in the trigger frame (TF1), the STAs 200A to 200D continue the centralized communication mode in the duration (T1). Note that each of the STAs 200A to 200D may hold a timer indicating the remaining period of the duration of the centralized communication mode.

Next, the STAs 200A to 200D transmit data using the resources set by the trigger frame (TF1). Furthermore, the AP 100 transmits, to the STAs 200A to 200D, a Multi-STA Block Ack (M-BA) frame (BA1) being a frame indicating acknowledgment of reception of data from the STAs 200A to 200D.

Thereafter, the AP 100 transmits a next trigger frame (TF2) to the STAs 200A to 200D in the duration (T1) set by the trigger frame (TF1). Next, after receiving a trigger frame (TF2), the STAs 200A to 200D update of the duration of the centralized communication mode to a duration (T2) set by the trigger frame (TF2). Here, the duration (T1) set by the trigger frame (TF1) and the duration (T2) set by the trigger frame (TF2) have a same length. This length of duration is predetermined.

Next, the STAs 200A to 200C transmit data using the resources set by the trigger frame (TF2), and the AP 100 transmits a M-BA frame (BA2) to the STAs 200A to 200D. Here, the reason why the STA 200D is not transmitting data is that the STA 200D is not permitted to transmit data in the duration (T2) by the trigger frame (TF2). Furthermore, the M-BA frame (BA2) need not be transmitted to the STA 200D at this time.

Thereafter, the STAs 200A to 200D continue the centralized communication mode until the duration (T2) set by the trigger frame (TF2) has elapsed. At the end of the duration (T2), the STAs 200A to 200D terminate the centralized communication mode and switches to another mode.

Here, other modes different from the centralized communication mode include a communication mode of performing the autonomous decentralized access control, a power saving mode for saving battery consumption of the STA 200, a mode of scanning radio waves from another access point to connect to the access point, and the like.

As described above, the duration of the centralized communication mode is set toward the STA 200 by the trigger frame in the centralized communication mode. The duration to be set is a predetermined fixed period as described above. In addition, the STA 200 cannot transition to another mode in the set duration. Therefore, even in a case where the STA 200 wishes to make a transition to another mode different from the centralized communication mode in a period indicated by "t1" in FIG. 2, the STA 200 needs to wait for completion of the duration of the centralized communication mode. In the period indicated by "t1", for example, since communication parameters are set to allow the multi-user communication to be preferentially performed in the centralized communication mode. Therefore, when the STA 200 is going to perform communication in a scheme other than the multi-user communication, there has been a possibility that it would be difficult to obtain communication opportunities. To overcome this, the present embodiment includes a proposal of a communication system enabling the above-described STA 200 to reduce the period of waiting for the end of the duration of the centralized communication mode.

2. Configuration of Communication Apparatus

Figure 3:
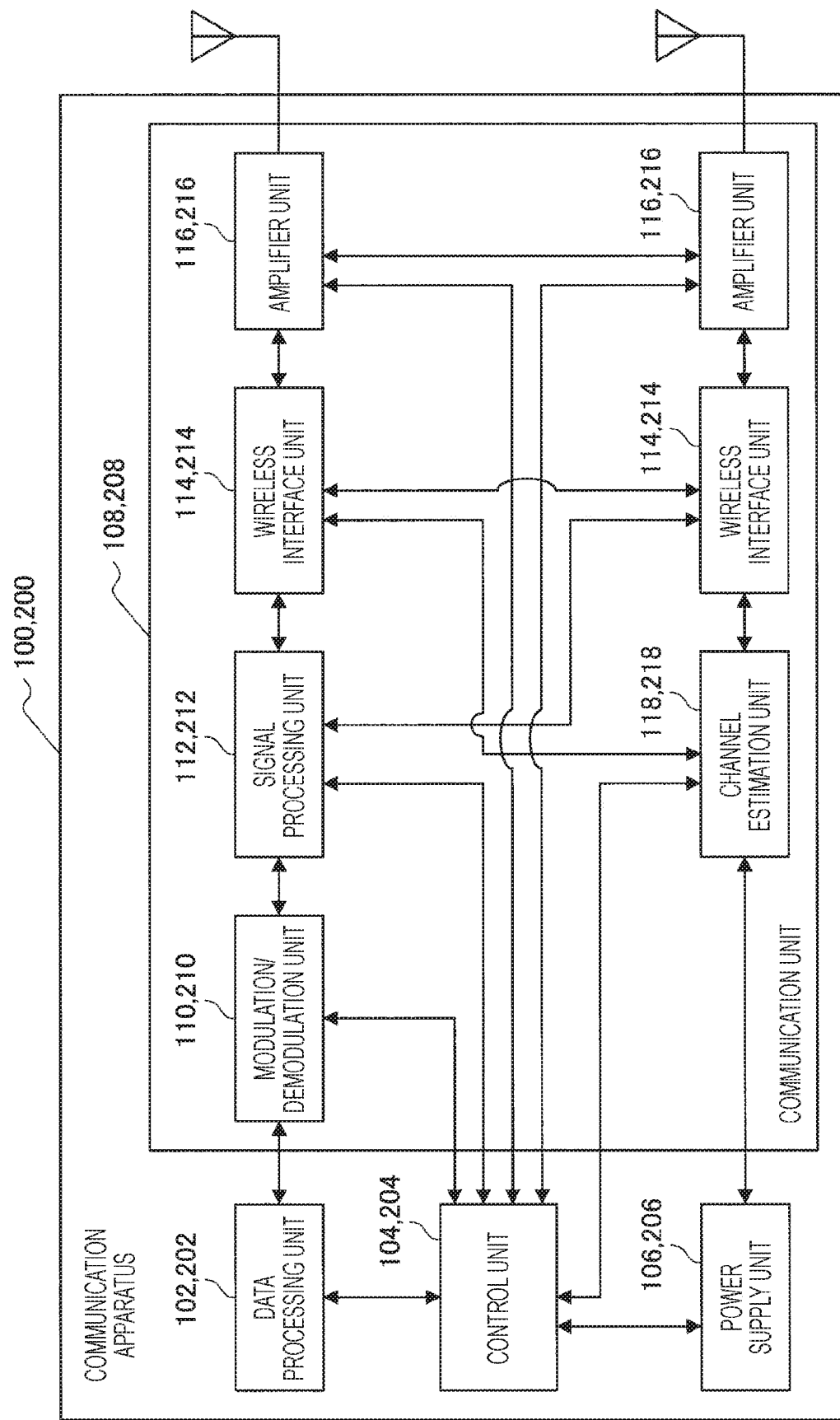
FIG. 3 is a diagram illustrating an example of a configuration of an access point and a station according to an embodiment of the present disclosure.

FIG. 3 is a block diagram illustrating a configuration of a communication apparatus such as the access point (AP) 100 and the station (STA) 200 in the present embodiment. In the present embodiment, the AP 100 and the STA 200 basically have a similar configuration. Note that configurations denoted by reference numerals 102 to 118 in FIG. 3 are the configurations of the access point 100. In addition, the configurations indicated by reference numerals 202 to 218 are the configurations of the station 200.

The communication apparatus (that is, access point 100 and station 200) respectively include data processing units 102 and 202, control units 104 and 204, power supply units 106 and 206, and communication units 108 and 208. Furthermore, the communication units 108 and 208 further include modulation/demodulation units 110 and 210, signal processing units 112 and 212, wireless interface units 114 and 214, amplifier units 116 and 216, and channel estimation units 118 and 218, respectively. The wireless interface units 114 and 214 and the amplifier units 116 and 216 may be a single set of constituents, or one or more sets may be set as constituents. Furthermore, the functions of the amplifier units 116 and 216 may be included in the wireless interface units 114 and 214, respectively.

At the time of transmission in which data is input from an upper layer, the data processing units 102 and 202 generate packets (frames) for wireless transmission, from the data. Furthermore, the data processing units 102 and 202 perform processing such as addition of a header for media access control (MAC) and addition of an error detection code, and then, supply processed data to the modulation/demodulation unit 110 and 210, respectively. Accordingly, the data processing units 102 and 202 are an example of a frame generation unit that generates a frame.

Furthermore, the data processing units 102 and 202 perform analysis of the MAC header, detection of packet error, reorder processing, or the like, at the time of reception with inputs respectively from the modulation/demodulation units 110 and 210, and transfer the processed data to the upper layers of the protocol.

The control units 104 and 204 exchange information between individual units. Furthermore, the control units 104 and 204 perform parameter setting in the modulation/demodulation units 110 and 210 and the signal processing units 112 and 212, and perform packet scheduling in the data processing units 102 and 202, respectively. Furthermore, the control units 104 and 204 perform parameter setting and transmission power control for the wireless interface units 114 and 214 and the amplifier units 116 and 216, respectively.

In particular, in the present embodiment, the control unit 104 of the access point 100 generates transition information related to transition from the centralized communication mode to another mode. Accordingly, the control unit 104 of the access point 100 is an example of a transition information generation unit.

In particular, in the present embodiment, the control unit 104 of the access point 100 controls each of units to transmit a signal including transition information. Furthermore, the control unit 204 of the station 200 controls each of units to perform communication mode transition on the basis of the transition information received from the access point 100 and information held by the station 200. Accordingly, the control unit 204 of the station 200 is an example of a mode determination unit.

At the time of transmission, the modulation/demodulation units 110 and 210 perform encoding, interleave, and modulation onto input data from the data processing units 102 and 202 respectively on the basis of the coding and modulation scheme set by the control units 104 and 204, respectively. In addition, the modulation/demodulation units 110 and 210 generate a data symbol stream and supply the generated stream to the signal processing units 112 and 212, respectively. At the time of reception, the modulation/demodulation units 110 and 210 perform processing opposite to the time of transmission, onto the input from the signal processing units 112 and 212, respectively, and supply data to the data processing units 102 and 202 or the control units 104 and 204, respectively.

At the time of transmission, the signal processing units 112 and 212 perform signal processing used for spatial separation onto inputs from the modulation/demodulation units 110 and 210, respectively. Next, the signal processing units 112 and 212 supply one or more transmission symbol streams obtained by signal processing, to the wireless interface units 114 and 214, respectively. At the time of reception, the signal processing units 112 and 212 perform signal processing on the received symbol streams respectively input from the wireless interface units 114 and 214. Next, the signal processing units 112 and 212 perform spatial decomposition of the stream, and provide the separated stream to the modulation/demodulation unit.

The channel estimation units 118 and 218 calculate complex channel gain information of a propagation path from a preamble portion and a training signal portion contained in the input signals respectively from the wireless interface units 114 and 214. The calculated complex channel gain information is used for demodulation processing in the modulation/demodulation units 110 and 210 and spatial processing in the signal processing units 112 and 212 via the control units 104 and 204, respectively.

At the time of transmission, the wireless interface units 114 and 214 convert the input from the signal processing units 112 and 212 into analog signals, respectively, filter the received signals, up-convert the signals to carrier frequencies, and send out the signals to the amplifier units 116 and 216, respectively, or to an antenna. At the time of reception, the wireless interface units 114 and 214 respectively perform processing opposite to the time of transmission on the input from the amplifier units 116 and 216 or the antenna, and supply data to the signal processing units 112 and 212 and the channel estimation units 118 and 218, respectively.

At the time of transmission, the amplifier units 116 and 216 amplify the analog signals respectively input from the wireless interface units 114 and 214 to a predetermined power, and transmit the amplified signals to the antenna. At the time of reception, the amplifier units 116 and 216 amplify the signals input from the antenna up to a predetermined power, and output the amplified signals to the wireless interface units 114 and 214, respectively. At least one of the function at the time of transmission or the function at the time of reception in the amplifier units 116 and 216 may be included in the wireless interface units 114 and 214, respectively. The power supply units 106 and 206 include a battery power supply or a fixed power supply, and supply electric power to the communication apparatus.

3. First Embodiment (3-1. First Operation Example of First Embodiment)

Figure 4:
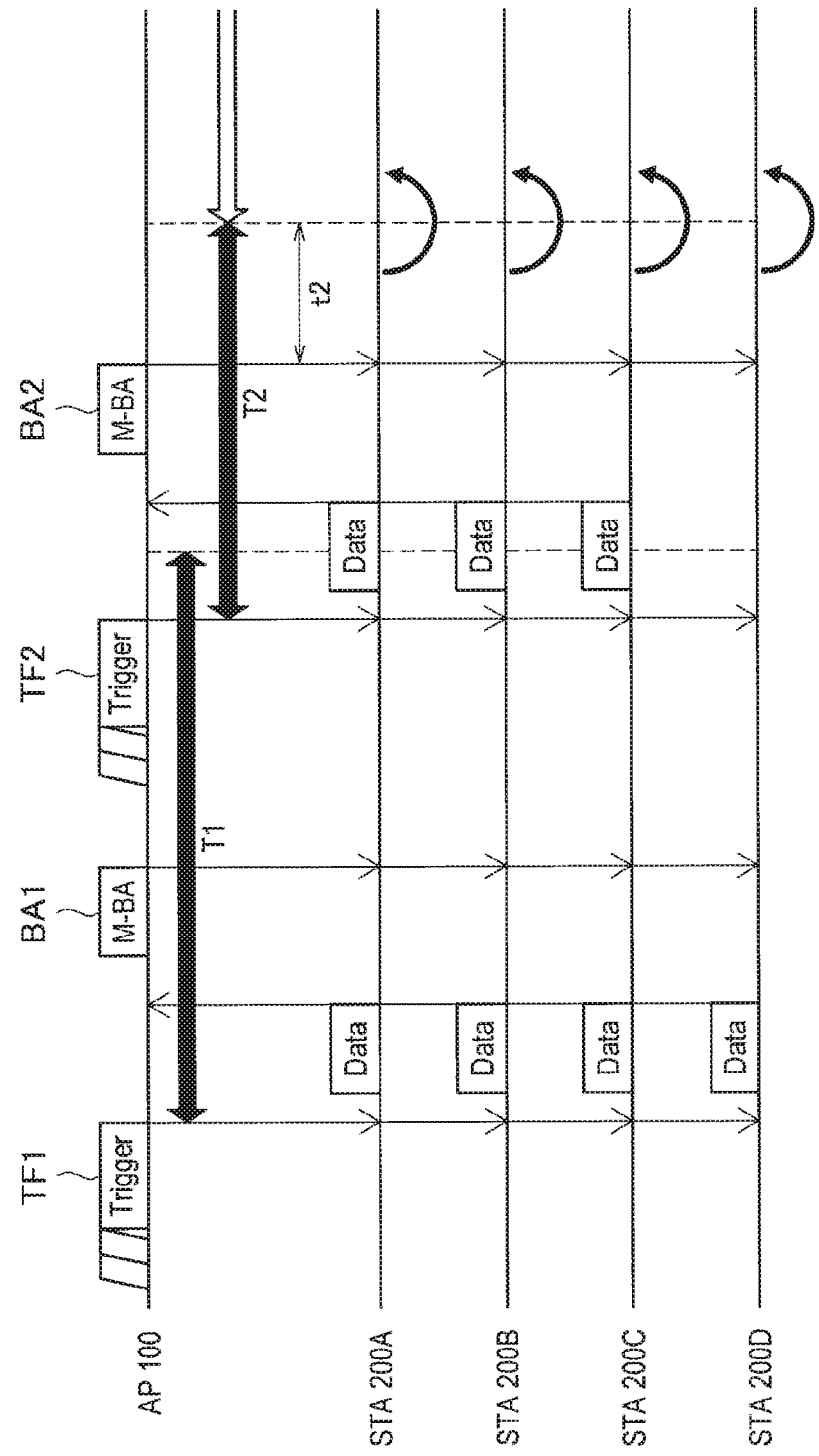
FIG. 4 is a diagram illustrating an example of communication performed by a centralized communication mode in a wireless system according to an embodiment of the present disclosure.

Configurations of the access point 100 and the station 200 have been described as above. Hereinafter, an operation example of a communication system of the present embodiment will be described. FIG. 4 is a diagram illustrating a first operation example of the communication system of the present embodiment.

In FIG. 4, similarly to the operation example illustrated in FIG. 2, the AP 100 transmits a trigger frame (TF1) instructing the AP 100 that communication in a centralized communication mode is to be performed from the AP 100 to the STAs 200A to 200D communicating with the AP 100.

Next, after receiving a trigger frame (TF1), the STAs 200A to 200D enter the centralized communication mode triggered by reception of the trigger frame (TF1). Here, the STAs 200A to 200D refer to the information regarding the duration included in the trigger frame (TF1), and continue the centralized communication mode in accordance with the information. In FIG. 4, since the duration is set to a length of T1 by the trigger frame (TF1), the STAs 200A to 200D continue the centralized communication mode in the duration (T1). Note that information regarding the duration contained in this trigger frame is an example of transition information concerning the transition from the centralized communication mode to another mode.

Next, the STAs 200A to 200D transmit data using the resources set by the trigger frame (TF1). Furthermore, the AP 100 transmits, to the STAs 200A to 200D, a M-BA frame (BA1) being a frame indicating acknowledgment of reception of data from the STAs 200A to 200D.

Thereafter, the AP 100 transmits a next trigger frame (TF2) to the STAs 200A to 200D in the duration (T1) set by the trigger frame (TF1). Next, after receiving a trigger frame (TF2), the STAs 200A to 200D update of the duration of the centralized communication mode to a duration (T2) set by the trigger frame (TF2).

Here, in the operation example illustrated in FIG. 4, the duration (T2) set by the trigger frame (TF2) is a duration having a length different from the duration (T1) set by the trigger frame (TF1). For example, in FIG. 4, the duration (T2) set by the trigger frame (TF2) is shorter than the duration (T1) set by the trigger frame (TF1).

Next, the STAs 200A to 200C transmit data using the resource set by the trigger frame (TF2), and then, the AP 100 transmits the M-BA frame (BA2) to the STAs 200A to 200D. Here, the reason why the STA 200D is not transmitting data is that the STA 200D is not permitted to transmit data in the duration (T2) by the trigger frame (TF2).

Thereafter, the STAs 200A to 200D continue the centralized communication mode until the duration (T2) set by the trigger frame (TF2) elapses. When the duration (T2) elapses, the STAs 200A to 200D terminates the centralized communication mode and switch to another mode.

Here, the period indicated by "t2" in FIG. 4 is a period in which the STA 200 waits for the end of the duration (T2)

after the STA 200 receives the M-BA frame (BA2) from the AP 100. Comparing the period of "t2" with the period of "t1" of FIG. 2, the period of "t2" is shorter than the period of "t1". This is because the duration (T2) of the length different from the length of the duration (T1) set by the trigger frame (TF1) has been set by the trigger frame (TF2). That is, durations of different lengths are set for individual trigger frames in the centralized communication mode, making it possible to reduce the time for waiting for the end of duration of the centralized communication mode provided to enable transition of the STA 200 to another mode.

With this setting, the STA 200 can reduce the waiting time until end of the duration of the centralized communication mode and can transition to another mode different from the centralized communication mode at a more appropriate timing. For example, the STA 200 can reduce the period having difficulty in obtaining a communication opportunity to perform autonomous decentralized communication. Furthermore, the STA 200 can make a transition to the power saving mode and connect to another AP 100 at an appropriate timing.

Note that, in the above example, the trigger frame (TF2) has set the duration (T2) having a length shorter than the duration (T1) set by the trigger frame (TF1). However, the length of the duration (T2) set by the trigger frame (TF2) may be longer than the duration (T1) set by the trigger frame (TF1). Alternatively, the length of the duration (T2) set by the trigger frame (TF2) may be "0 seconds". At this time, the STA 200 that has received the trigger frame (TF2) may immediately transition to another mode different from the centralized communication mode. Furthermore, the end of the duration (T2) set by the trigger frame (TF2) may be earlier than the end of the duration (T1) set by the trigger frame (TF1). Moreover, the duration of the centralized communication mode may be set by information indicating one of the durations of the centralized communication modes preliminarily set in plurality to the STA 200. Furthermore, the duration of the centralized communication mode may be set by designating the end time of the centralized communication mode.

Furthermore, the AP 100 may determine the length of the duration of the centralized communication mode on the basis of information supplied from the STA 200. For example, the AP 100 may receive a request to transition to another mode from a plurality of STAs 200 under the control of the AP 100 and may thereby set the duration of the centralized communication mode to be a shorter duration.

Furthermore, the AP 100 may obtain the information regarding the buffer state of the STA 200 from the STA 200, and may set the length of the duration of the centralized communication mode in accordance with the obtained buffer state. For example, the AP 100 may set the length of the duration of the centralized communication mode to be longer in a case where the buffer amount of the STA 200 is large. Conversely, the AP 100 may set the length of the duration of the centralized communication mode to be shorter in the case where the buffer amount of the STA 200 is large.

Furthermore, the AP 100 may set the length of the duration of the centralized communication mode on the basis of characteristics or performance of the STA 200 under the control of the AP 100. For example, the AP 100 may set the length of the duration of the centralized communication mode in accordance with the number or the ratio of the STAs 200 capable of communicating in the centralized communication mode. For example, the AP 100 may set the length of the duration of the centralized communication mode to be longer in a case where the number or the ratio of the STAs 200 capable of communicating in the centralized communication mode is large out of the STAs 200 under the control of the AP 100.

As described above, the AP 100 determines whether or not to continue the centralized communication mode, arranges the transition information regarding the duration of the centralized communication mode in the trigger frame, and transmits the trigger frame to the STA 200. Furthermore, the AP 100 may set the length of the duration of the centralized communication mode on the basis of various information obtained from the STA 200. Next, the AP 100 arranges the transition information regarding the duration of the centralized communication mode in the trigger frame, and transmits the trigger frame. This enables more appropriate or more flexible communication control.

Figure 5:
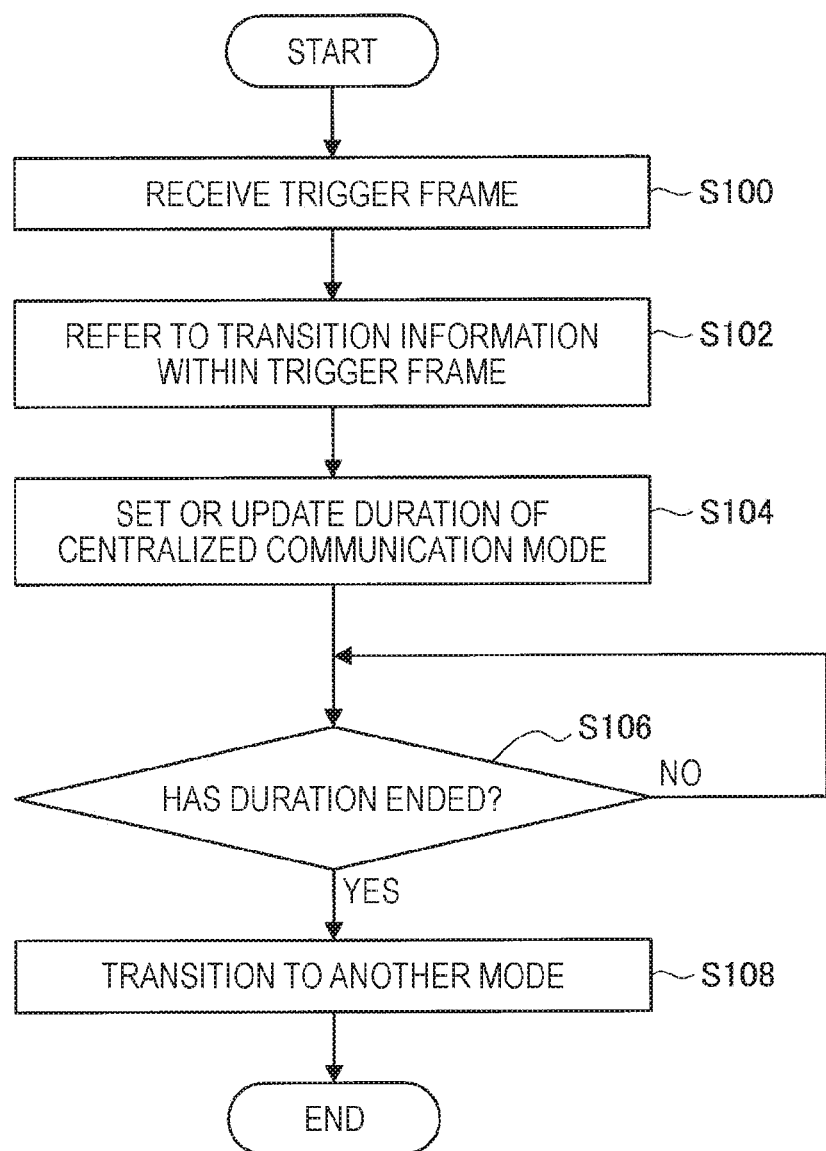
FIG. 5 is a flowchart illustrating an example of processing in a station according to an embodiment of the present disclosure.

FIG. 5 is a flowchart illustrating processing of the STA 200 that performs the operation described in FIG. 4. First, in S100, the STA 200 receives a trigger frame from the AP 100. Furthermore, in S102, the STA 200 refers to the transition information contained in the trigger frame. In the operation of FIG. 4, this transition information is information regarding the duration of the centralized communication mode.

Next, in S104, the STA 200 sets or updates the duration of the centralized communication mode on the basis of the transition information referred to in S102. At this time, the STA 200 may set the timer included in the STA 200 to the duration of the centralized communication mode obtained in S102.

In S106, the STA 200 determines whether or not the duration set or updated in S104 has ended. For example, the STA 200 may determine whether or not the duration has ended by whether or not the value of the timer set in S104 indicates 0.

In S106, the STA 200 repeats the operation of S106 until the end of the duration. Next, in a case where the STA 200 determines in S106 that the duration has ended, the processing proceeds to S108, and then, the STA 200 transitions from the centralized communication mode to another mode. Here, examples of "another mode" include as described above, a communication mode of performing autonomous decentralized access control, a power saving mode, a mode of scanning radio waves from another access point to connect to this access point. The STA 200 selects a transition mode from among the above-described other modes in accordance with the condition of the STA 200.

(3-2. Second Operation Example of First Embodiment)

The above description is an example in which the trigger frame contains information regarding the duration of the centralized communication mode. The following is an example in which the trigger frame contains information giving an instruction for immediate transition from the centralized communication mode to another mode. Note that the information giving an instruction for the immediate transition from the centralized communication mode to another mode is an example of the transition information described above.

Figure 6:
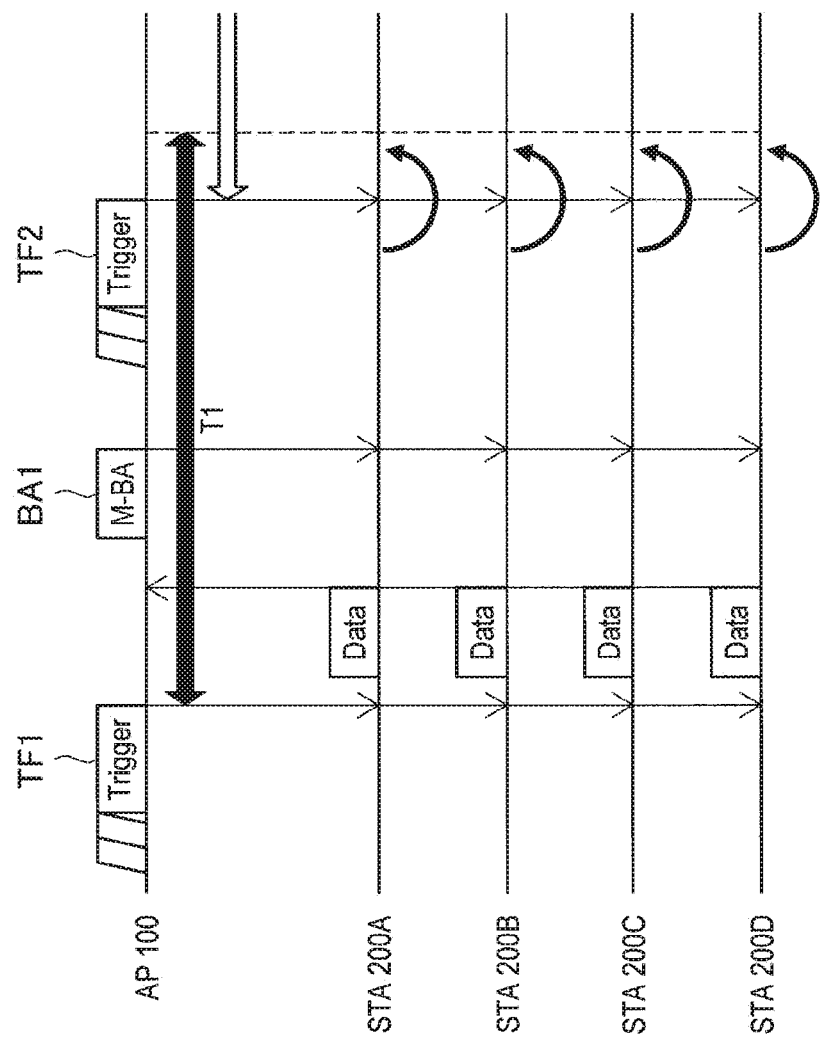
FIG. 6 is a diagram illustrating an example of communication performed by a centralized communication mode in a wireless system according to an embodiment of the present disclosure.

FIG. 6 is a diagram illustrating the operation of the AP 100 and the STA 200 in the case where the trigger frame contains information giving an instruction for immediate transition from the centralized communication mode to another mode. The basic operation of AP 100 and STA 200 in FIG. 6 is similar to the operation of AP 100 and STA 200 in FIG. 4.

In FIG. 6, the AP 100 transmits a trigger frame (TF1), to the STAs 200A to 200D, instructing that communication is to be performed in the centralized communication mode from the AP 100. Next, after receiving a trigger frame (TF1), the STAs 200A to 200D enter the centralized communication mode triggered by reception of the trigger frame (TF1). In addition, the STAs 200A to 200D refer to information regarding the duration included in the trigger frame (TF1) and continue the centralized communication mode. In FIG. 6, since the duration is set to the length of T1 by the trigger frame (TF1), the STAs 200A to 200D continue the centralized communication mode in the duration (T1).

Next, the STA 200A to 200D transmit data using the resource set by the trigger frame (TF1), and receive the M-BA frame (BA1) from the AP 100.

Thereafter, the AP 100 transmits a next trigger frame (TF2) to the STAs 200A to 200D in the duration (T1) set by the trigger frame (TF1). Here, the trigger frame (TF2) contains information giving an instruction for immediate transition from the centralized communication mode to another mode. Therefore, the STAs 200A to 200D that have received the trigger frame (TF2) immediately transition to another mode without waiting for the end of the duration (T1) set by the trigger frame (TF1).

As described above, the AP 100 determines whether or not to continue the centralized communication mode, arranges the information giving an instruction for immediate transition from the centralized communication mode to another mode in the trigger frame, and then, transmits the trigger frame to the STA 200. With this configuration, the STAs 200A to 200D can more quickly transition from the centralized communication mode to another mode, enabling more flexible and efficient communication control. Furthermore, the information giving an instruction for immediate transition from the centralized communication mode to another mode is indicated by information bits for flag management, and therefore, is indicated by a small amount of addition of information.

Note that the AP 100 may determine whether or not to continue the centralized communication mode on the basis of the information provided from the STA 200 and may determine whether or not to notify the STA 200 of the information giving an instruction for immediate transition from the centralized communication mode to another mode. For example, the AP 100 may receive a request to transition to another mode from a large number of STAs 200 under the control of the AP 100, and may thereby notify the STA 200 of the information giving an instruction for immediate transition from the centralized communication mode to another mode Furthermore, the AP 100 may notify the STA 200 of the information giving an instruction for immediate transition from the centralized communication mode to another mode in accordance with the buffer state of the STA 200. For example, in a case where the buffer amount of the STA 200 obtained from the STA 200 is small, the AP 100 may notify the STA 200 of information giving an instruction for immediate transition from the centralized communication mode to another mode.

Furthermore, the AP 100 may also notify the STA 200 of information giving an instruction for immediate transition from the centralized communication mode to another mode on the basis of the characteristics or performance of the STA 200 under the control of the AP 100. For example, the AP 100 may notify the STA 200 of the information giving an instruction for immediate transition from the centralized communication mode to another mode in a case where the number or ratio of the STAs 200 that can communicate in the centralized communication mode is small out of the STAs 200 under the control of the AP 100.

In addition, the information giving an instruction for immediate transition from the centralized communication mode to another mode can be given in notification by transmitting a trigger frame of not permitting transmission from all the STAs 200 under the control of the AP 100 in the centralized communication mode, or transmitting a trigger frame not containing the permission of transmission in the centralized communication mode, to the STA 200. In this case, the STA 200 that has received the trigger frame of not permitting transmission from all the STAs 200 under the control of the AP 100 or receives the trigger frame not containing permission of transmission in the centralized communication mode immediately transitions to another mode after reception of the trigger frame.

Figure 7:
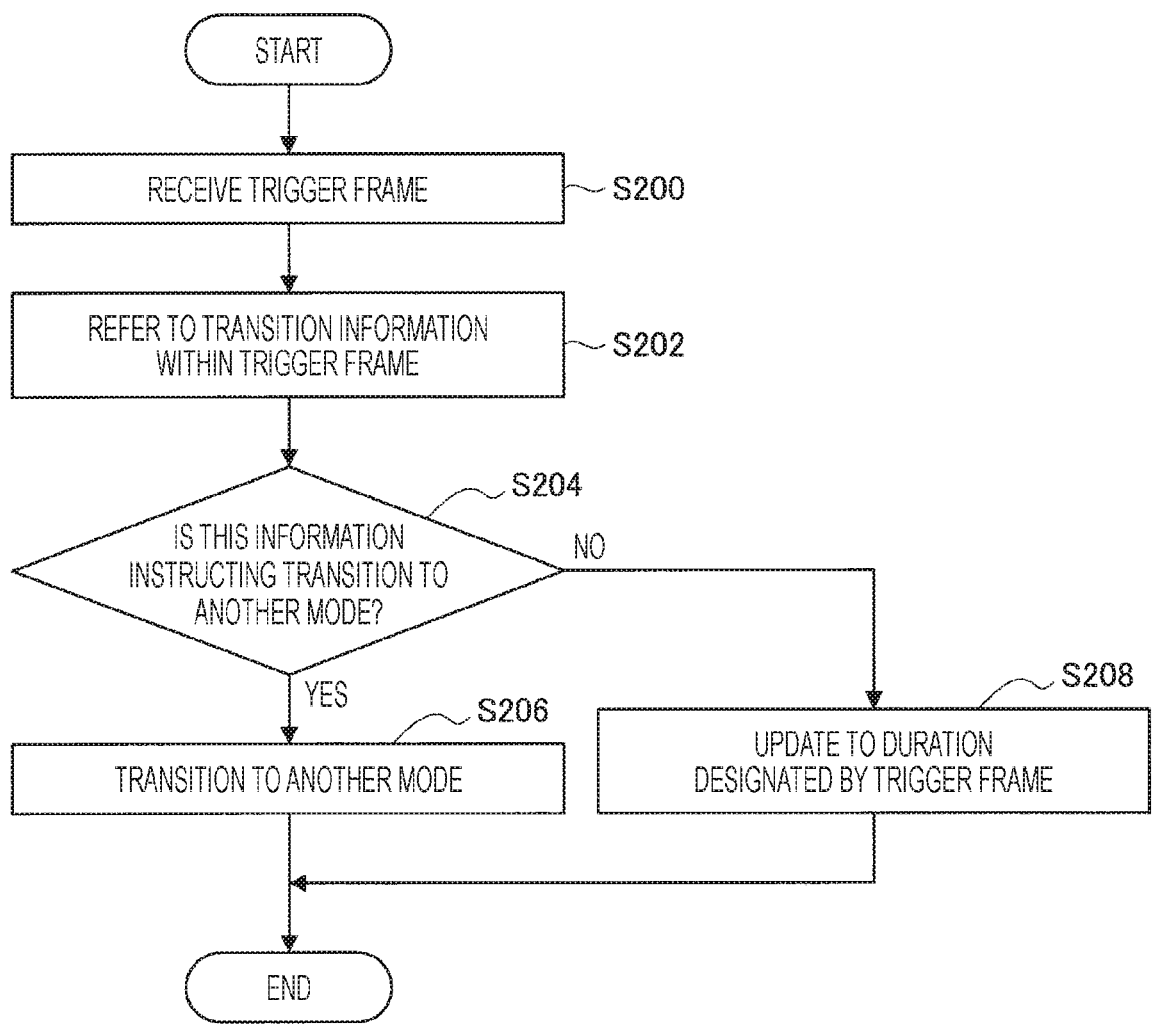
FIG. 7 is a flowchart illustrating an example of processing in a station according to an embodiment of the present disclosure.

FIG. 7 is a flowchart illustrating processing of the STA 200 that performs the operation described in FIG. 6. First, in S200, the STA 200 receives a trigger frame from the AP 100. Furthermore, in S202, the STA 200 refers to the transition information contained in the trigger frame. In the operation of FIG. 6, this transition information is information giving an instruction for immediate transition from the centralized communication mode to another mode.

Next, in S204, the STA 200 determines whether or not the transition information referred to in S202 is information instructing immediate transition from the centralized communication mode to another mode.

In a case where in S204 the transition information is information giving an instruction for immediate transition from the centralized communication mode to another mode, the processing proceeds to S206, and then, the STA 200 immediately transitions from the centralized communication mode to another mode. In contrast, in a case where the transition information is not information giving an instruction for immediate transition from the centralized communication mode to another mode in S204, the processing proceeds to S208, the STA 200 updates the duration to the period designated by the trigger frame.

(3-3. Third Operation Example of First Embodiment)

The following is an example in which the trigger frame contains information giving an instruction for immediate transition from the centralized communication mode to another mode. The following description is an example in which the trigger frame contains information regarding the end of the centralized communication mode. Note that the information regarding the end of the centralized communication mode is an example of the transition information described above.

Figure 8:
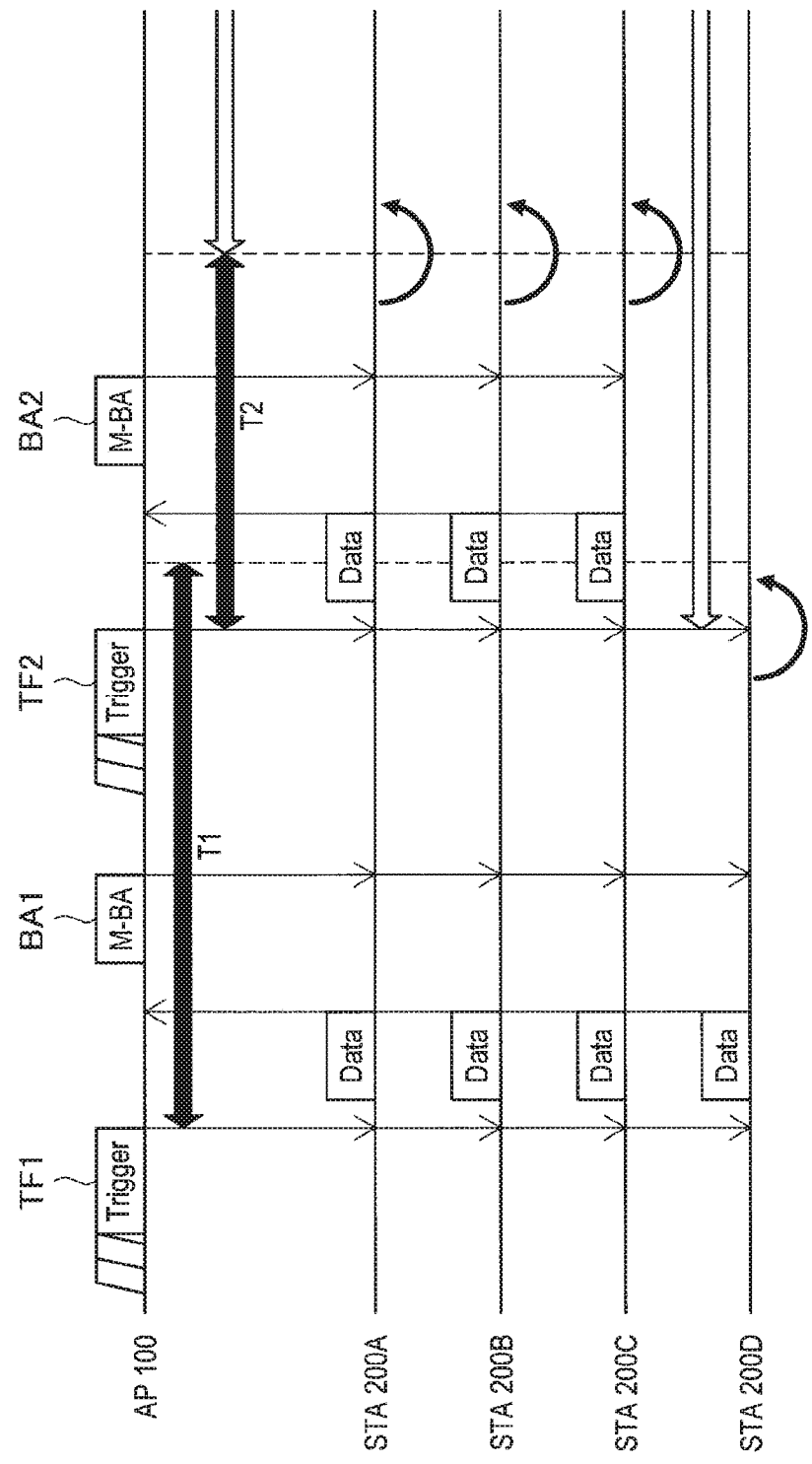
FIG. 8 is a diagram illustrating an example of communication performed by a centralized communication mode in a wireless system according to an embodiment of the present disclosure.

FIG. 8 is a diagram illustrating operation of the AP 100 and the STA 200 in a case where the trigger frame contains information regarding the end of the centralized communication mode. In FIG. 8, as information regarding the end of the centralized communication mode, information is added to indicate that a subsequent trigger frame is not going to be transmitted within a duration designated by the trigger frame. That is, the trigger frame containing additional information indicating that the subsequent trigger frame is not going to be transmitted within the duration designated by the trigger frame is the last trigger frame in a certain period. Note that basic operation of the AP 100 and the STA 200 in FIG. 8 is similar to the operation of the AP 100 and the STA 200 in FIG. 4.

In FIG. 8, the AP 100 transmits the trigger frame (TF1) to the STAs 200A to 200D, and then, the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

The AP 100 transmits a next trigger frame (TF2) to the STAs 200A to 200D in the duration (T1) set by the trigger frame (TF1). Here, the trigger frame (TF2) contains information indicating that the next trigger frame is not going to be transmitted in the duration designated by the trigger frame (TF2). Note that, with reference to FIG. 8, similarly to FIG. 4, the case where the trigger frame (TF2) has not permitted transmission of data in the duration (T2) by the STA 200D will be described.

First, operation of the STA 200D in FIG. 8 will be described. The trigger frame (TF2) contains information indicating that the next trigger frame is not going to be transmitted in the duration designated by the trigger frame (TF2). Therefore, the STA 200D recognizes that the next trigger frame is not going to be transmitted after the trigger frame (TF2) in this period. That is, the STA 200D recognizes that the centralized communication mode is going to be finished at the end of the duration designated by the trigger frame (TF2).

Furthermore, the STA 200D recognizes by the trigger frame (TF2) that transmission of data in the duration (T2) has not been permitted. With the information described above, the STA 200D recognizes that the STA 200D has no opportunity to perform centralized communication in this period of centralized communication mode. Accordingly, the STA 200D transitions from the centralized communication mode to another mode immediately after receiving the trigger frame (TF2). With this configuration, the STA 200D can more quickly transition from the centralized communication mode to another mode.

Note that the STAB 200A to 200C transmit data in the duration (T2) designated by the trigger frame (TF2), and after the end of duration (T2), the STAB 200A to 200C transition from the centralized communication mode to another mode.

As described above, the AP 100 determines whether or not to continue the centralized communication mode, arranges information indicating that the next trigger frame is not going to be transmitted in the duration designated in the trigger frame in the trigger frame, and transmits the trigger frame to the STA 200. With this configuration, the STA 200D that has no permission of communication in the centralized communication mode by the trigger frame can more quickly transition from the centralized communication mode to another mode, enabling more flexible and efficient communication control. In addition, information indicating that the next trigger frame is not transmitted in the duration designated by the trigger frame is indicated by information bits for flag management, and therefore, is indicated by a small amount of addition of information.

Note that the AP 100 may use the information provided from the STA 200 as a basis and determine whether or not to notify the STA 200 of information indicating that the next trigger frame is not going to be transmitted in the duration designated by the trigger frame. For example, the AP 100 may receive a request to transition to another mode from a plurality of STAB 200 under the control of the AP 100, and may thereby notify the STA 200 of information indicating that the next trigger frame is not going to be transmitted in the duration designated by the trigger frame.

Furthermore, the AP 100 may notify the STA 200 of information indicating that the next trigger frame is not going to be transmitted in the duration designated by the trigger frame, in accordance with the buffer state of the STA 200. For example, the AP 100 may notify the STA 200 of information indicating that the next trigger frame is not going to be transmitted in the duration designated by the trigger frame in a case where the buffer amount of the STA 200 is small.

Furthermore, the AP 100 may notify the STA 200 of information indicating that the next trigger frame is not going to be transmitted in the duration designated by the trigger frame, on the basis of characteristics or performance of the STA 200 under the AP 100. For example, the AP 100 may notify the STA 200 of the information indicating that the next trigger frame is not going to be transmitted in the duration designated by the trigger frame in a case where the number or ratio of the STAs 200 that can communicate in the centralized communication mode is small out of the STAs 200 under the control of the AP 100.

Figure 9:
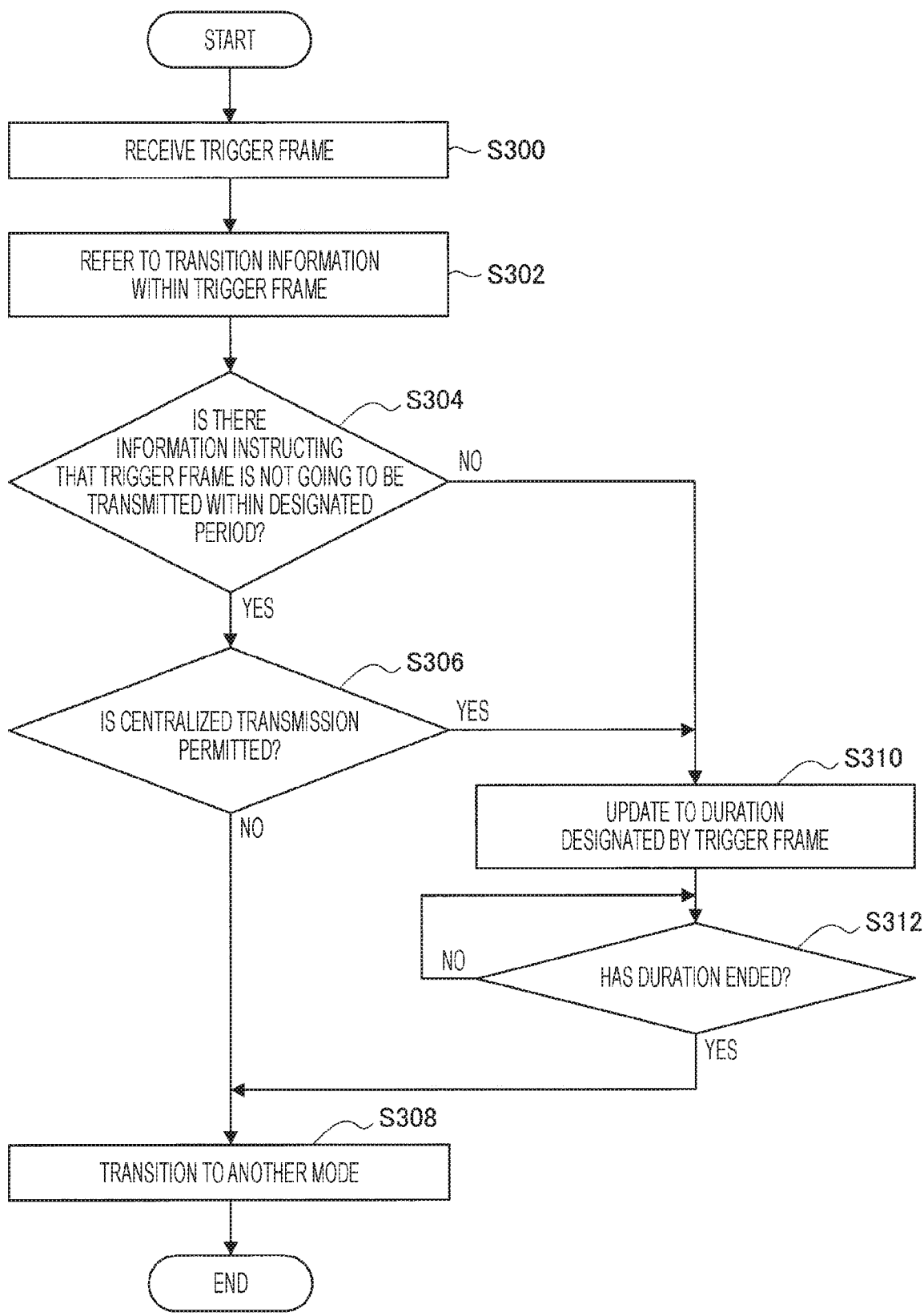
FIG. 9 is a flowchart illustrating an example of processing in a station according to an embodiment of the present disclosure.

FIG. 9 is a flowchart illustrating processing of the STA 200 that performs the operation described in FIG. 8. First, in S300, the STA 200 receives a trigger frame from the AP 100. Furthermore, in S302, the STA 200 refers to the transition information contained in the trigger frame. In the operation of FIG. 9, this transition information is information regarding the duration of the centralized communication mode and information indicating that the next trigger frame is not going to be transmitted in the duration designated by the trigger frame.

Next, in S304, the STA 200 determines whether or not information indicating that the next trigger frame is not going to be transmitted in the duration designated by the trigger frame has been added. When the STA 200 determines in S304 that information indicating that the next trigger frame is not going to be transmitted in the duration designated by the trigger frame has been added, the processing proceeds to S306.

Next, in S306, the STA 200 determines whether or not communication in the centralized communication mode is permitted in the period designated by the trigger frame. When the STA 200 determines in S306 that the communication in the centralized communication mode is not permitted, the STA 200 transitions to another mode (S308). This is operation illustrating the operation of the STA 200D in FIG. 8.

Furthermore, when the STA 200 determines in S304 that information indicating that the next trigger frame is not going to be transmitted in the duration designated by the trigger frame has not been added, the processing proceeds to S310. Furthermore, when the STA 200 determines that the communication in the centralized communication mode is permitted in S306, the processing proceeds to S310. In S310, the STA 200 then updates the duration of the centralized communication mode to the period designated by the trigger frame. Next, in S312, the STA 200 determines whether or not the duration updated in S310 has ended. In a case where the STA 200 determines in S312 that the duration has ended, the processing proceeds to S308, and then, the STA 200 transitions from the centralized communication mode to another mode.

Note that the above description is an example in which, as information regarding the end of the centralized communication mode, the trigger frame has additional information indicating that a subsequent trigger frame is not going to be transmitted within a duration designated by the trigger frame. However, the additional information regarding the termination of the centralized communication mode is not limited to this. For example, the information regarding the end of the centralized communication mode may be information regarding the remaining number of times of transmission of the trigger frame. Specifically, the information regarding the end of the centralized communication mode may be information indicating that the trigger frame is transmitted three more times. With transmission of such information added to the trigger frame, the STA 200 can predict how long the centralized communication mode will continue.

Figure 10:
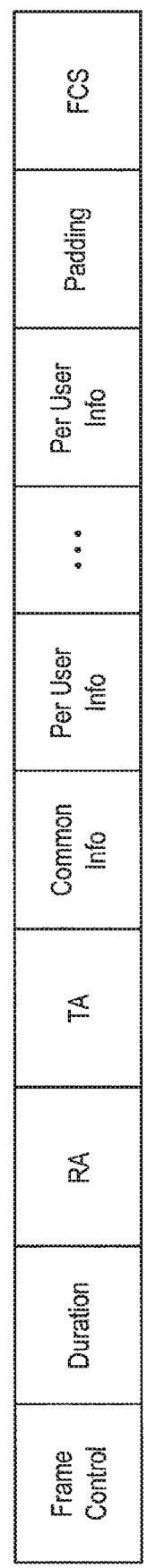
FIG. 10 is a diagram illustrating an example of a format of a trigger frame in an embodiment of the present disclosure.

The above description is an example in which transition information is added to a trigger frame to be transmitted. In the following, the position, within a frame, of the transition information added to the trigger frame will be described. FIG. 10 and FIG. 11 are diagrams illustrating a format of the trigger frame.

In FIG. 10, "Frame Control" is a region that stores information regarding MAC frame control. Furthermore, "Duration" is a region that stores a scheduled period for using a wireless line. Furthermore, "RA" is a region that stores identification information of the STA 200 to be broadcast. Furthermore, "TA" is a region that stores a MAC address of the AP 100. Furthermore, "Common Info" is a region that stores information that can be referred to by all the STAs 200. Furthermore, "Per User Info" is a region that stores information that can be individually referred to by the STA 200.

Next, FIG. 11 is a diagram illustrating information included in the "Common Info" region of FIG. 10. In FIG. 11, "Length" is a region that stores the length of the PLCP Protocol Data Unit (PPDU) of a trigger frame transmitted from the AP 100. Furthermore, "Cascade Indication" is an indicator of a mode for performing continuous multiplex communication. Furthermore, "CS Required" is an indicator that indicates whether or not to consider power detection and Network Allocation Vector (NAV) in order to determine whether or not the terminal identified in the "Per User Info" region responds.

Furthermore, "HE-SIG-A Info" is a region indicating the content of HE-SIG-A of the PPDU of the trigger frame transmitted from the AP 100. Furthermore, "CP and LTF Type" is a region indicating the type of CP and LTF of the PPDU of the trigger frame transmitted from the AP 100. Furthermore, "Trigger Type" is a region indicating the type of a trigger frame. Furthermore, "Trigger-dependent Common Info" is a region containing information corresponding to the type of trigger frame.

Next, the transition information described above is arranged after "Trigger-dependent Common Info" as an example. That is, in the above-described embodiment, the transition information is arranged in the region (Common Info) that stores information that all the STAs 200 can refer to, in the trigger frame.

4. Modification of First Embodiment (4-1. First Modification)

The above description is an example in which transition information regarding transition from the centralized communication mode to another mode is arranged in the trigger frame. Hereinafter, as a modification of the first embodiment, an example in which the transition information is arranged in another frame will be described.

Figure 12:
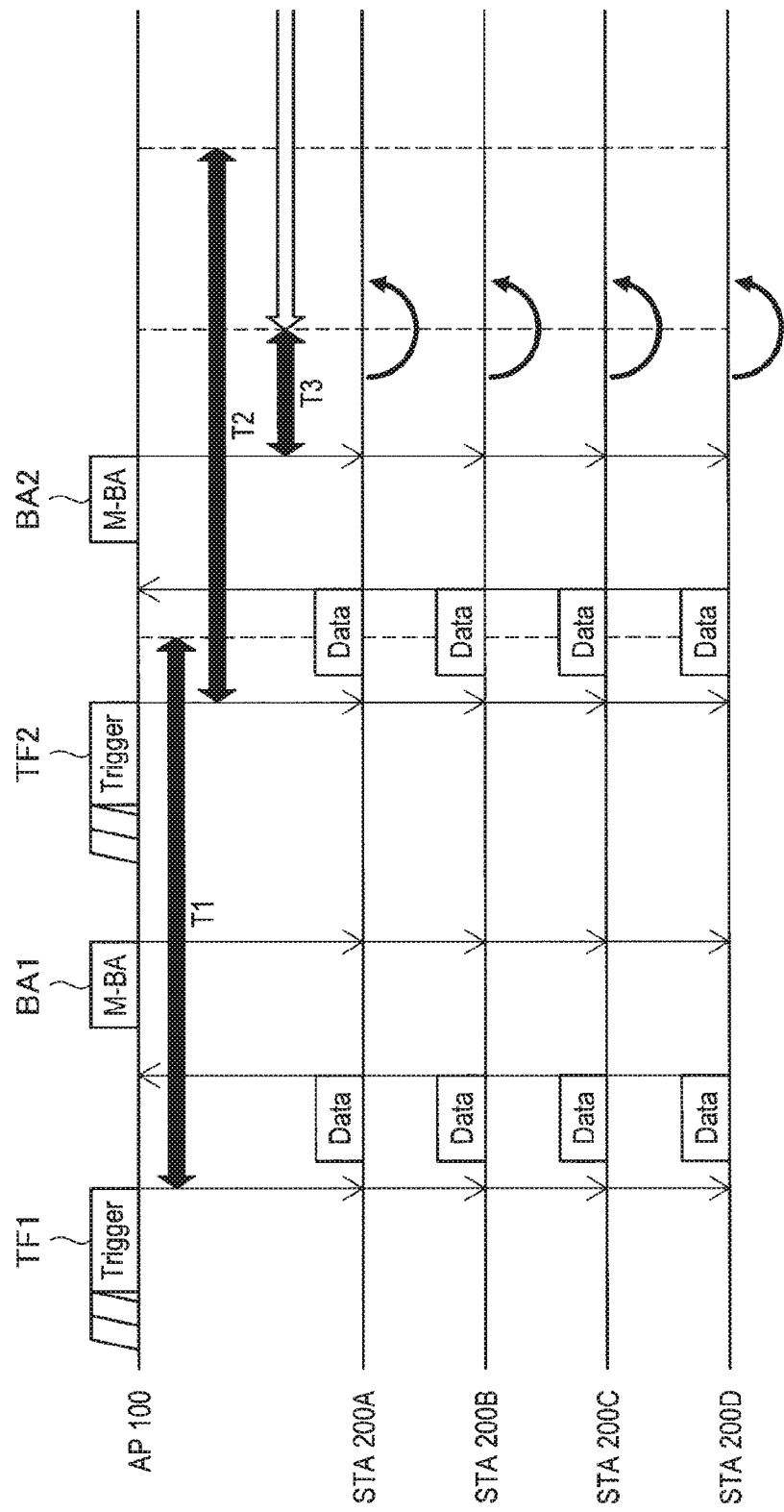
FIG. 12 is a diagram illustrating an example of communication performed by a centralized communication mode in a wireless system according to an embodiment of the present disclosure.

FIG. 12 is a diagram illustrating operation of the AP 100 and the STA 200 in a case where the transition information regarding the duration of the centralized communication mode is arranged in the M-BA frame. Note that the M-BA frame is transmitted to the STA 200 for which transmission of data has been permitted by the trigger frame. However, the STA 200 for which transmission of data has not been permitted may obtain the transition information with reference to the region of the M-BA frame that can be referred to by all of the STAs 200. Furthermore, in a case where the AP 100 stops performing centralized communication, the AP 100 may transmit the M-BA frame to all the STAs 200 under the AP 100.

In FIG. 12, the AP 100 transmits the trigger frame (TF1) to the STAs 200A to 200D, and then, the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

The AP 100 transmits a next trigger frame (TF2) to the STAs 200A to 200D in the duration (T1) set by the trigger frame (TF1). Here, the trigger frame (TF2) contains information regarding the duration (T2) designated by the trigger frame (TF2). In addition, after receiving the trigger frame (TF2), the STAs 200A to 200D update the length of the duration of the centralized communication mode to T2.

Next, the STA 200A to 200D transmit data using the resource set by the trigger frame (TF2) and transmits data, and then, receives the M-BA frame (BA2) from the AP 100. Here, the AP 100 adds transition information regarding the duration of the centralized communication mode to the M-BA frame (BA2) and transmits the frame. Note that the transition information added here is information indicating that the length of the duration of the centralized communication mode is to be T3.

After receiving the M-BA frame (BA2), the STAs 200A to 200D update the length of the duration of the centralized communication mode to T3 in accordance with the transition information contained in the M-BA frame (BA2). Next, after the duration (T3) ends, the STAB 200A to 200D transition to another mode. Note that the AP 100 may set the length of the duration on the basis of the information provided from the STA 200 similarly to the above example.

Figure 13:
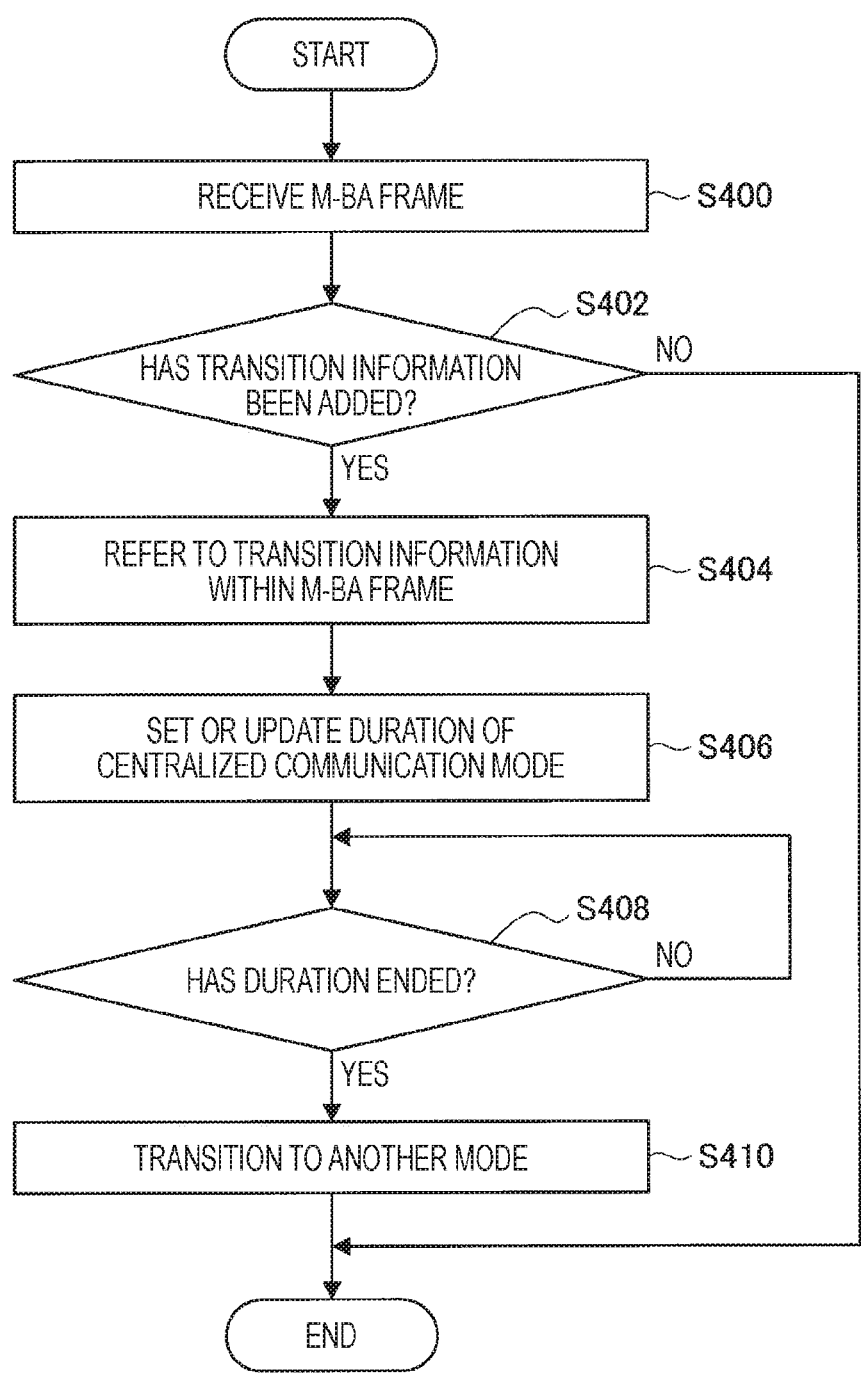
FIG. 13 is a flowchart illustrating an example of processing in a station according to an embodiment of the present disclosure.

FIG. 13 is a flowchart illustrating processing of the STA 200 that performs the operation described in FIG. 12. First, in S400, the STA 200 receives an M-BA frame from the AP 100. Furthermore, in S402, the STA 200 determines whether or not transition information is added to the M-BA frame.

In a case where transition information has been added to the M-BA frame in S402, the processing proceeds to S404, and the STA 200 refers to the added transition information. Next, in S406, the STA 200 sets or updates a duration of the centralized communication mode on the basis of the transition information referred to in S404.

Subsequently, in S408, the STA 200 determines whether or not the duration set or updated in S406 has ended. In a case where the STA 200 determines in S408 that the duration has ended, the processing proceeds to S410, and then, the STA 200 transitions from the centralized communication mode to another mode.

In the modification described above, the transition information is contained in the M-BA frame. With this configuration, in a case where the duration of the centralized communication mode designated by the trigger frame becomes inappropriate, a new duration can be given in notification by the M-BA frame. For example, in a case where the duration of the centralized communication mode designated by the trigger frame is too long, it is possible to provide notification of the new duration by the M-BA frame, whereby the STA 200 can transition to another mode at an early stage.

<4-2. Second Modification>

The above description is an example in which transition information regarding the duration of the centralized communication mode is arranged in the M-BA frame. Hereinafter, description follows on an example in which information giving an instruction for immediate transition from the centralized communication mode to another mode or information indicating that the next trigger frame is not going to be transmitted in the duration designated by the trigger frame is added to the M-BA frame.

Figure 14:
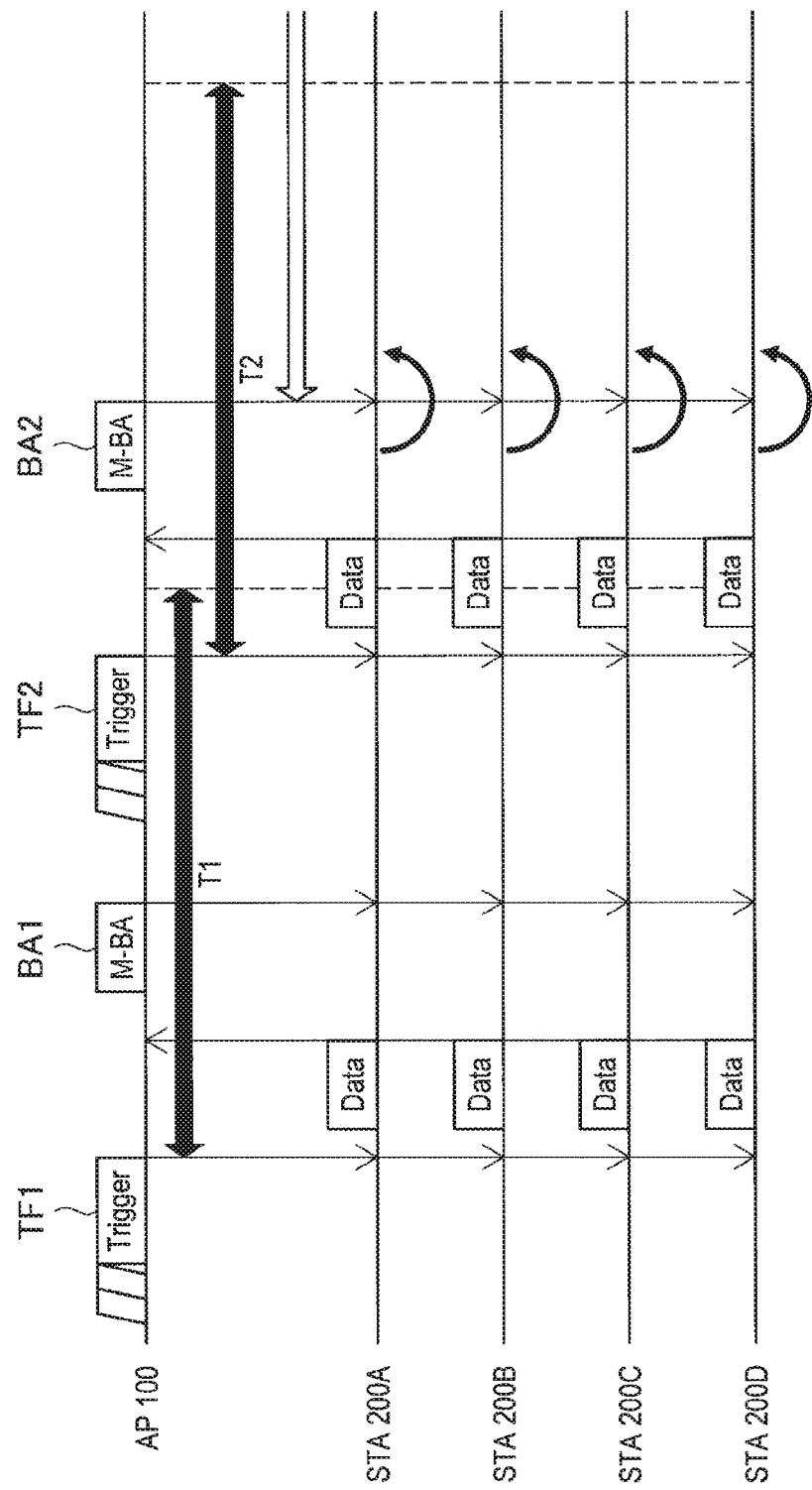
FIG. 14 is a diagram illustrating an example of communication performed by a centralized communication mode in a wireless system according to an embodiment of the present disclosure.

FIG. 14 is a diagram illustrating an example of the operation of the AP 100 and the STA 200 in the case where information giving an instruction for immediate transition from the centralized communication mode to another mode or information indicating that the next trigger frame is not going to be transmitted in the duration designated by the trigger frame is added to the M-BA frame.

In FIG. 14, the AP 100 transmits the trigger frame (TF1) to the STAs 200A to 200D, and then, the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

The AP 100 transmits a next trigger frame (TF2) to the STAs 200A to 200D in the duration (T1) set by the trigger frame (TF1). Here, the trigger frame (TF2) contains information regarding the duration (T2) designated by the trigger frame (TF2). In addition, after receiving the trigger frame (TF2), the STAs 200A to 200D update the length of the duration of the centralized communication mode to T2.

Next, the STA 200A to 200D transmit data using the resource set by the trigger frame (TF2) and transmits data, and then, receives the M-BA frame (BA2) from the AP 100. Here, the AP 100 transmits the M-BA frame (BA2) after adding the information giving an instruction for immediate transition from the centralized communication mode to another mode or the information indicating the next trigger frame is not going to be transmitted in the duration designated by the trigger frame, to the M-BA frame.

After receiving the M-BA frame (BA2), the STA 200A to 200D immediately transition to another mode in accordance with the transition information contained in the M-BA frame (BA2). In other words, in a case where the transition information added to the M-BA frame (BA2) is information giving an instruction for immediate transition from the centralized communication mode to another mode, the STA 200A to 200D immediately transition to another mode in accordance with this information.

Furthermore, in a case where the transition information added to the M-BA frame (BA2) is information indicating that the next trigger frame is not going to be transmitted in the duration designated by the trigger frame, the STA 200A to 200D determine that there will be no opportunity to transmit data in the centralized communication mode thereafter and then, the STAs 200A to 200D immediately transition to another mode. This is because the trigger frame contains information (for example, information regarding resources) needed for transmitting data in the centralized communication mode and thus, data transmission in the centralized communication mode cannot be implemented without receiving the trigger frame.

Figure 15:
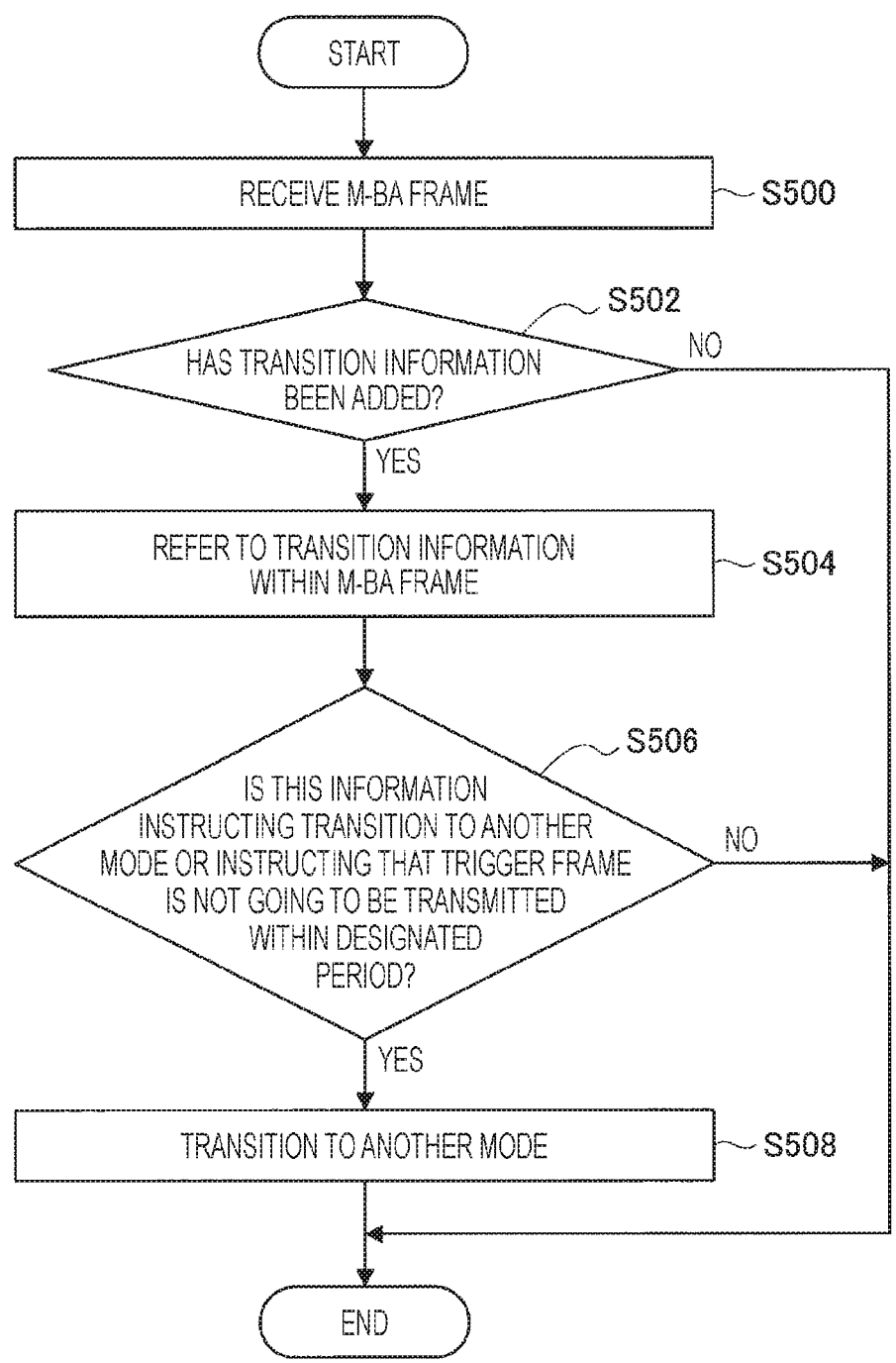
FIG. 15 is a flowchart illustrating an example of processing in a station according to an embodiment of the present disclosure.

FIG. 15 is a flowchart illustrating processing of the STA 200 that performs the operation described in FIG. 14. First, in S500, the STA 200 receives an M-BA frame from the AP 100. Furthermore, in S502, the STA 200 determines whether or not transition information is added to the M-BA frame.

In a case where transition information has been added to the M-BA frame in S502, the processing proceeds to S504, and the STA 200 refers to the added transition information. Next, the STA 200 determines in S506 whether or not the added transition information is the information giving an instruction for immediate transition from the centralized communication mode to another mode or the information indicating that the next trigger frame is not going to be transmitted in the duration designated by the trigger frame.

In a case where the STA 200 determines that the added transition information is the information giving an instruction for immediate transition from the centralized communication mode to another mode or the information indicating that the next trigger frame is not going to be transmitted in the duration designated by the trigger frame, the processing proceeds to S508 and the STA 200 transitions to another mode.

In the modification described above, the AP 100 determines whether or not to continue the centralized communication mode, arranges the transition information regarding the transition from the centralized communication mode to another mode in the M-BA frame, and transmits the M-BA frame to the STA 200. With this configuration, in a case where the duration of the centralized communication mode designated by the trigger frame becomes inappropriate, it is possible to provide notification of the transition to another mode by the M-BA frame. For example, in a case where the duration of the centralized communication mode set in the trigger frame is too long, the STA 200 can provide notification of the transition to another mode by the M-BA frame and can thereby immediately transition to another mode.

Figure 16:
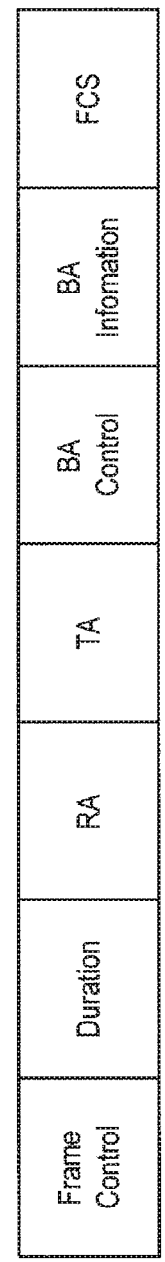
FIG. 16 is a diagram illustrating an example of a format of an M-BA frame in the embodiment of the present disclosure.

The above description is an example in which transition information is added to the M-BA frame to be transmitted. Hereinafter, the position of the transition information added to the M-BA frame in the frame will be described. FIG. 16 and FIG. 17 are diagrams illustrating formats of M-BA frames.

In FIG. 16, "Frame control" is a region that stores information regarding MAC frame control. Furthermore, "Duration" is a region that stores a scheduled period for using a wireless line. Furthermore, "RA" is a region that stores identification information of the STA 200 to be broadcast. Furthermore, "TA" is a region that stores a MAC address of the AP 100. Furthermore, "BA Control" is a region that stores control information of Block Ack that can be referred to by all STAs 200. Furthermore, "BA Information" is a region that stores one or more "Per STA Info Subfield(s)". Note that "Per STA Info Subfield" is a region that stores information that can be individually referred to by the STA 200.

Next, FIG. 17 is a diagram illustrating information contained in "BA Control" of the M-BA frame illustrated in FIG. 16. In FIG. 17, "BA ACK Policy" is a region indicating a condition for which Block ACK is requested. Furthermore, "Multi-TID", "Compressed Bitmap" and "GCR" are regions determined by the type of Block ACK. Furthermore, "TID_INFO" is a region that stores information regarding the type of traffic identifier (TID).

Moreover, the transition information described above is arranged after "TID_INFO" as an example. Furthermore, the above-described transition information may be arranged in the "Reserved" region of FIG. 17 as an example. That is, in the above-described embodiment, the transition information is arranged in a region (BA Control) that stores information that all the STAs 200 can refer to in the M-BA frame.

<4-3. Third Modification>

The above description is an example in which transition information regarding transition from the centralized communication mode to another mode is arranged in the M-BA frame. Hereinafter, as a modification of the first embodiment, an example will be described in which the transition information is arranged in a Mode Change (MC) frame that provides notification of transition from the centralized communication mode to another mode.

Figure 18:
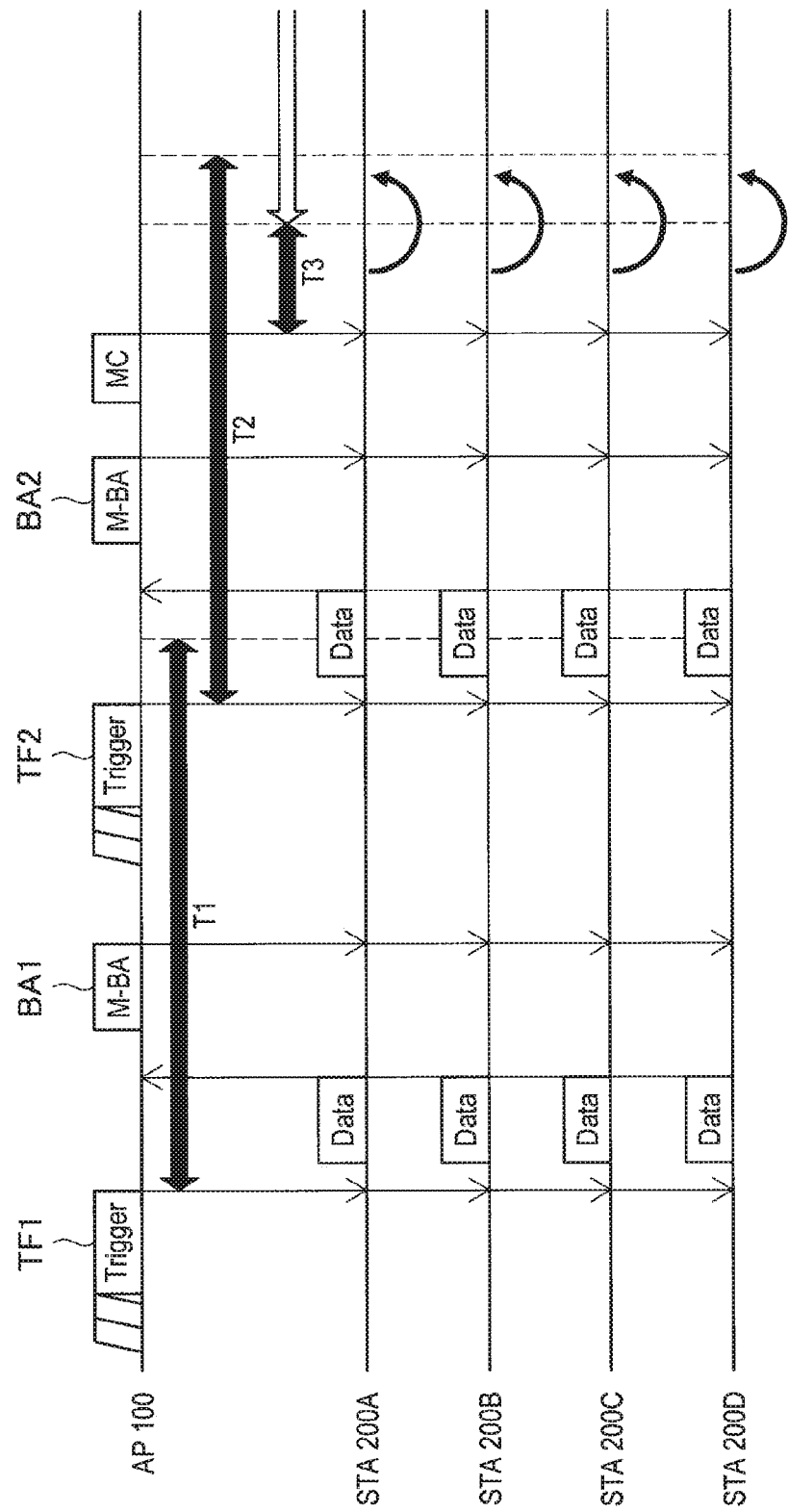
FIG. 18 is a diagram illustrating an example of communication performed by a centralized communication mode in a wireless system according to an embodiment of the present disclosure.

FIG. 18 is a diagram illustrating operation of the AP 100 and the STA 200 in a case where the transition information regarding the duration of the centralized communication mode is arranged in the MC frame. In FIG. 18, the AP 100 transmits the trigger frame (TF1) to the STAs 200A to 200D, and then, the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

The AP 100 transmits a next trigger frame (TF2) to the STAs 200A to 200D in the duration (T1) set by the trigger frame (TF1). Here, the trigger frame (TF2) contains information regarding the duration (T2) designated by the trigger frame (TF2). In addition, after receiving the trigger frame (TF2), the STAs 200A to 200D update the length of the duration of the centralized communication mode to T2.

Next, the STA 200A to 200D transmit data using the resource set by the trigger frame (TF2) and transmits data, and then, receives the M-BA frame (BA2) from the AP 100. Thereafter, the AP 100 transmits the MC frame providing notification of the transition from the centralized communication mode to another mode, to the STAs 200A to 200D. Here, information regarding the duration of the centralized communication mode is added to the MC frame, as the transition information.

After receiving the MC frame, the STAs 200A to 200D update the length of the duration of the centralized communication mode to T3 in accordance with the transition information contained in the MC frame. Next, after the duration (T3) ends, the STAs 200A to 200D transition to another mode. Note that the AP 100 may set the length of the duration on the basis of the information provided from the STA 200 similarly to the above example.

The above description is an example in which transition information regarding the duration of the centralized communication mode is arranged in the MC frame. Note that information giving an instruction for immediate transition from the centralized communication mode to another mode or information indicating that the next trigger frame is not going to be transmitted in the duration designated by the trigger frame may be added to the MC frame.

Figure 19:
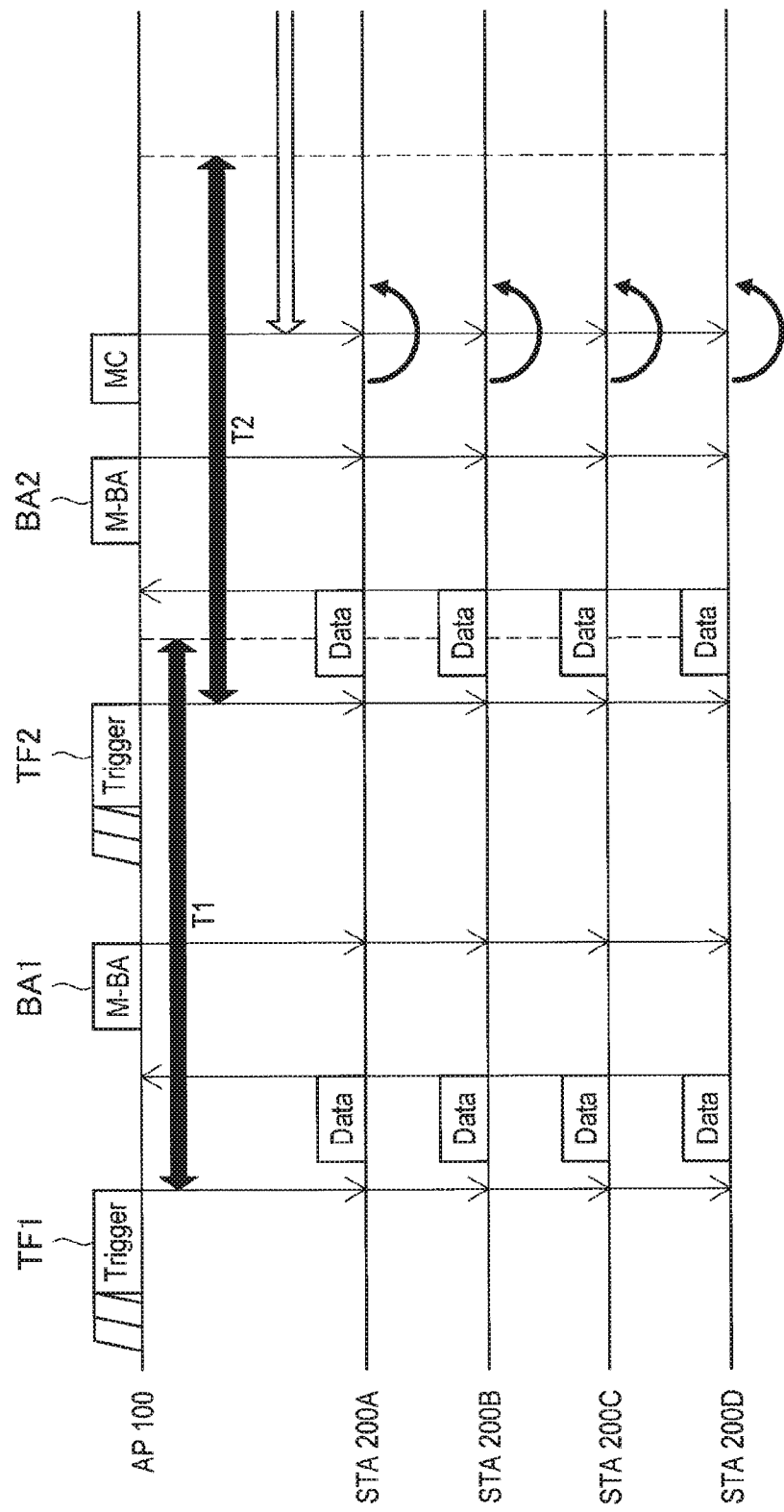
FIG. 19 is a diagram illustrating an example of communication performed by a centralized communication mode in a wireless system according to an embodiment of the present disclosure.

FIG. 19 is a diagram illustrating an example of the operation of the AP 100 and the STA 200 in the case where information giving an instruction for immediate transition from the centralized communication mode to another mode or information indicating that the next trigger frame is not going to be transmitted in the duration designated by the trigger frame is added to the MC frame. Note that basic operation of the AP 100 and the STA 200 in FIG. 19 is similar to the operation of the AP 100 and the STA 200 in FIG. 18. Furthermore, in FIG. 19, the operation until the STA 200A to 200D receives the trigger frame (TF2) is similar to the operation of the AP 100 and the STA 200 in FIG. 18.

In FIG. 19, the STA 200A to 200D transmit data using the resource set by the trigger frame (TF2), and then, receives the M-BA frame (BA2) from the AP 100. Next, the AP 100 transmits the MC frame providing notification of the transition from the centralized communication mode to another mode, to the STAs 200A to 200D. Here, information giving an instruction for immediate transition from the centralized communication mode to another mode or information indicating that the next trigger frame is not going to be transmitted in the duration designated by the trigger frame is added to the MC frame, as the transition information.

After receiving the MC frame, the STA 200A to 200D immediately transition to another mode in accordance with the transition information contained in the MC frame. That is, in a case where the transition information added to the M-BA frame (BA2) is either the information giving an instruction for immediate transition from the centralized communication mode to another mode or the information indicating that the next trigger frame is not going to be transmitted in the duration designated by the trigger frame, the STA200A to 200D immediately transition to another mode in accordance with this information.

Figure 20:
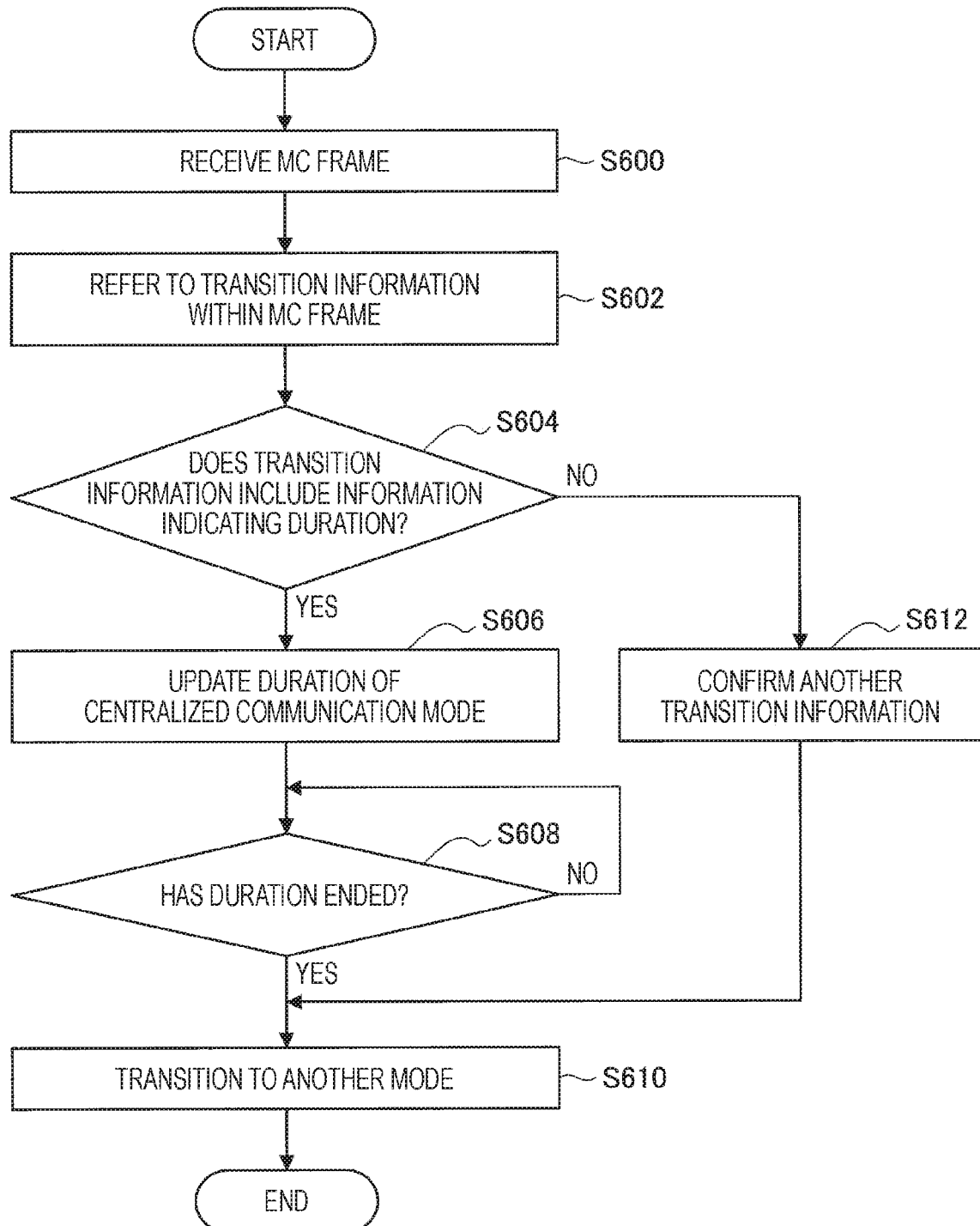
FIG. 20 is a flowchart illustrating an example of processing in a station according to an embodiment of the present disclosure.

FIG. 20 is a flowchart illustrating processing of the STA 200 that performs the operation described in FIGS. 18 and 19. First, in S600, the STA 200 receives an MC frame from the AP 100. Furthermore, the STA 200 in S602 refers to the transition information in the MC frame.

Next, in S604, the STA 200 determines whether or not the added transition information is information regarding the duration of the centralized communication mode. In a case where the added transition information is information regarding the duration of the centralized communication mode in S604, the processing proceeds to S606. In S606, the STA 200 updates the duration of the centralized communication mode on the basis of the transition information referred to in S604.

In S608, the STA 200 determines whether or not the duration updated in S606 has ended. In S608, in a case where the STA 200 determines that the duration has ended, the processing proceeds to S610, and then, the STA 200 transitions from the centralized communication mode to another mode.

Note that in a case where the transition information is not information indicating the duration of the centralized communication mode in S604, the processing proceeds to S612. In S612, the STA 200 makes confirmation of other transition information. Here, the other transition information is either the information giving an instruction for immediate transition from the centralized communication mode to another mode or the information indicating that the next trigger frame is not going to be transmitted in the duration designated by the trigger frame. When these pieces of transition information are confirmed in S608, the processing proceeds to S610, and then, the STA 200 transitions to another mode.

In the modification described above, the AP 100 determines whether or not to continue the centralized communication mode, arranges the transition information regarding the transition from the centralized communication mode to another mode in the MC frame, and transmits the MC frame to the STA 200. With this configuration, in a case where the duration of the centralized communication mode designated by the trigger frame becomes inappropriate, it is possible to provide notification of the transition to another mode by the MC frame. Furthermore, the MC frame may be transmitted in preference to other frames. For example, the MC frame may be transmitted at an interval of Short Interframe Space (SIFS) after the AP 100 transmits the M-BA frame. This enables the STA 200 to transition to another mode with higher reliability.

Furthermore, in the above example, the transition information is arranged in a region of the MC frame that can be referred to by all the STAs 200. Furthermore, the MC frame may be transmitted to all the STAs 200 under the control of the AP 100, or may be individually transmitted to each of the STAs 200. For example, the MC frame may be transmitted to the STA 200D in the example of FIGS. 18 and 19. This configuration enables communication control to be performed with higher flexibility.

5. Second Embodiment (5-1. First Operation Example of Second Embodiment)

The above description is the embodiment in which the transition information is arranged in the region of the frame that can be referred to by all the STAs 200. Alternatively, however, the transition information may be arranged in a region of a frame that can be individually referred to by each of the STAs 200. With this arrangement, the AP 100 can instruct each of the STAs 200 under the control of the AP 100 on different types of operation.

Figure 21:
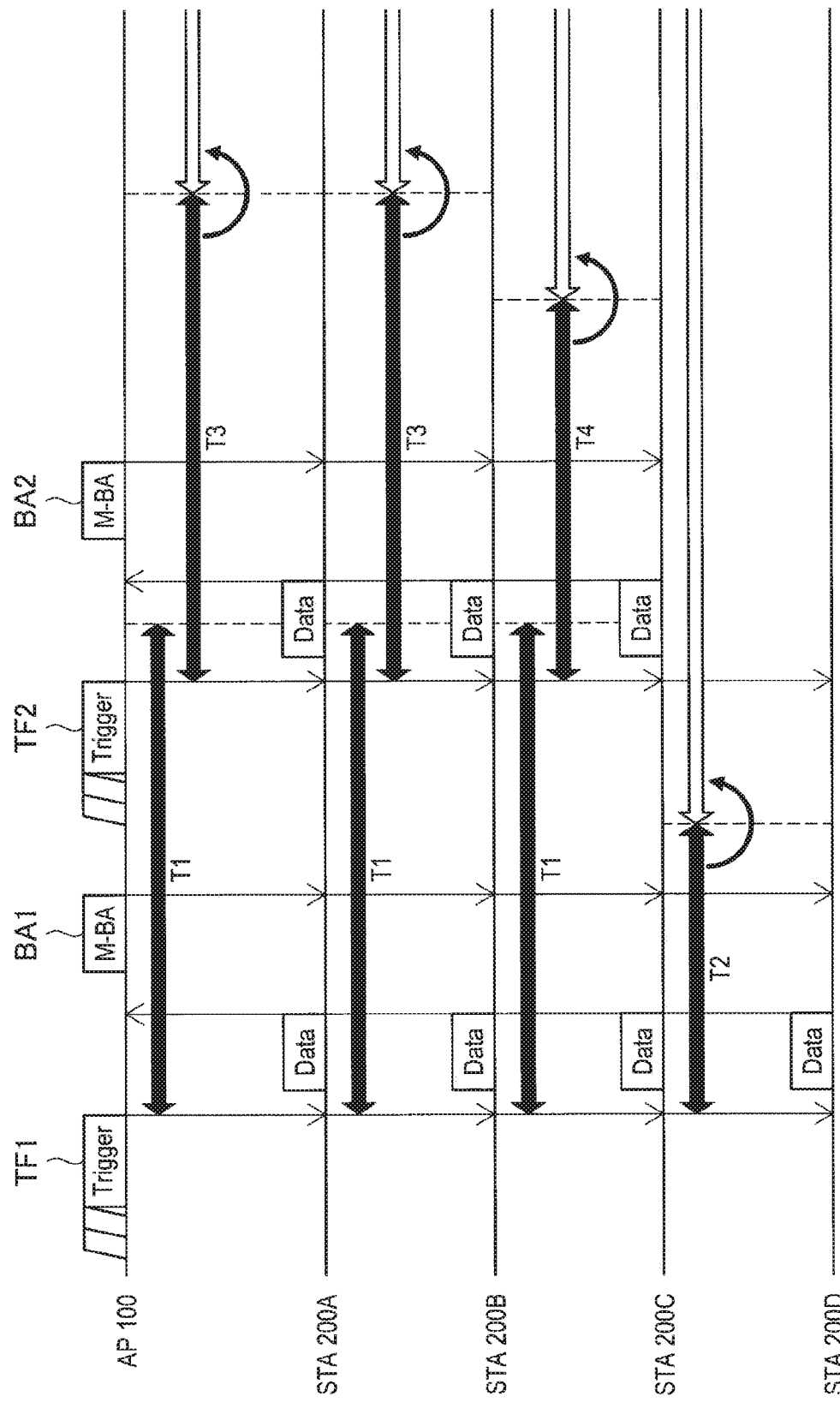
FIG. 21 is a diagram illustrating an example of communication performed by a centralized communication mode in a wireless system according to an embodiment of the present disclosure.

FIG. 21 is a diagram illustrating operation of the AP 100 and the STA 200 in a case where the AP 100 transmits different types of transition information to each of the STAs 200. In FIG. 21, the AP 100 transmits the trigger frame (TF1) to the STAs 200A to 200D, and then, the STAs 200A to 200D enter the centralized communication mode.

Here, the AP 100 transmits the trigger frame (TF1) containing the transition information to the region of the trigger frame (TF1) that can be individually referred to by the STAs 200A to 200D. In FIG. 21, the AP 100 arranges the information that defines the length of the duration for the STA 200A, 200B, and 200C as T1 in the region of the trigger frame (TF1) that can be referred to individually by the STAs 200A to 200D. Furthermore, the AP 100 arranges the information that defines the length of the duration for the STA 200D as T2 in the region of the trigger frame (TF1) that can be referred to individually by the STAs 200A to 200D.

After receiving the trigger frame (TF1), the STA 200A to 200D refer to a region that can be referred to individually by the STA 200A to 200D, and set the duration of the centralized communication mode in accordance with the transition information included in the region. Specifically, the STAs 200A to 200C continue the centralized communication mode in the duration (T1), while the STA 200D continues the centralized communication mode in the duration (T2).

Next, the STA 200A to 200D transmit data using the resource set by the trigger frame (TF1), and receive the M-BA frame (BA1) from the AP 100.

After receiving the M-BA frame (BA1), the STA 200D terminates the duration (T2) set by the trigger frame (TF1) without receiving the next trigger frame. Accordingly, the STA 200D transitions to another mode after completion of the duration (T2). Furthermore, the STA 200D that has transitioned to another mode may disregard the trigger frame from the AP 100 for a certain period. Meanwhile, the STAs 200A to 200C receive the next trigger frame (TF2) in the duration (T1) set by the trigger frame (TF1).

In FIG. 21, the trigger frame (TF2) contains information for setting the length of duration to T3 for STA 200A and STA 200B and information for setting the length of duration to T4 for the STA 200C. Subsequently, after receiving the trigger frame (TF2), the STAs 200A and 200B update the length of the duration of the centralized communication mode to T3, while the STA 200C updates the length of the duration of the centralized communication mode to T4.

Next, the STA 200A to 200C transmit data using the resource set by the trigger frame (TF2), and receive the M-BA frame (BA2) from the AP 100. Next, when the durations (T3 and T4) set in the trigger frame (TF2) end, the STAs 200A to 200C transition to another mode.

Note that the AP 100 may set the length of the duration for each of the STAs 200 on the basis of the information supplied from each of the STAs 200. For example, the AP 100 may reduce the duration of the centralized communication mode for the STA 200D on the basis of the fact that the buffer amount of the STA 200D is small. Furthermore, the AP 100 may reduce the duration of the centralized communication mode for the STA 200D on the basis of the fact that the STA 200D transmits, to the AP 100, a request for transition to another mode. Note that the operation of the STA 200 in the above example is similar to the operation illustrated in FIG. 5.

In the above example, the transition information for each of the STAs 200 is arranged in the region of the trigger frame that can be individually referred to by the STA 200. Accordingly, the AP 100 can transmit different transition information to each of the STAs 200. Therefore, the AP 100 can perform more flexible communication control on the STA 200 under the AP 100.

(5-2. Second Operation Example of Second Embodiment)

The above description is an example in which transition information regarding the duration of the centralized communication mode is arranged in the trigger frame. Hereinafter, description follows on an example in which information giving an instruction for immediate transition from the centralized communication mode to another mode or information indicating that the next trigger frame is not going to be transmitted in the duration designated by the trigger frame is added to the trigger frame.

Figure 22:
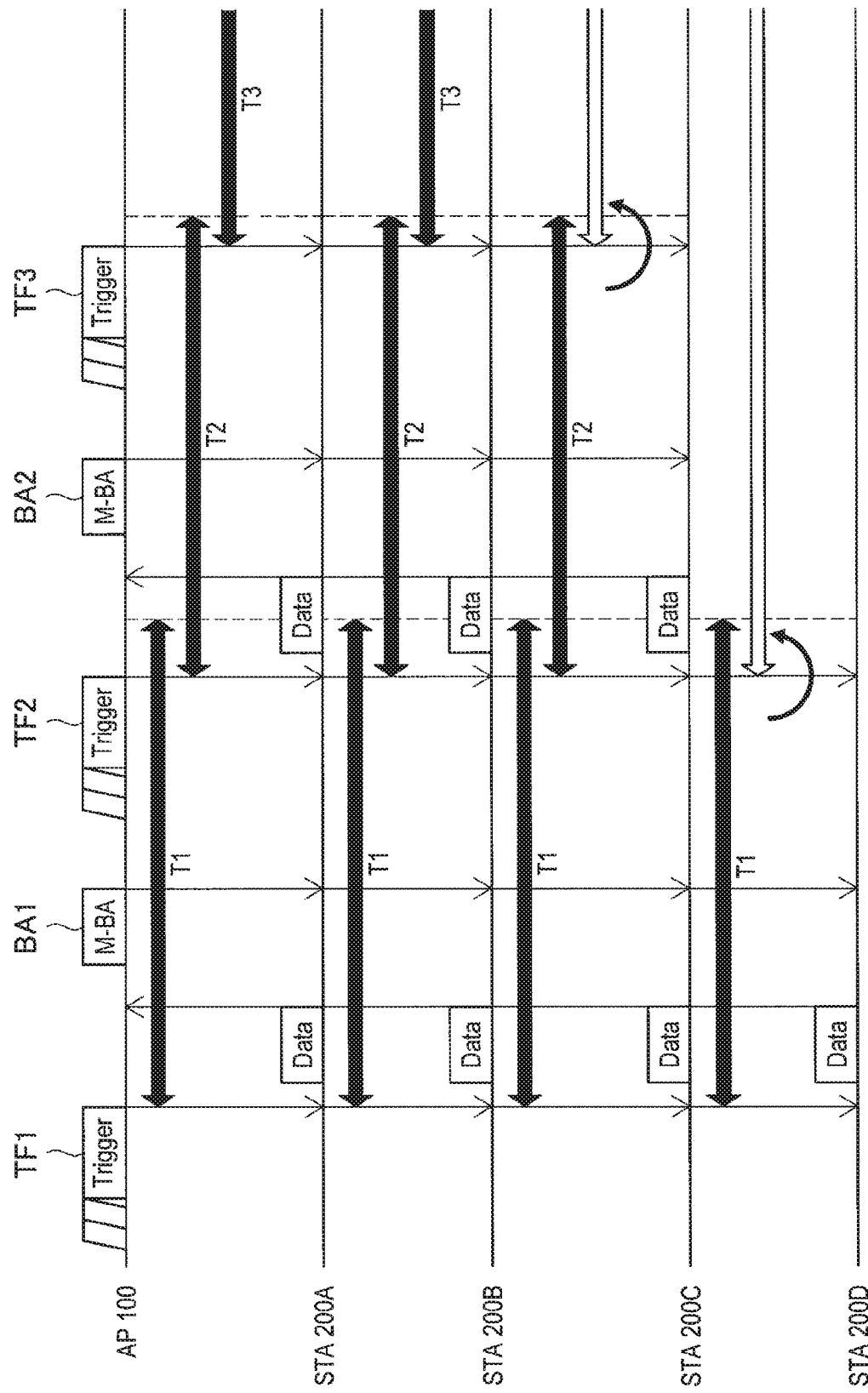
FIG. 22 is a diagram illustrating an example of communication performed by a centralized communication mode in a wireless system according to an embodiment of the present disclosure.

FIG. 22 is a diagram illustrating operation of the AP 100 and the STA 200 in a case where the AP 100 transmits, by the trigger frame, different types of transition information to each of the STAs 200. In FIG. 22, the AP 100 transmits the trigger frame (TF1) to the STAs 200A to 200D, and the STAs 200A to 200D enter the centralized communication mode.

Here, the AP 100 transmits the trigger frame (TF1) containing the transition information to the region of the trigger frame (TF1) that can be individually referred to by the STAs 200A to 200D. In FIG. 22, the AP 100 arranges the information that defines the length of the duration for all the STAs 200A to 200D as T1 in the region of the trigger frame (TF1) that can be referred to individually by the STAs 200A to 200D. Note that here, as illustrated in FIG. 4, the AP 100 may transmit the trigger frame (TF1) after arranging information regarding the duration (T1) in a region that can be referred to by all the STAs 200A to 200D.

Next, after receiving the trigger frame (TF1), the STAs 200A to 200D set the duration (T1) of the centralized communication mode in accordance with the transition information contained in the trigger frame (TF1). The STA 200A to 200D transmit data using the resource set by the trigger frame (TF1) and then, receives the M-BA frame (BA1) from the AP 100.

Next, the AP 100 transmits the next trigger frame (TF2) in the duration (T1) set by the trigger frame (TF1). Here, the AP 100 transmits information regarding the duration (T2) of the next centralized communication mode as the trigger frame (TF2) to the STA 200A to the STA 200C. After receiving the trigger frame (TF2), the STAs 200A to 200C update the length of the duration of the centralized communication mode to T2 in accordance with the transition information contained in the trigger frame (TF2).

Meanwhile, the AP 100 transmits, to the STA 200D, the trigger frame (TF2) containing the information giving an instruction for immediate transition from the centralized communication mode to another mode or the information indicating that the next trigger frame is not going to be transmitted in the duration designated by the trigger frame. In a case where the trigger frame (TF2) contains the information giving an instruction for immediate transition from the centralized communication mode to another mode, the STA 200D immediately transitions to another mode after receiving the trigger frame (TF2). Furthermore, in a case where the trigger frame (TF2) contains information indicating that the next trigger frame is not going to be transmitted in the duration designated by the trigger frame, and where the STA 200D is not permitted to perform data transmission by the trigger frame (TF2), the STA 200D transitions to another mode. Furthermore, in a case where the data transmission is permitted by the trigger frame (TF2), the STA 200D may update the duration and transmit data, and may thereafter transition to another mode. Furthermore, the STA 200D that has transitioned to another mode may disregard the trigger frame from the AP 100 for a certain period. FIG. 22 illustrates a case where data transmission in the trigger frame (TF2) is not permitted for the STA 200D.

The STAs 200A to 200C transmit a next trigger frame (TF3) in the duration (T2) set by the trigger frame (TF2). Here, the AP 100 transmits information regarding the duration (T3) of the next centralized communication mode as the trigger frame (TF3) to the STA 200A and the STA 200B. After receiving the trigger frame (TF3), the STAs 200A and 200B update the length of the duration of the centralized communication mode to T3 in accordance with the transition information contained in the trigger frame (TF3).

Meanwhile, the AP 100 transmits, to the STA 200C, the trigger frame (TF3) containing the information giving an instruction for immediate transition from the centralized communication mode to another mode or the information indicating that the next trigger frame is not going to be transmitted in the duration designated by the trigger frame. At this time, the STA 200C operates similarly to the operation of the STA 200D onto the above-described trigger frame (TF2). Note that the operation of the STA 200 in the above example is similar to the operation illustrated in FIG. 7 or 9.

Figure 23:
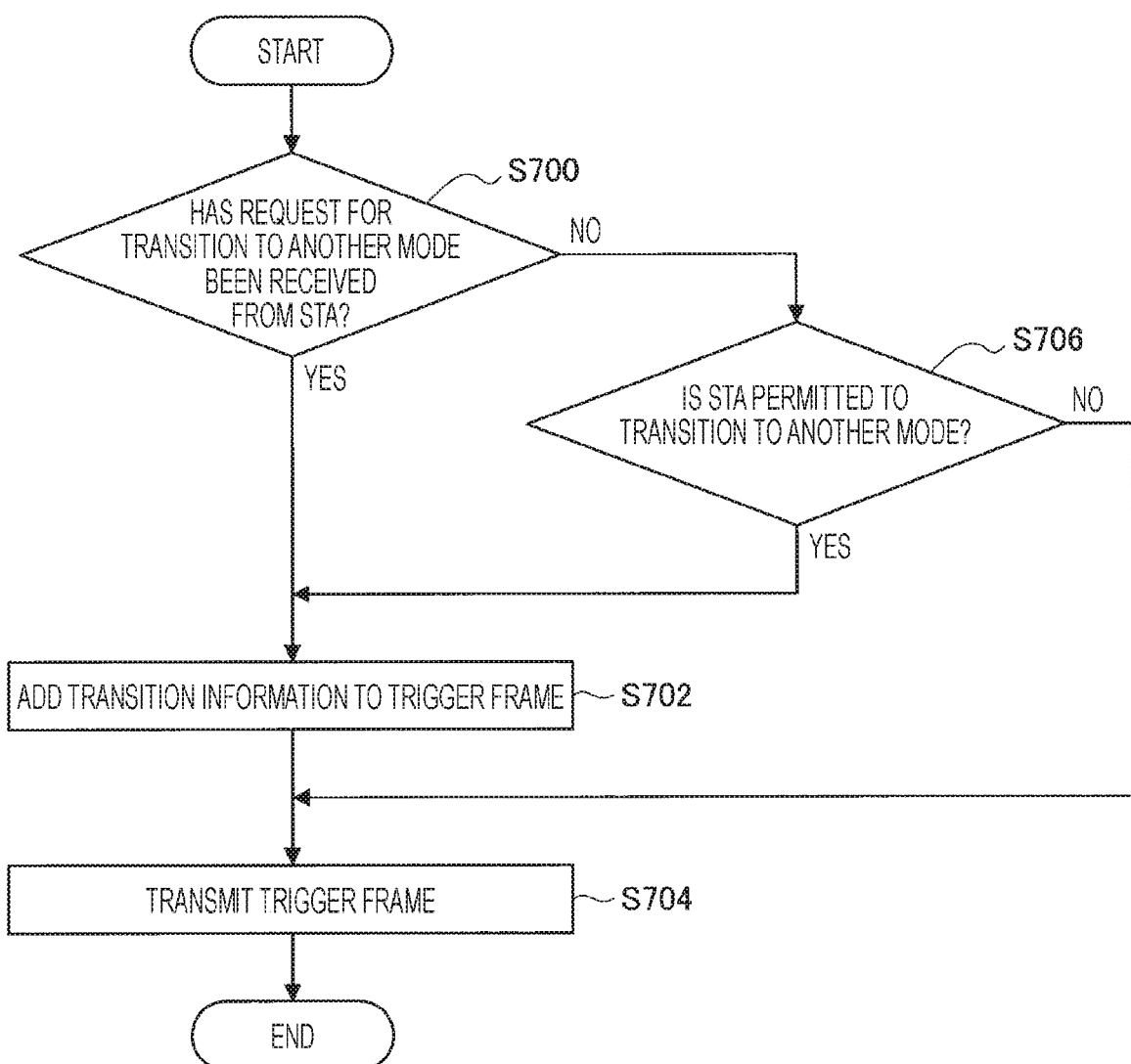
FIG. 23 is a flowchart illustrating an example of processing in an access point according to an embodiment of the present disclosure.

The above description is an example of operation in which the AP 100 arranges the transition information different for each of the STAs 200 in the region of the trigger frame that can be individually referred to by the STA 200. Hereinafter, details of the processing of the AP 100 that performs the above-described operation will be described. FIG. 23 is a diagram illustrating an example of the operation of the AP 100 in the second embodiment.

First, in S 700, the AP 100 determines whether or not a request for transitioning from the centralized communication mode to another mode is received from the STA 200. For example, in a case where the STA 200 wishes to enter the power saving mode, the STA 200 transmits, to the AP 100, a request for transitioning from the centralized communication mode to another mode. Here, whether or not the STA 200 enters the power saving mode may be determined on the basis of the state of the STA 200. For example, in a case where the buffer amount of the STA 200 is small, the STA 200 may wish to enter the power saving mode.

Furthermore, in a case where the STA 200 wishes to connect to another access point because of weak field strength, the STA 200 may transmit a request for transitioning from the centralized communication mode to another mode to the AP 100. Furthermore, in a case where the STA 200 wishes to perform autonomous decentralized communication, the STA 200 may transmit, to the AP 100, a request for transitioning from the centralized communication mode to another mode.

In S700, in a case where a request for transitioning from the centralized communication mode to another mode is received from the STA 200, the processing proceeds to S702. In S702, the AP 100 adds transition information to the trigger frame on the basis of the request from the STA 200 received in S700. For example, the AP 100 may add, to the trigger frame, transition information for reducing the duration of the centralized communication mode regarding the transition information for the STA 200 that has transmitted the request for transitioning from the centralized communication mode to another mode. Next, in S704, the AP 100 transmits the trigger frame to which the transition information has been added.

In S700, in a case where the request for transitioning from the centralized communication mode to another mode has not been received from the STA 200, the processing proceeds to S706. In S706, the AP 100 determines whether or not each of the STAs 200 is permitted to transition to another mode.

Here, for example, the AP 100 may determine that the STA 200 with buffer being 0 may transition from the centralized communication mode to another mode. Furthermore, the AP 100 may determine that the STA 200 that fails to transmit data in the centralized communication mode may transition from the centralized communication mode to another mode. This may be determined on the basis of an error rate of the data transmitted by the STA 200.

In S706, in a case where there is the STA 200 determined to be able to transition from the centralized communication mode to another mode, the processing proceeds to S702. In S702, the AP 100 then adds the transition information to the trigger frame on the basis of the determination in S706. For example, the AP 100 may add, to the trigger frame, transition information for reducing the duration of the centralized communication mode regarding the transition information for the STA 200 that has been determined to have a permission to transition from the centralized communication mode to another mode. Next, in S704, the AP 100 transmits the trigger frame to which the transition information has been added.

The above description is an example in which the transition information is arranged in the region of the trigger frame that can be individually referred to by the STA 200. In the following, the position, within a frame, of the transition information added to the trigger frame in the above example will be described. FIG. 24 is a diagram illustrating information arranged in "Per User Info" of the trigger frame illustrated in FIG. 10.

In FIG. 24, "User Identifier" is a region indicating the Association ID (AID) of the STA 200 that performs transmission in accordance with the trigger frame from the AP 100. Furthermore, "RU Allocation" is a region indicating a resource used for transmission performed by the STA 200 identified by User Identifier. Furthermore, "Coding Type" is a region indicating a coding scheme of the PPDU transmitted by the STA 200 identified by User Identifier. Furthermore, "MCS" is a region indicating MCS of the PPDU transmitted by the STA 200 identified by User Identifier. Furthermore, "DCM" is a region indicating whether or not to use dual carrier modulation in the PPDU transmitted by the STA 200 identified by User Identifier. Furthermore, "SS allokation" is a region indicating information regarding the spatial stream of the PPDU transmitted by the STA 200 identified by User Identifier. Furthermore, "Trigger-dependent Per User Info" is a region containing information corresponding to the type of trigger frame.

In addition, the transition information for each of the STAs 200 is arranged after "Trigger-dependent Per User Info", as an example.

(5-3. Third Operation Example of Second Embodiment)

The above description is an example in which transition information regarding transition from the centralized communication mode to another mode is arranged in the trigger frame. The following will describe an example in which transition information for each of the STAs 200 is transmitted in M-BA frame.

Figure 25:
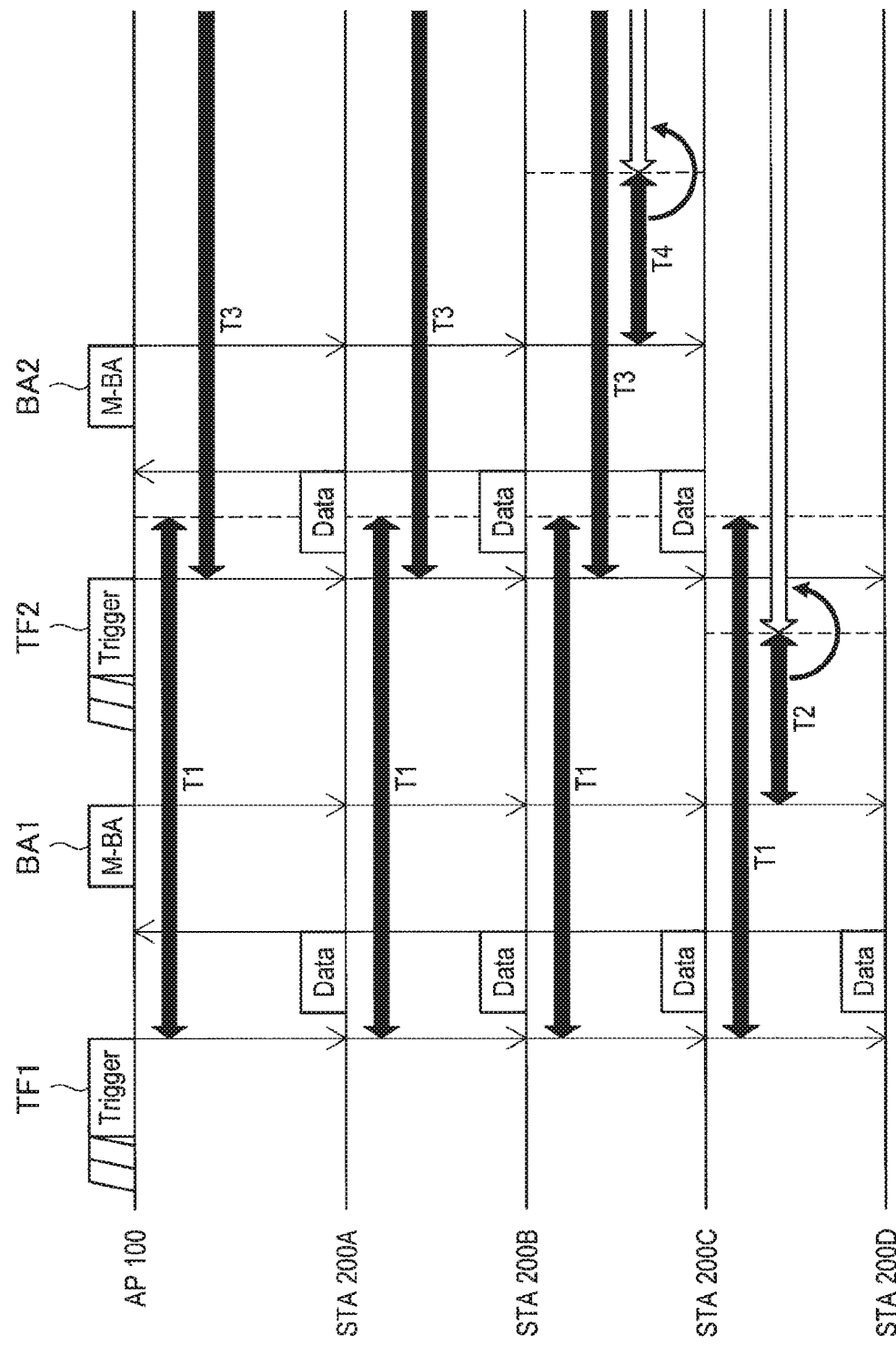
FIG. 25 is a diagram illustrating an example of communication performed by a centralized communication mode in a wireless system according to an embodiment of the present disclosure.

FIG. 25 is a diagram illustrating operation of the AP 100 and the STA 200 in a case where the AP 100 transmits, by the M-BA frame, different types of transition information to each of the STAs 200. In FIG. 25, the AP 100 transmits the trigger frame (TF1) to the STAs 200A to 200D, and then, the STAs 200A to 200D enter the centralized communication mode. In FIG. 25, the STAs 200A to 200D that have received the trigger frame (TF1) set the duration of the centralized communication mode to the duration (T1). Note that the AP 100 may arrange information regarding the duration (T1) in the region of the trigger frame (TF1) that can be referred to by all the STAs 200A to 200D or in the region of the trigger frame (TF1) that can be individually referred to by the STAs 200A to 200D, and may transmit the trigger frame (TF1).

Next, the STA 200A to 200D transmit data using the resource set by the trigger frame (TF1), and receive the M-BA frame (BA1) from the AP 100.

Here, the AP 100 transmits the M-BA frame (BA1) including the transition information to the region of the M-BA frame (BA1) that can be individually referred to by the STAs 200A to 200D. In FIG. 25, the AP 100 arranges the transition information with the length of the duration of the STA 200D as T2 in the region of the M-BA frame (BA1) that can be individually referred to by the STAs 200A to 200D. Meanwhile, the AP 100 transmits the M-BA frame (BA1) without arranging the transition information for the other STAs 200A to 200C in the M-BA frame (BA1).

Next, the STA 200D that referred to the transition information in the M-BA frame (BA1) updates the length of the duration to T2. Furthermore, the STA 200D does not receive the next trigger frame during this duration (T2), and thus, switches to another mode after the end of the duration (T2). Furthermore, the STA 200D that has transitioned to another mode may disregard the trigger frame from the AP 100 for a certain period.

The STAs 200A to 200C receive the next trigger frame (TF2) in the duration (T1) set by the trigger frame (TF1). Here, the AP 100 transmits transition information having set the length of the duration of the next centralized communication mode to T3 by the trigger frame (TF2) to the STA 200A to the STA 200C. After receiving the trigger frame (TF2), the STAs 200A to 200C update the length of the duration of the centralized communication mode to T3 in accordance with the transition information contained in the trigger frame (TF2).

Next, the STA 200A to 200D transmit data using the resource set by the trigger frame (TF2), and receive the M-BA frame (BA2) from the AP 100.

Here, similarly to the above-described STA 200D, the AP 100 arranges the transition information with the length of the duration of the STA 200C set to T4 in the region of the M-BA frame (BA2) that can be individually referred to by the STAs 200A to 200D. Next, the STA 200C that refers to the transition information in the M-BA frame (B2) updates the length of the duration to T4. Furthermore, the STA 200D does not receive the next trigger frame during this duration (T4), and thus, switches to another mode after the end of the duration (T4). Note that the operation of the STA 200 in the above example is similar to the operation illustrated in FIG. 5.

Furthermore, the AP 100 may arrange, in the M-BA frame, information giving an instruction for immediate transition from the centralized communication mode to another mode or information indicating that the next trigger frame is not going to be transmitted frame in the duration designated by the trigger frame.

Figure 26:
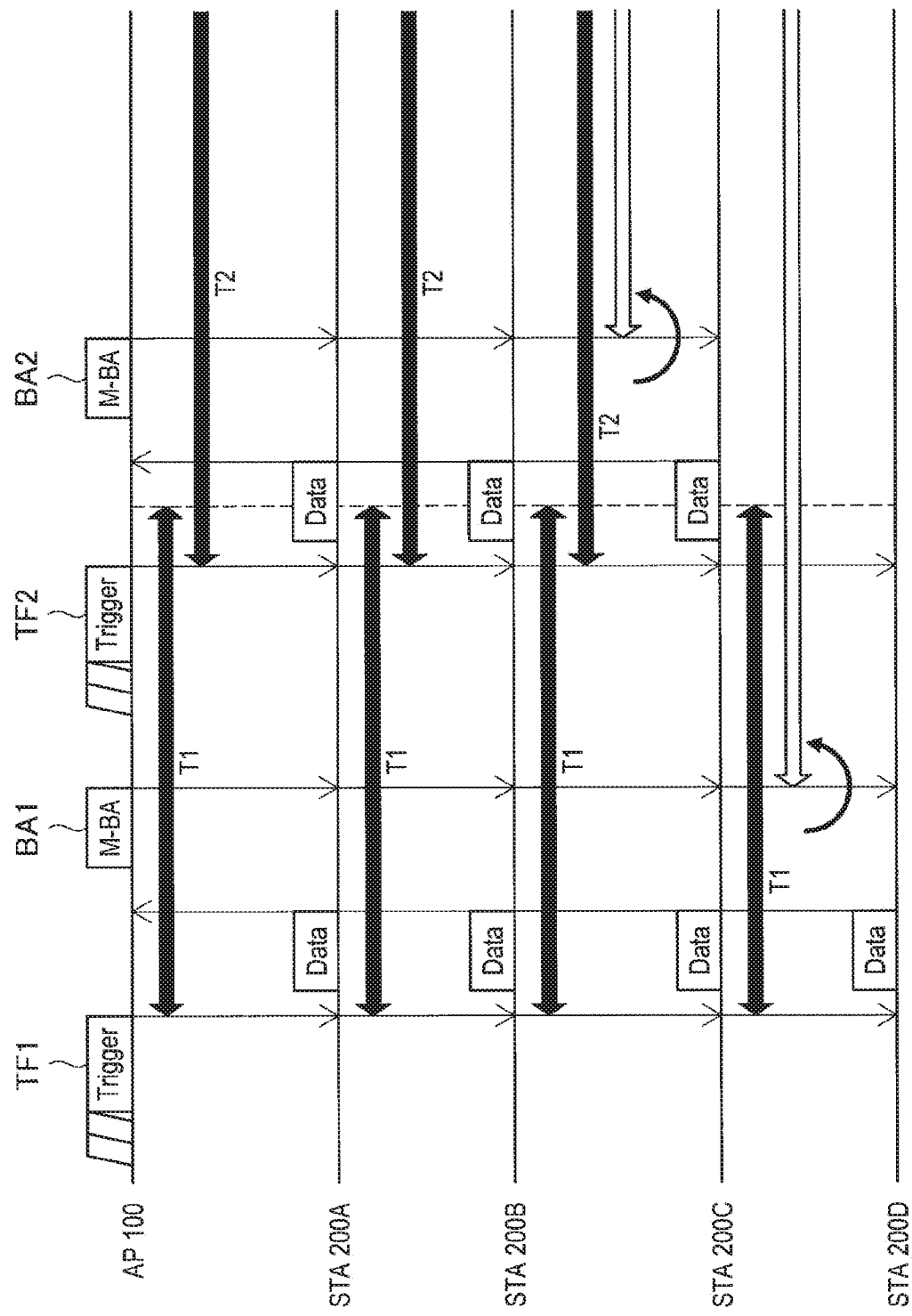
FIG. 26 is a diagram illustrating an example of communication performed by a centralized communication mode in a wireless system according to an embodiment of the present disclosure.

FIG. 26 is a diagram illustrating an example of the operation of the AP 100 and the STA 200 in the case where information giving an instruction for immediate transition from the centralized communication mode to another mode or information indicating that the next trigger frame is not going to be transmitted in the duration designated by the trigger frame is added to the M-BA frame region that can be individually referred to by the STA 200.

Note that, in FIG. 26, in a case where the transition information included in the M-BA frame (BA1) is information indicating that the next trigger frame is not going to be transmitted in the duration designated by the trigger frame, the trigger frame (TF2) is not to be transmitted.

In FIG. 26, the AP 100 transmits the trigger frame (TF1) to the STAs 200A to 200D, and the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

Here, the AP 100 arranges, in a region of the M-BA frame (BA1) that can be individually referred to by the STAs 200A to 200D, information instructing the STA 200D for immediate transition from the centralized communication mode to another mode, or information indicating that the next trigger frame is not going to be transmitted in the duration designated by the trigger frame, and transmits the M-BA frame (BA1). Next, the STA 200D refers to the transition information in the M-BA frame (BA1) and switches to another mode. Furthermore, the STA 200D that has transitioned to another mode may disregard the trigger frame from the AP 100 for a certain period.

The STAs 200A to 200C receive the next trigger frame (TF2) in the duration (T1) set by the trigger frame (TF1). Here, the AP 100 transmits transition information having set the length of the duration of the next centralized communication mode to T2 by the trigger frame (TF2) to the STA 200A to the STA 200C. After receiving the trigger frame (TF2), the STAs 200A to 200C update the length of the duration of the centralized communication mode to T2 in accordance with the transition information contained in the trigger frame (TF2).

Here, similarly to the above-described STA 200D, the AP 100 arranges, in a region of the M-BA frame (BA2) that can be individually referred to by the STAs 200A to 200D, information instructing the STA 200C for immediate transition from the centralized communication mode to another mode, or information indicating that the next trigger frame is not going to be transmitted in the duration designated by the trigger frame. Next, the STA 200C that refers to the transition information in the M-BA frame (BA2) switches to another mode. Note that the operation of the STA 200 in the above example is similar to the operation illustrated in FIG. 7 or 9.

Figure 27:
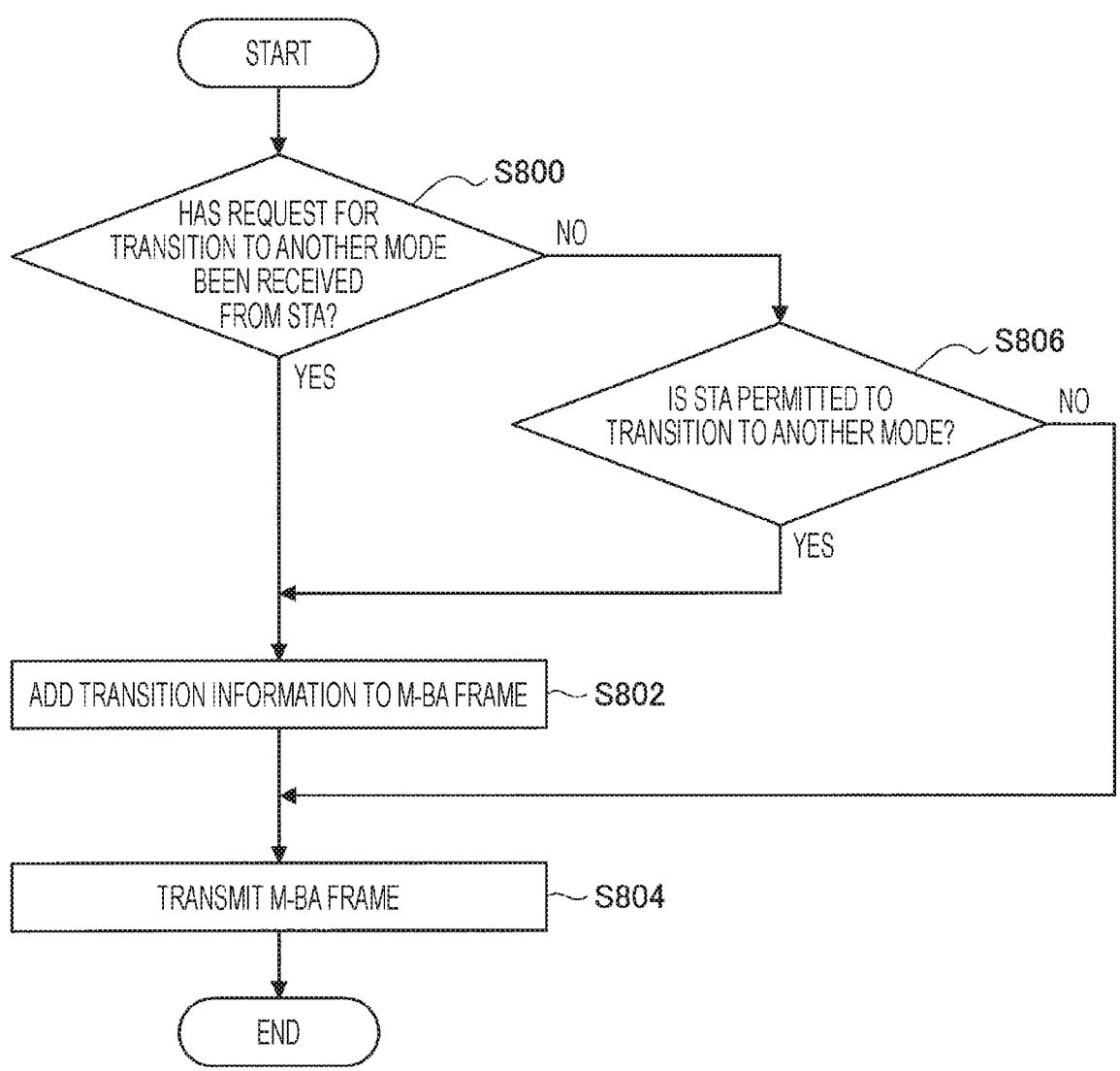
FIG. 27 is a flowchart illustrating an example of processing in an access point according to an embodiment of the present disclosure.

FIG. 27 is a diagram illustrating an example of operation of the AP 100 that performs the above-described operation. Note that S800 to S806 in FIG. 27 respectively correspond to S700 to S706 in FIG. 23, and thus, detailed description is omitted here. However, in comparison between the processing of FIG. 27 and the processing of FIG. 23, transition information is added to the M-BA frame in S802, while transition information is added to the trigger frame in S702.

Figure 28:
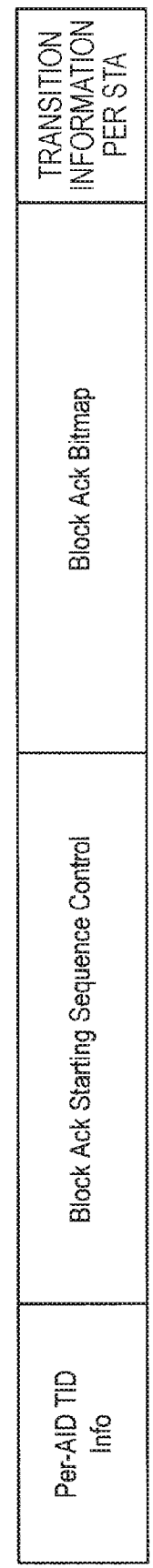
FIG. 28 is a diagram illustrating an example of a format of an M-BA frame in an embodiment of the present disclosure.

FIG. 28 is a diagram illustrating information arranged in "Per STA Info Subfield" in "BA Information" of the M-BA frame illustrated in FIG. 16.

In FIG. 28, "Per-AID TID Info" is a region that stores setting for Block Ack Starting Sequence Control and Block Ack Bitmap, and information of AID and TID. Furthermore, "Block Ack Starting Sequence Control" is a region that stores information regarding the start sequence control of Block Ack. Furthermore, "Block Ack Bitmap" is a region for acknowledgment within the A-MPDU.

In addition, transition information for each of the STAs 200 is arranged after "Block Ack Bitmap", as an example.

As described above, in the present embodiment, the transition information is arranged in the region of the M-BA frame that can be individually referred to by the STAs 200. With this configuration, the AP 100 can perform appropriate communication control in accordance with the individual situation of the STAs 200 under the AP 100.

(5-4. Fourth Operation Example of Second Embodiment)

The above description is an example in which the transition information regarding transition from the centralized communication mode to another mode is arranged in the region of the M-BA frame that can be individually referred to by the STAs 200. In the following, an example will be described in which transition information for each of the STAs 200 is transmitted in an MC frame for notifying that the transition from the centralized communication mode to another mode.

Figure 29:
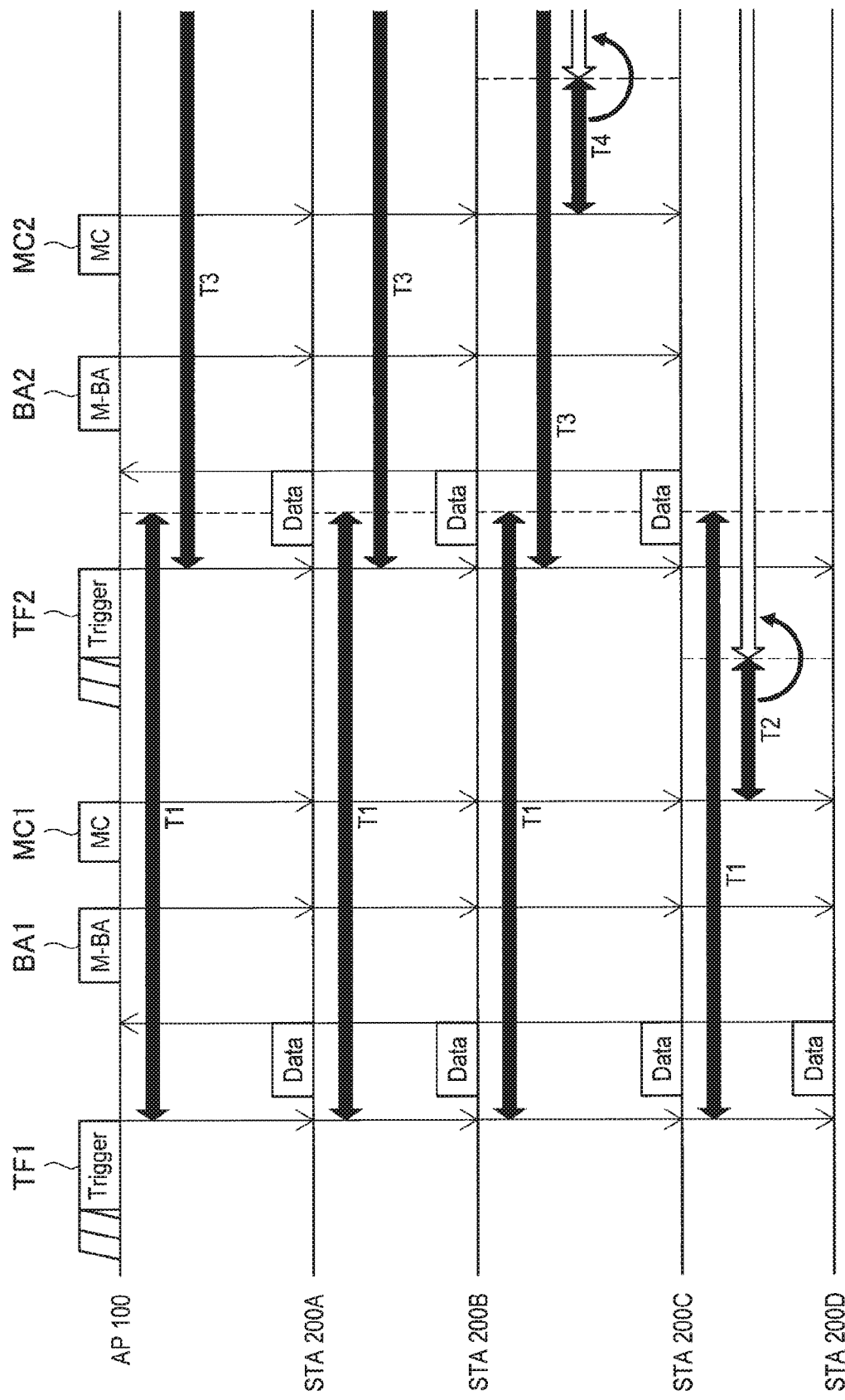
FIG. 29 is a diagram illustrating an example of communication performed by a centralized communication mode in a wireless system according to an embodiment of the present disclosure.

FIG. 29 is a diagram illustrating the operation of the AP 100 and the STA 200 in the case where the transition information regarding the duration of the centralized communication mode is arranged in the region of the MC frame that can be individually referred to by the STAs 200. In FIG. 29, the AP 100 transmits the trigger frame (TF1) to the STAs 200A to 200D, and then, the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

Next, after transmitting the M-BA frame (BA1), the AP 100 transmits an MC frame (MC1) for providing notification of the transition from the centralized communication mode to another mode.

Here, the AP 100 transmits the MC frame (MC1) including the transition information to the region of the MC frame (MC1) that can be individually referred to by the STAs 200A to 200D. In FIG. 29, the AP 100 arranges the transition information with the length of the duration of the STA 200D as T2 in the region of the MC frame (MC1) that can be individually referred to by the STAs 200A to 200D. Meanwhile, the AP 100 transmits the MC frame (MC1) without arranging the transition information for the other STAs 200A to 200C in the MC frame (MC1).

Next, the STA 200D that referred to the transition information in the MC frame (MC1) updates the length of the duration to T2. Furthermore, the STA 200D does not receive the next trigger frame during this duration (T2), and thus, switches to another mode after the end of the duration (T2). Furthermore, the STA 200D that has transitioned to another mode may disregard the trigger frame from the AP 100 for a certain period.

The STAs 200A to 200C receive the next trigger frame (TF2) in the duration (T1) set by the trigger frame (TF1). Here, the AP 100 transmits transition information having set the length of the duration of the next centralized communication mode to T3 by the trigger frame (TF2) to the STA 200A to the STA 200C. After receiving the trigger frame (TF2), the STAs 200A to 200C update the length of the duration of the centralized communication mode to T3 in accordance with the transition information contained in the trigger frame (TF2).

Next, the STA 200A to 200D transmit data using the resource set by the trigger frame (TF2), and receive the M-BA frame (BA2) from the AP 100.

Here, similarly to the above-described STA 200D, the AP 100 arranges the transition information with the length of the duration of the STA 200C set to T4 in the region of the MC frame (MC2) that can be individually referred to by the STAs 200A to 200D. The STA 200C that referred to the transition information in the MC frame (MC2) updates the length of the duration to T4. Furthermore, the STA 200D does not receive the next trigger frame during this duration (T4), and thus, switches to another mode after the end of the duration (T4). Note that the operation of the STA 200 in the above example is similar to the operation illustrated in FIG. 5.

Furthermore, the AP 100 may arrange, in the MC frame, information giving an instruction for immediate transition from the centralized communication mode to another mode or information indicating that the next trigger frame is not going to be transmitted in the duration designated by the trigger frame.

Figure 30:
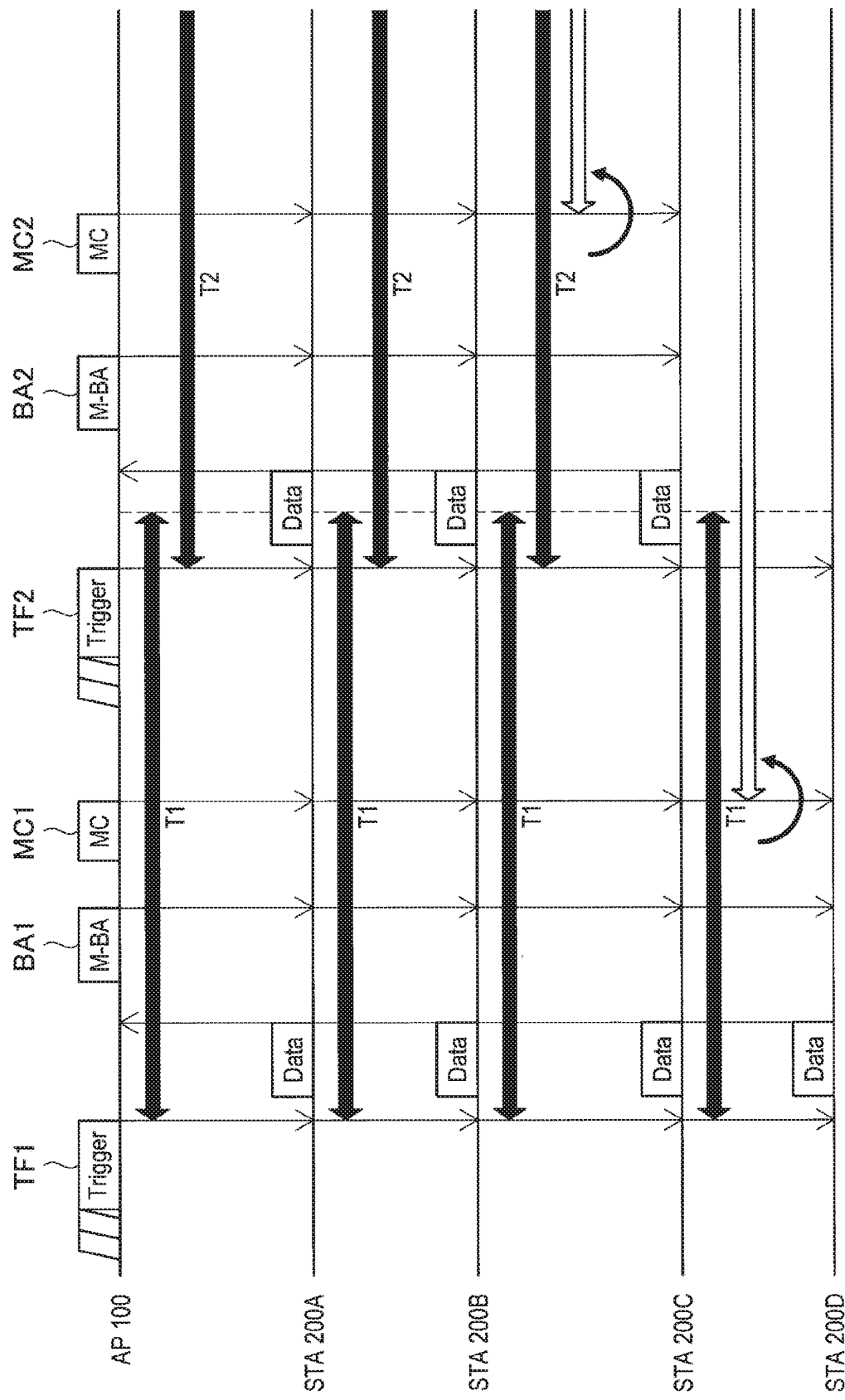
FIG. 30 is a diagram illustrating an example of communication performed by a centralized communication mode in a wireless system according to an embodiment of the present disclosure.

FIG. 30 is a diagram illustrating an example of the operation of the AP 100 and the STA 200 in a case where information giving an instruction for immediate transition from the centralized communication mode to another mode or information indicating that the next trigger frame is not going to be transmitted in the duration designated by the trigger frame is added to the MC frame region that can be individually referred to by the STAs 200.

Note that in FIG. 30, in a case where the transition information included in the MC frame (MC1) is information indicating that the next trigger frame is not going to be transmitted in the duration designated by the trigger frame, the trigger frame (TF2) is not to be transmitted.

In FIG. 30, the AP 100 transmits the trigger frame (TF1) to the STAs 200A to 200D, and then, the STAs 200A to 200D enter the centralized communication mode. In addition, the STAs 200A to 200D continue the centralized communication mode in the duration (T1) included in the trigger frame (TF1). Next, the STA 200A to 200D transmit data using the resource set by the trigger frame (TF1), and receive the M-BA frame (BA1) from the AP 100.

Next, after transmitting the M-BA frame (BA1), the AP 100 transmits an MC frame for providing notification of the transition from the centralized communication mode to another mode.

Here, the AP 100 arranges, in a region of the MC frame (MC1) that can be individually referred to by the STAs 200A to 200D, information instructing the STA 200D for immediate transition from the centralized communication mode to another mode, or information indicating that the next trigger frame is not going to be transmitted in the duration designated by the trigger frame, and transmits the MC frame (MC1). Next, the STA 200D that referred to the transition information in the MC frame (MC1) switches to another mode. Furthermore, the STA 200D that has transitioned to another mode may disregard the trigger frame from the AP 100 for a certain period.

The STAs 200A to 200C receive the next trigger frame (TF2) in the duration (T1) set by the trigger frame (TF1). Here, the AP 100 transmits transition information having set the length of the duration of the next centralized communication mode to T2 by the trigger frame (TF2) to the STA 200A to the STA 200C. After receiving the trigger frame (TF2), the STAs 200A to 200C update the length of the duration of the centralized communication mode to T2 in accordance with the transition information contained in the trigger frame (TF2).

Next, the STA 200A to 200D transmit data using the resource set by the trigger frame (TF2), and receive the M-BA frame (BA2) from the AP 100. Next, after transmitting the M-BA frame (BA2), the AP 100 transmits an MC frame (MC2) for providing notification of the transition from the centralized communication mode to another mode.

Here, similarly to the above-described STA 200D, the AP 100 arranges, in a region of the MC frame (MC2) that can be individually referred to by the STAs 200A to 200D, information instructing the STA 200C for immediate transition from the centralized communication mode to another mode, or information indicating that the next trigger frame is not going to be transmitted in the duration designated by the trigger frame. Next, the STA 200C that referred to the transition information in the MC frame (MC2) switches to another mode. Note that the operation of the STA 200 in the above example is similar to the operation illustrated in FIG. 7 or 9.

Figure 31:
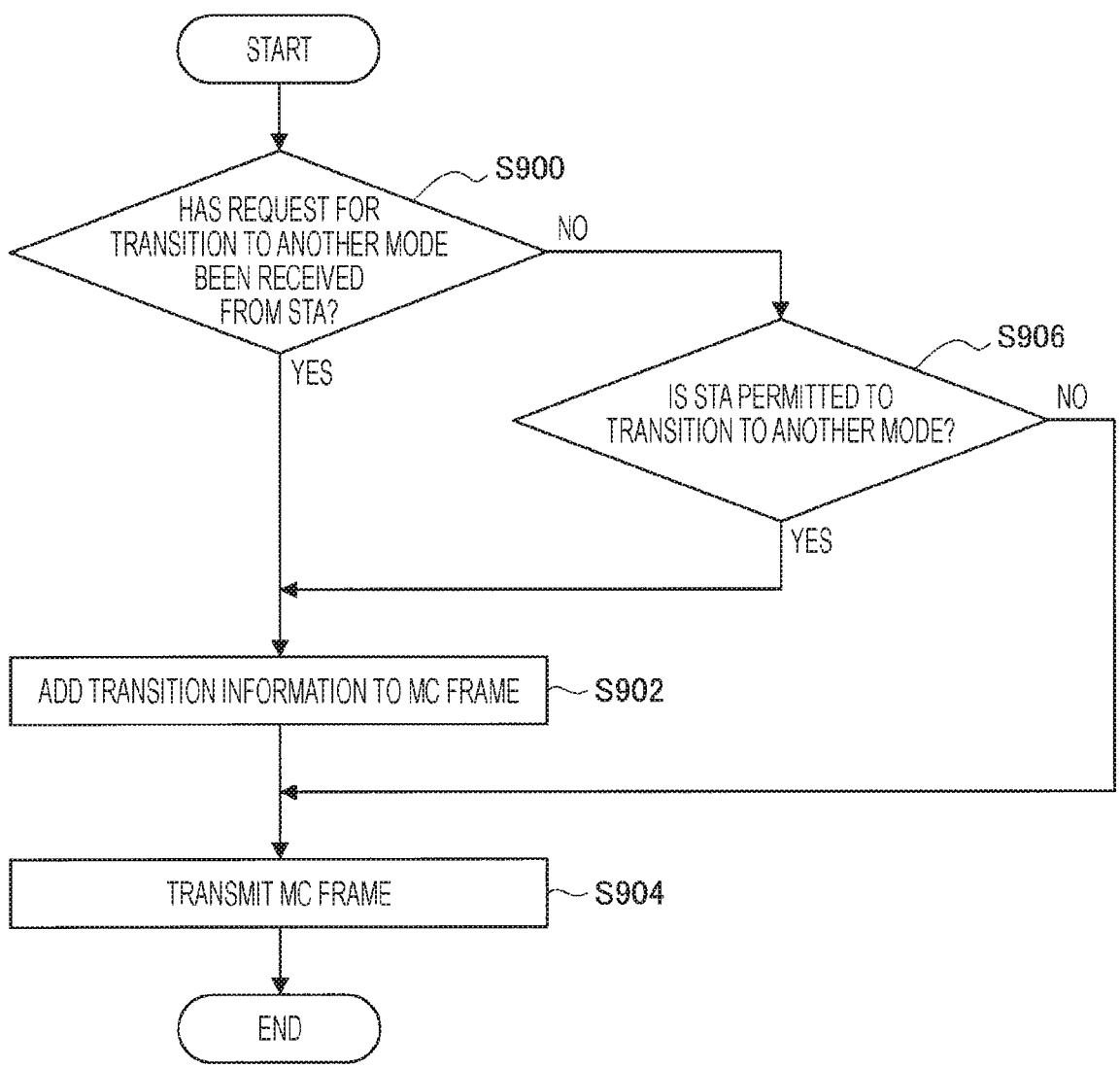
FIG. 31 is a flowchart illustrating an example of processing in an access point according to an embodiment of the present disclosure.

FIG. 31 is a diagram illustrating an example of operation of the AP 100 that performs the above-described operation. Note that S900 to S906 in FIG. 31 respectively correspond to S700 to S706 in FIG. 23, and thus, detailed description is omitted here. However, in comparison between the processing of FIG. 27 and the processing of FIG. 23, transition information is added to the MC frame in S902, while transition information is added to the trigger frame in S702.

As described above, in the present embodiment, the transition information is arranged in the MC frame region that can be individually referred to by the STA 200. With this configuration, the AP 100 can perform appropriate communication control in accordance with the individual situation of the STAs 200 under the AP 100.

7. Third Embodiment

The above description is an example in which transition information is arranged in various frames to be transmitted. The following description is an example in which the STA 200 that has received the transition information determines whether or not to continue the centralized communication mode.

Figure 32:
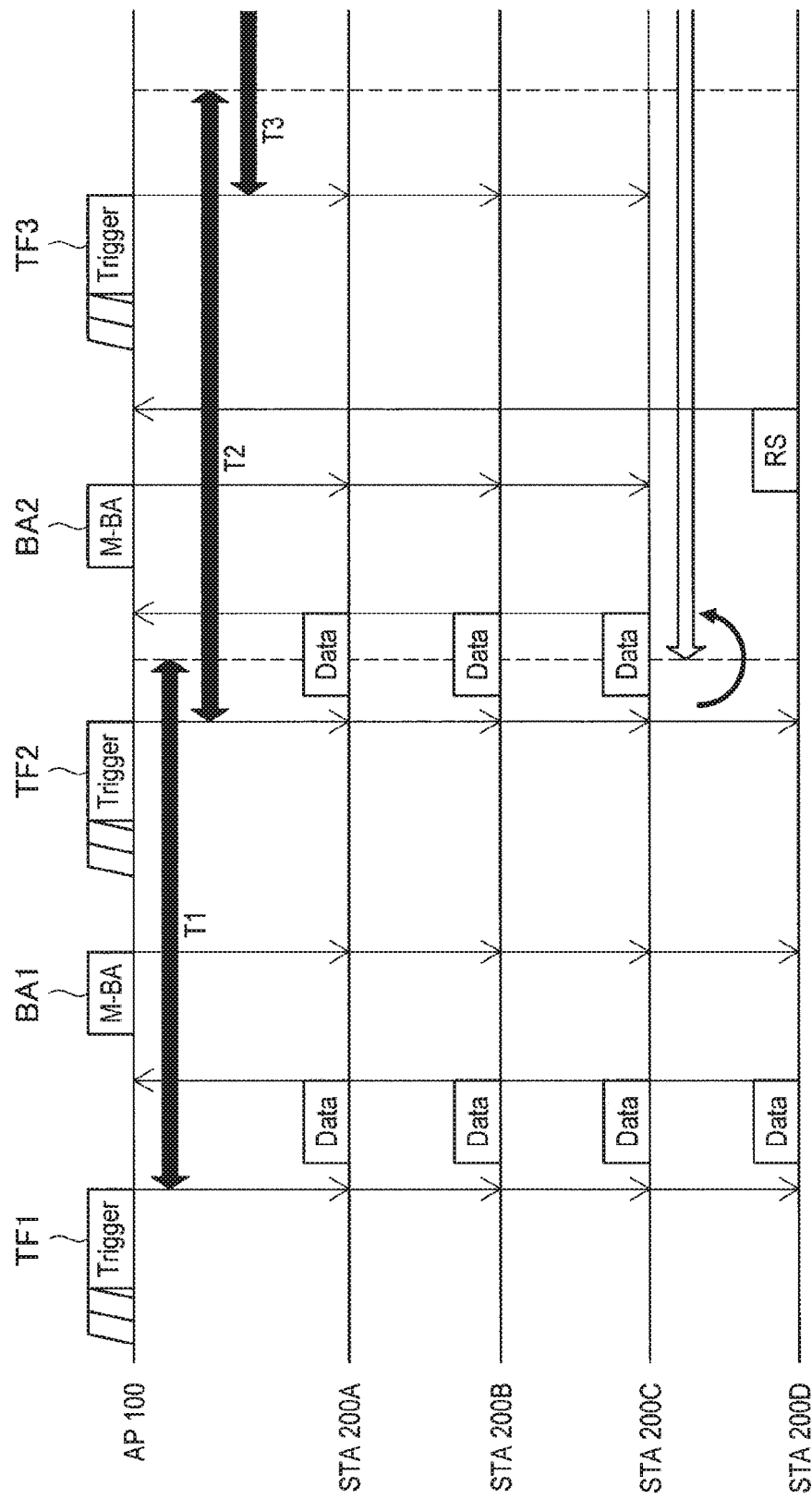
FIG. 32 is a diagram illustrating an example of communication performed by a centralized communication mode in a wireless system according to an embodiment of the present disclosure.

FIG. 32 is a diagram illustrating operation of the AP 100 and the STA 200 in a case where the STA 200 that has received the transition information determines whether or not to continue the centralized communication mode. Note that FIG. 32 illustrates an example in which the transition information is arranged in the region of the trigger frame that can be referred to by all of the STA 200.

In FIG. 32, the AP 100 transmits the trigger frame (TF1) to the STAB 200A to 200D, and then, the STAB 200A to 200D enter the centralized communication mode. In FIG. 32, after receiving the trigger frame (TF1), the STAB 200A to 200D set the length of the duration of the centralized communication mode to T1.

Next, the STA 200A to 200D transmit data using the resource set by the trigger frame (TF1), and receive the M-BA frame (BA1) from the AP 100.

Next, the AP 100 transmits the next trigger frame (TF2) in the duration (T1) set by the trigger frame (TF1). Here, the AP 100 arranges transition information having set the length of the duration of the next centralized communication mode to T2 in the trigger frame (TF2) and transmits the trigger frame (TF2) to the STA 200A to the STA 200C. After receiving the trigger frame (TF2), the STAB 200A to 200C update the length of the duration of the centralized communication mode to T2 in accordance with the transition information contained in the trigger frame (TF2). Next, the STA 200A to 200D transmit data using the resource set by the trigger frame (TF2), and receive the M-BA frame (BA2) from the AP 100.

Meanwhile, when STA 200D has received the trigger frame (TF2), the STA 200D determines whether or not to continue the centralized communication mode. For example, in a case where it is desired to enter the power saving mode, the STA 200D does not obey the transition information received in the trigger frame (TF2) and does not need to update the duration. Here, whether or not the STA 200 enters the power saving mode may be determined on the basis of the state of the STA 200. For example, in a case where the buffer amount of the STA 200D is small, the STA 200D may wish to enter another mode.

Furthermore, in a case where STA 200 wishes to connect to another access point because of weak field strength, the STA 200 does not need to follow the transition information received by the trigger frame (TF2) and does not need to update the duration. Furthermore, in a case where STA 200 wishes to perform autonomous decentralized communication, the STA 200 does not need to obey the transition information received by the trigger frame (TF2) and does not need to update the duration. Accordingly, when the duration (T1) set in the trigger frame (TF1) ends, the STA 200D switches from the centralized communication mode to another mode. Furthermore, the STA 200D that has transitioned to another mode may disregard the trigger frame from the AP 100 for a certain period.

Next, the STA 200D that has switched to another mode without following the transition information received by the trigger frame (TF2) thereafter transmits a reminder signal (RS) indicating that the mode has been switched to another mode, to the AP 100. The AP 100 receives this RS and thereby recognizes that the STA 200D has switched to another mode. Accordingly, the AP 100 need not thereafter perform communication control in the centralized communication mode onto the STA 200D. Specifically, the AP 100 need not allocate resources or the like to the STA 200D in the trigger frame (TF3) of FIG. 32. Note that the above-described RS may be transmitted with priority over other frames. For example, the RS may be transmitted after the SIFS after transmission of the M-BA frame (BA2).

As described above, in the present embodiment, the STA 200 that has received the transition information determines whether or not to continue the centralized communication mode. With this configuration, the STA 200 can flexibly switch from the centralized communication mode to another mode in accordance with the situation. Furthermore, the AP 100 need not perform processing for making determination for switching the STA 200D to another mode. This leads to reduction of the processing load on the AP 100.

Note that the above is an example in which the transition information regarding the duration is arranged and transmitted in the trigger frame. However, in the above example, the transition information arranged in the trigger frame may be other transition information. Furthermore, the frame in which the transition information is arranged may be either an M-BA frame or an MC frame.

Figure 33:
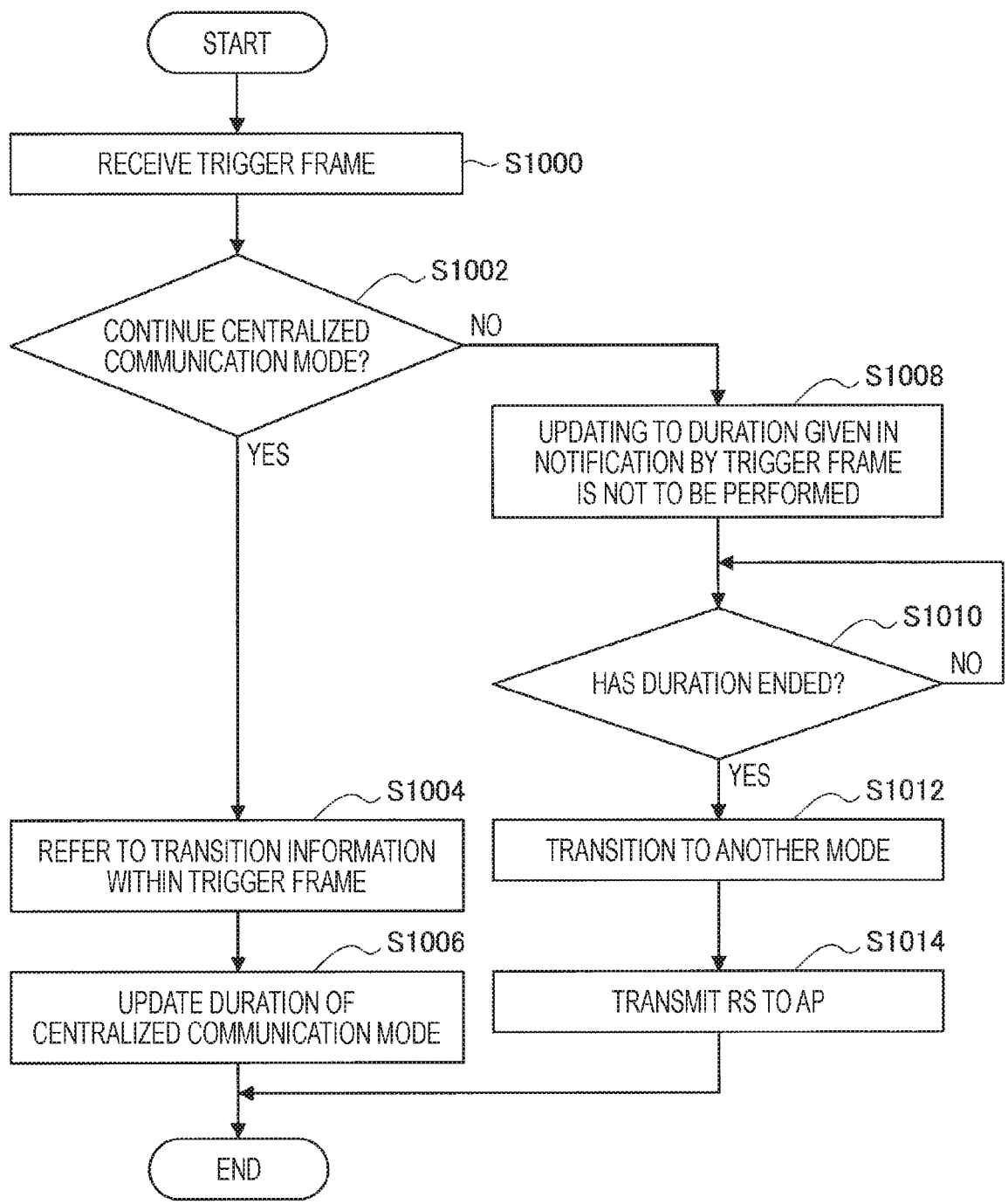
FIG. 33 is a flowchart illustrating an example of processing in a station according to an embodiment of the present disclosure.

FIG. 33 is a flowchart illustrating an example of processing of the STA 200 that performs the above-described operation. Firstly, in ST 1000, the STA 200 receives a trigger frame from the AP 100. Next, in S1002, the STA 200 determines whether or not to continue the centralized communication mode. FIG. 33 illustrates operation in a case where the transition information is information regarding a period during which the centralized communication mode is continued.

In a case where STA 200 determines in S1002 to continue the centralized communication mode, the STA 200 refers to in S1004 the transition information in the trigger frame received in S1000. Next, in S1006, the STA 200 updates the duration of the centralized communication mode on the basis of the transition information that has been referred to.

In contrast, in a case where the STA 200 determines in S1002 not to continue the centralized communication mode, the processing proceeds to S1008. In S1008, the STA 200 does not update the duration set in the trigger frame received in S1000.

In S1010, the STA 200 then repeats the operation of S1010 until the end of the duration set in the previous trigger frame. Next, in a case where the STA 200 determines in S1010 that the duration set in the previous trigger frame has ended, the processing proceeds to S1012, and the STA 200 transitions from the centralized communication mode to another mode.

After transitioning from the centralized communication mode to another mode in S1012, the STA 200 next transmits to the AP100 an RS indicating that the mode has been switched to another mode in S1014.

8. Application Example

The technology according to the present disclosure is applicable to various products. For example, the STA 200 can be implemented as a mobile terminal such as a smartphone, a tablet personal computer (PC), a notebook PC, a portable game terminal or a digital camera, a fixed terminal such as a television receiver, a printer, a digital scanner or a network storage, or in-vehicle terminals such as a car navigation device. Furthermore, the STA 200 may be implemented as a terminal (also referred to as a machine type communication (MTC) terminal) that performs Machine To Machine (M2M) communication, such as a smart meter, a vending machine, a remote monitoring device or a Point Of Sale (POS) terminal. Furthermore, the STA 200 may be a wireless communication module (for example, an integrated circuit module formed of one die) mounted on these terminals.

Meanwhile, the AP 100 may be implemented as a wireless LAN access point (also referred to as a wireless base station) with/without a router function. Furthermore, the AP 100 may be implemented as a mobile wireless LAN router. Furthermore, the AP 100 may be a wireless communication module (for example, an integrated circuit module formed of one die) mounted on these devices.

(8-1. First Application Example)

Figure 34:
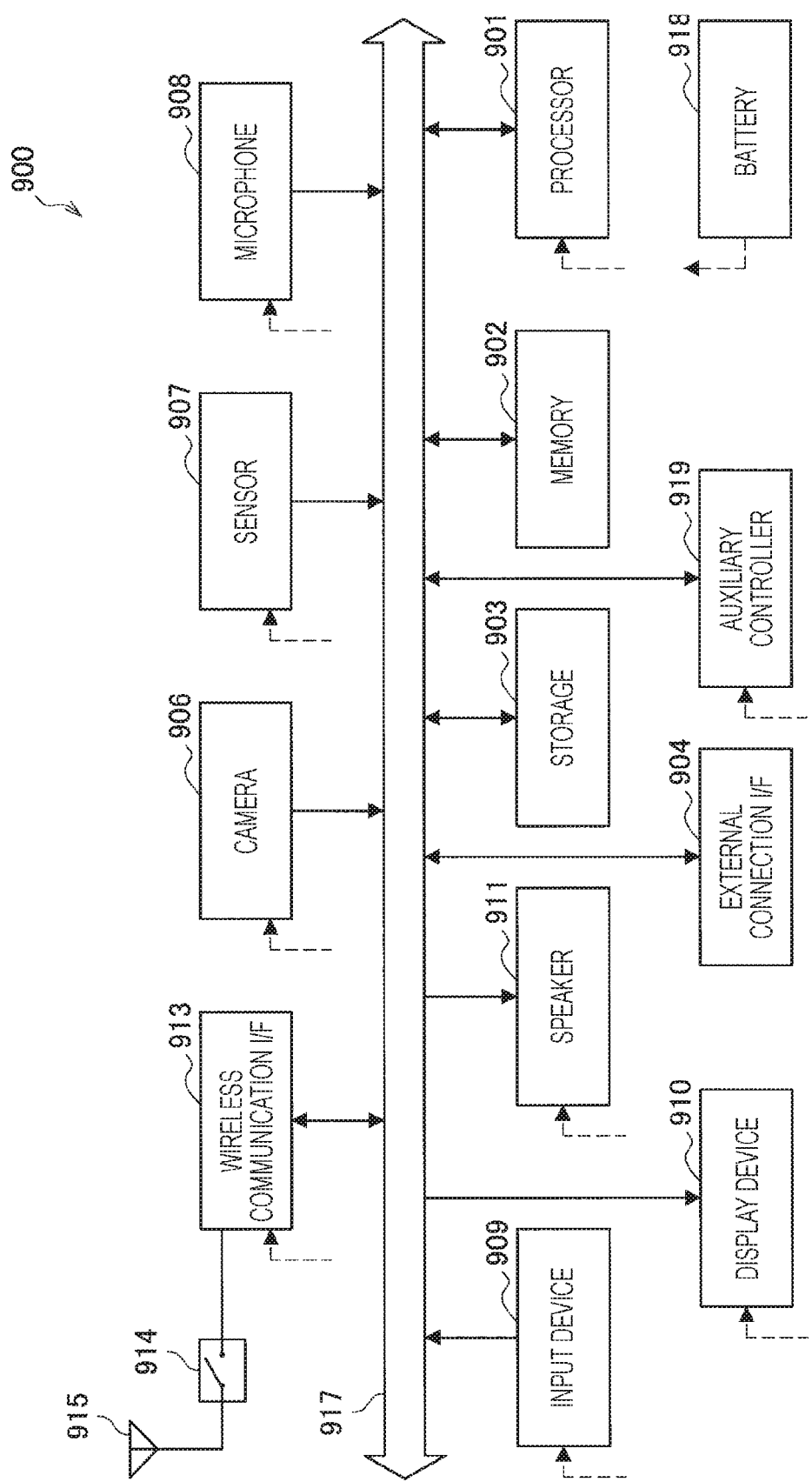
FIG. 34 is a block diagram illustrating an example of a schematic configuration of a smartphone which is an application example of a station in an embodiment of the present disclosure.

FIG. 34 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a System on Chip (SoC), and controls functions of an application layer and other layers of the smartphone 900. The memory 902 includes a random access memory (RAM) and a read only memory (ROM), and stores programs and data to be executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 includes an imaging element such as a charge coupled device (CCD) or a complementary metal oxide semiconductor (CMOS), for example, and generates a captured image. The sensor 907 may include sensors such as a positioning sensor, a gyro sensor, a geomagnetic sensor and an acceleration sensor, for example. The microphone 908 converts sound input to the smartphone 900 into an audio signal. The input device 909 includes a touch sensor, a keypad, a keyboard, a button, a switch, or the like for detecting a touch on the screen of the display device 910, for example, and receives user's operation or information input. The display device 910 includes a screen such as a liquid crystal display (LCD) or an organic light emitting diode (OLED) display, and displays an output image of the smartphone 900. The speaker 911 converts an audio signal output from the smartphone 900 into sound.

The wireless communication interface 913 supports one or more wireless LAN standards such as IEEE 802.11a, 11b, 11g, 11n, 11ac, 11ad and 11ax, and executes wireless communication. In the infrastructure mode, the wireless communication interface 913 can communicate with other devices via a wireless LAN access point. Furthermore, the wireless communication interface 913 can directly communicate with other devices in an ad hoc mode or a direct communication mode such as Wi-Fi Direct (registered trademark). Note that while one of the two terminals operates as an access point in the Wi-Fi Direct unlike the ad hoc mode, communication is performed directly between the terminals. The wireless communication interface 913 can typically include a baseband processor, a radio frequency (RF) circuit, a power amplifier, or the like. The wireless communication interface 913 may be a one-chip module integrating a memory that stores a communication control program, a processor for executing the program, and a related circuit. In addition to the wireless LAN method, the wireless communication interface 913 may support other types of wireless communication schemes such as a short range wireless communication scheme, a close proximity wireless communication scheme, or a cellular communication scheme. The antenna switch 914 switches the connection destination of the antenna 915 among a plurality of circuits (for example, circuits for different wireless communication schemes) included in the wireless communication interface 913. The antenna 915 has a single antenna element or a plurality of antenna elements (for example, a plurality of antenna elements constituting a MIMO antenna), and is used for transmission and reception of wireless signals by the wireless communication interface 913.

Note that the smartphone 900 is not limited to the example illustrated in FIG. 34, and the smartphone 900 may include a plurality of antennas (for example, an antenna for a wireless LAN, an antenna for a close proximity wireless communication scheme, and the like). In that case, the antenna switch 914 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 913 and the auxiliary controller 919. The battery 918 supplies power to each of blocks of the smartphone 900 illustrated in FIG. 34 via a power supply line partially indicated by a broken line in the drawing. For example, the auxiliary controller 919 operates the minimum necessary functions of the smartphone 900 in a sleep mode.

Note that the smartphone 900 may operate as a wireless access point (software AP) by execution of an access point function at the application level by the processor 901. Furthermore, the wireless communication interface 913 may have a wireless access point function.

(8-2. Second Application Example)

Figure 35:
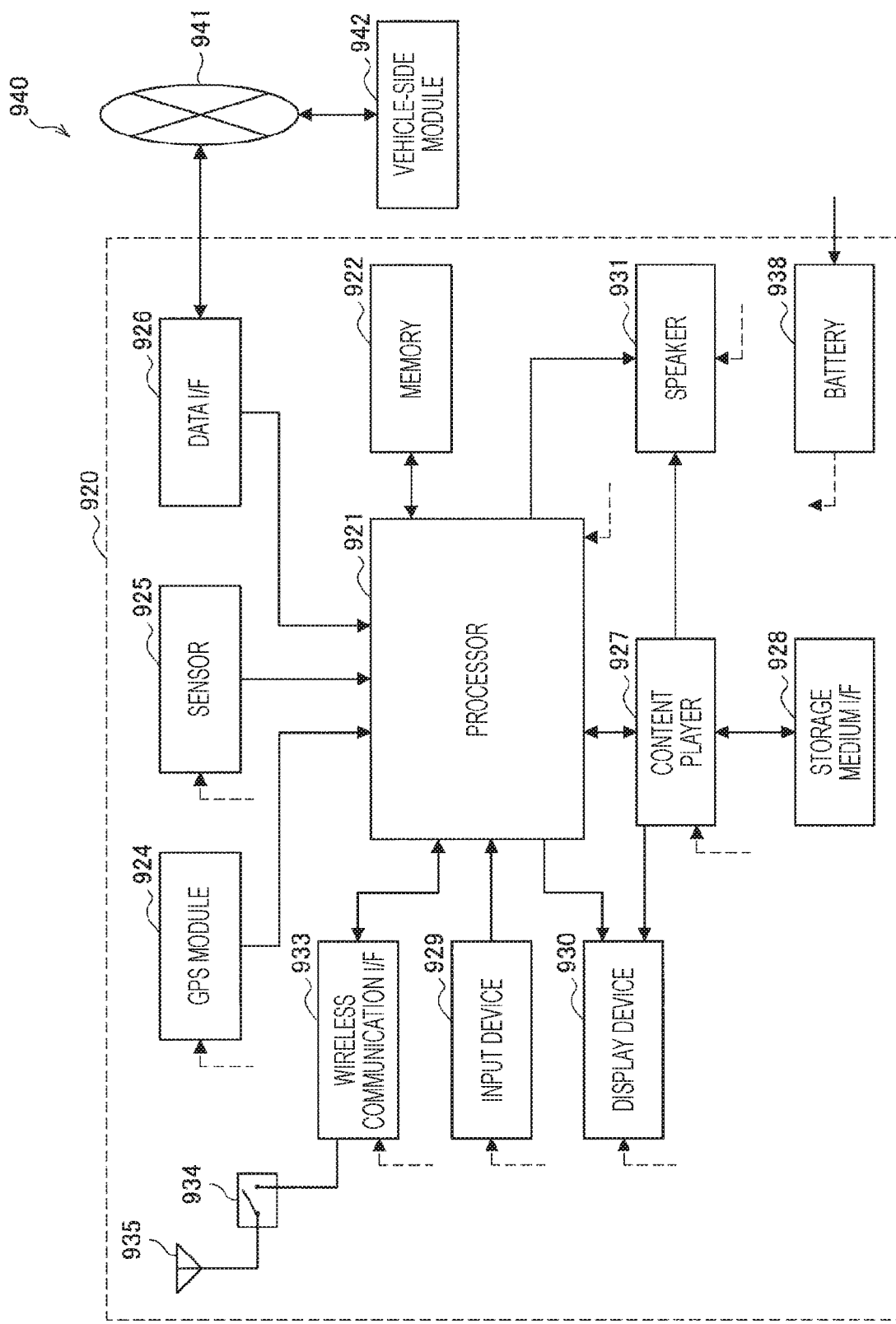
FIG. 35 is a block diagram illustrating an example of a schematic configuration of a car navigation device which is an application example of a station in an embodiment of the present disclosure

FIG. 35 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be a CPU or an SoC, for example, and controls a navigation function and other functions of the car navigation device 920. The memory 922 includes a RAM and a ROM, and stores programs and data to be executed by the processor 921.

The GPS module 924 uses a GPS signal received from the GPS satellite and measures the position (latitude, longitude, and altitude, for example) of the car navigation device 920. The sensor 925 may include sensors such as a gyro sensor, a geomagnetic sensor, and an atmospheric pressure sensor, for example. The data interface 926 is connected to an in-vehicle network 941 via a terminal (not illustrated), for example, and obtains data such as vehicle speed data generated on the vehicle side.

The content player 927 reproduces the content stored in the storage medium (for example, CD or DVD) inserted in the storage medium interface 928. The input device 929 includes a touch sensor, a button, a switch, or the like, for detecting a touch on the screen of the display device 930, for example, and receives user's operation or information input. The display device 930 includes a screen such as an LCD or an OLED display, and displays the navigation function or an image of content to be reproduced. The speaker 931 outputs the navigation function or the sound of the content to be reproduced.

The wireless communication interface 933 supports one or more wireless LAN standards such as IEEE802.11a, 11b, 11g, 11n, 11ac, 11ad and 11ax, and executes wireless communication. In the infrastructure mode, the wireless communication interface 933 can communicate with other devices via a wireless LAN access point. Furthermore, the wireless communication interface 933 can directly communicate with other devices in ad hoc mode or direct communication mode such as Wi-Fi Direct. The wireless communication interface 933 can typically include a baseband processor, an RF circuit, a power amplifier, or the like. The wireless communication interface 933 may be a one-chip module integrating a memory that stores a communication control program, a processor for executing the program, and a related circuit. In addition to the wireless LAN method, the wireless communication interface 933 may support other types of wireless communication schemes such as a short range wireless communication scheme, a close proximity wireless communication scheme, or a cellular communication scheme. The antenna switch 934 switches connection destination of the antenna 935 among a plurality of circuits included in the wireless communication interface 933. The antenna 935 includes a single or a plurality of antenna elements and is used for transmission and reception of wireless signals by the wireless communication interface 933.

Note that the present invention is not limited to the example of FIG. 35, and the car navigation device 920 may include a plurality of antennas. In that case, the antenna switch 934 may be omitted from the configuration of the car navigation device 920.

The battery 938 supplies power to each of blocks of the car navigation device 920 illustrated in FIG. 35 via a power supply line partially indicated by a broken line in the figure. Furthermore, the battery 938 stores power supplied from the vehicle side.

Furthermore, the wireless communication interface 933 may operate as the above-described AP 100 and may provide a wireless connection to a terminal possessed by a user in the vehicle.

In addition, the technology according to the present disclosure may be implemented as an in-vehicle system (or vehicle) 940 including one or more blocks of the car navigation device 920, the in-vehicle network 941, and a vehicle-side module 942. The vehicle-side module 942 generates vehicle-side data such as vehicle speed, engine speed or failure information, and outputs the generated data to the in-vehicle network 941.

(8-3. Third Application Example)

Figure 36:
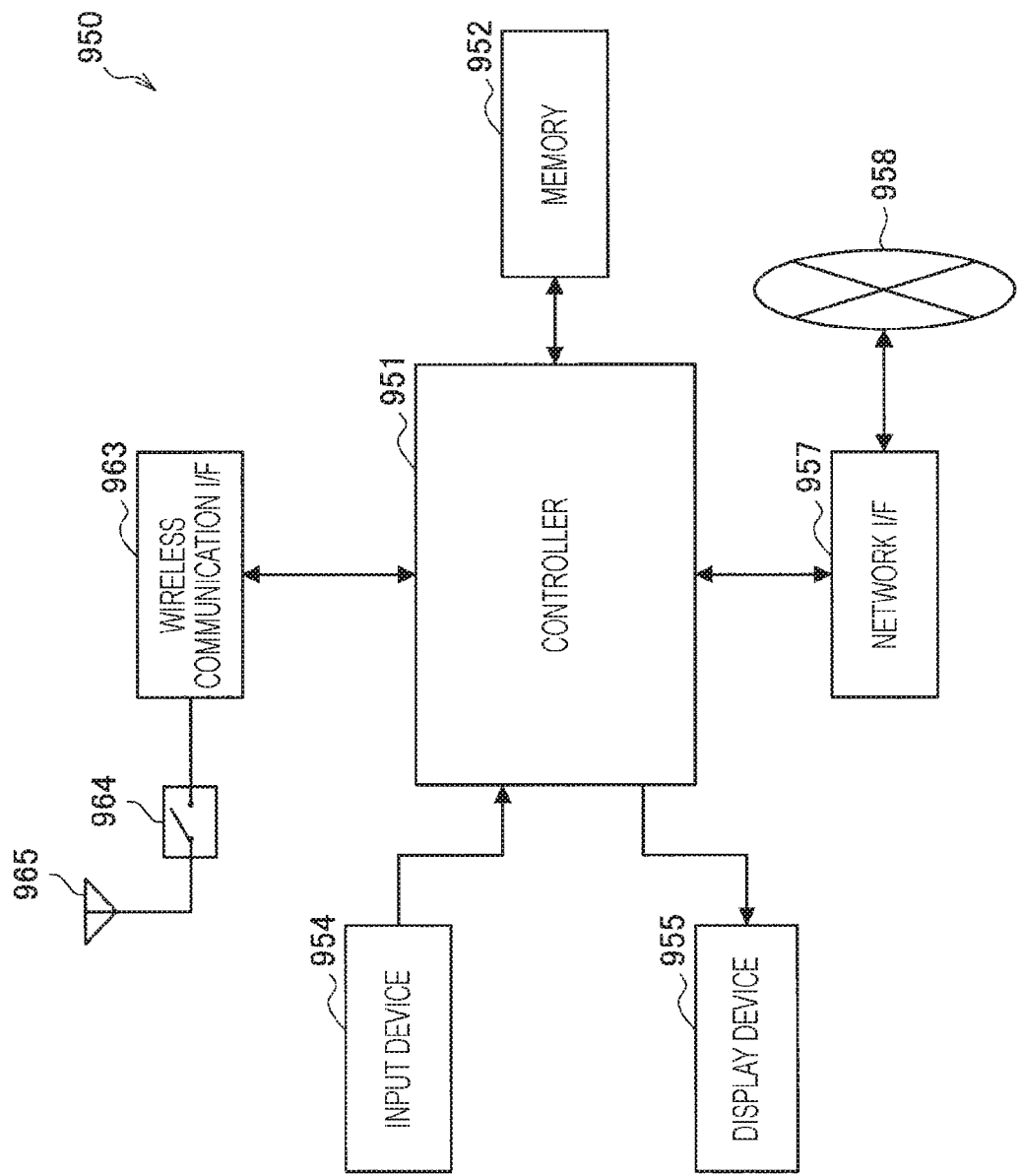
FIG. 36 is a block diagram illustrating an example of a schematic configuration of an access point in the embodiment of the present disclosure.

FIG. 36 is a block diagram illustrating an example of a schematic configuration of a wireless access point 950 to which the technology according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), for example, and controls operation of various functions (for example, access restriction, routing, encryption, firewall, log management, etc.) in the Internet Protocol (IP) layer or higher layers at the wireless access point 950. Memory 952 includes RAM and ROM, and stores programs executed by controller 951 and various control data (for example, terminal list, routing table, encryption key, security settings and logs, etc.).

The input device 954 includes buttons or switches, for example, and receives user's operation. The display device 955 includes an LED lamp or the like, and displays an operation status of the wireless access point 950.

The network interface 957 is a wired communication interface enabling connection of the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards such as IEEE802.11a, 11b, 11g, 11n, 11ac, 11ad and 11ax, and provides, as an access point, wireless connection to a terminal in the vicinity. The wireless communication interface 963 can typically include a baseband processor, an RF circuit and a power amplifier, or the like. The wireless communication interface 963 may be a one-chip module integrating a memory that stores a communication control program, a processor for executing the program, and a related circuit. The antenna switch 964 switches connection destination of the antenna 965 among a plurality of circuits included in the wireless communication interface 963. The antenna 965 includes a single or a plurality of antenna elements and is used for transmission and reception of wireless signals by the wireless communication interface 963.

9. Supplementary Matter

Hereinabove, the preferred embodiments of the present disclosure have been described above with reference to the accompanying drawings, while the technical scope of the present disclosure is not limited to the above examples. A person skilled in the art in the technical field of the present disclosure may find it understandable to reach various alterations and modifications within the technical scope of the appended claims, and it should be understood that they will naturally come within the technical scope of the present disclosure.

For example, the transition information may be arranged in any of the regions "PHY Header" or "MAC Header" of the frame in order to enable the transition information to be referred to by all the STAs 200. Furthermore, the transition information may be arranged in a "Data" region other than the "PHY Header" or "MAC Header" of the frame in order to enable the transition information to be individually referred to by the STAs 200.

Note that it is allowable to provide a computer program for causing the data processing unit 102, the control unit 104, and the communication unit 108 of the access point 100 to operate as described above. Furthermore, it is allowable to provide a computer program for causing the data processing unit 202, the control unit 204, and the communication unit 208 of the station 200 to operate as described above. Furthermore, a storage medium in which these programs are stored may be provided. Furthermore, the functions of the data processing unit 102 and the control unit 104 of the access point 100 may be implemented by a processor. At this time, the above-described program may be installed to enable the functions of the data processing unit 102 and the control unit 104 of the access point 100 to be implemented by the processor. Similarly, the functions of the data processing unit 202 and the control unit 204 of the station 200 may be implemented by a processor. At this time, the above-described program may be installed to enable the functions of the data processing unit 202 and the control unit 204 of the station 200 to be implemented by the processor.

10. Conclusion

As described above, in the wireless system of the present disclosure, transition information regarding the transition from the centralized communication mode to another mode is arranged in the trigger frame, M-BA frame or MC frame. Next, after receiving the transition information, the station 200 transitions to another mode in accordance with the received transition information. Furthermore, the access point 100 generates a plurality of different types of transition information. This configuration enables the wireless communication system of the present embodiment to allow the station 200 to flexibly transition from the centralized communication mode to another mode. Therefore, for example, it is possible to reduce the waiting time until the end of the duration of the centralized communication mode.

Note that the following configuration should also be within the technical scope of the present disclosure.

(1)

A communication apparatus including:

a transition information generation unit that generates a plurality of pieces of different transition information related to transition from a first mode in which centralized communication is performed by an access point to a second mode in which no centralized communication by an access point is performed; and a frame generation unit that generates a frame containing the transition information.

(2)

The communication apparatus according to (1), in which the transition information generation unit generates the transition information regarding a duration of the first mode.

(3)

The communication apparatus according to (2), in which the transition information generation unit generates the transition information regarding the duration of the first mode having different durations to be set.

(4)

The communication apparatus according to (2), in which the transition information generation unit generates the transition information indicating immediate shift from the first mode to the second mode.

(5)

The communication apparatus according to any one of (1) to (4), in which the transition information is information applied to all of a plurality of reception terminals configured to receive the frame.

(6)

The communication apparatus according to any one of (1) to (4), in which the transition information is information individually applied to each of a plurality of reception terminals configured to receive the frame.

(7)

The communication apparatus according to any one of (1) to (6), in which the frame generation unit arranges the transition information in a frame that instructs the reception terminal that communication is to be performed in the first mode.

(8)

The communication apparatus according to any one of (1) to (6), in which the frame generation unit arranges the transition information in a frame indicating an acknowledgment of reception of the data to a transmission terminal that has transmitted data in the first mode.

(9)

The communication apparatus according to any one of (1) to (6), in which the frame generation unit arranges the transition information in a frame that provides notification of transition from the first mode to the second mode.

(10)

The communication apparatus according to (7), in which the transition information is information indicating that a further frame instructing the reception terminal that communication is to be performed in the first mode is not going to be transmitted within the duration set by information regarding the duration of the first mode contained in a frame instructing the reception terminal that communication is to be performed in the first mode.

(11)

The communication apparatus according to (7), in which the transition information is information regarding a remaining number of times of transmission of the frame instructing the reception terminal that communication is to be performed in the first mode.

(12)

The communication apparatus according to any one of (1) to (11), in which the second mode is a power saving mode, a mode of performing autonomous decentralized communication, or a mode of scanning radio waves from another access point.

(13)

The communication apparatus according to any one of (1) to (12), in which the transition information generation unit generates the transition information on the basis of a buffer state reported from a communication terminal under the access point or on the basis of the number of the communication terminals under the access point.

(14)

A communication method including causing a processor to:

generate a plurality of pieces of different transition information related to transition from a first mode in which centralized communication is performed by an access point to a second mode in which no centralized communication by an access point is performed; and generate a frame containing the transition information.

(15)

A communication apparatus including:

a reception unit that receives, from an access point, a plurality of pieces of different transition information related to transition from a first mode in which centralized communication is performed by the access point to a second mode in which no centralized communication by the access point is performed; and a mode determination unit that determines transition from the first mode to the second mode on the basis of the received transition information.

(16)

The communication apparatus according to (15), in which the transition information is information regarding a duration of the first mode, and the mode determination unit does not update the duration of the first mode in a case where the communication in the first mode is not performed, on the basis of the received information regarding the duration of the first mode.

(17)

The communication apparatus according to (16), further including a transmission unit that transmits information indicating that the first mode has transitioned to the second mode to the access point in a case where updating of the duration of the first mode has not been performed.

(18)

A communication method including:

receiving, from an access point, a plurality of pieces of different transition information related to transition from a first mode in which centralized communication is performed by the access point to a second mode in which no centralized communication by the access point is performed; and causing a processor to determine transition from the first mode to the second mode on the basis of the received transition information.

REFERENCE SIGNS LIST

100 Access point
200 Station

The invention claimed is:

1. An access point, comprising:
    circuitry configured to:
        generate a first plurality of pieces of different transition information related to transition from a first mode to a second mode, wherein
        centralized communication implementing multi-user communication in uplink using one of multi-user multiple-input multiple-output (MU-MIMO) or orthogonal frequency division multiple access (OFDMA) is performed by the access point in the first mode,
        the centralized communication is triggered by a trigger frame for a duration of the first mode, wherein
            the trigger frame includes information regarding resources used for data transmission by a plurality of reception terminals, and
            the trigger frame is transmitted to the plurality of reception terminals,
        autonomous decentralized communication using carrier sense multiple access with collision avoidance (CSMA/CA) by the access point and the plurality of reception terminals is performed in the second mode, and
        the first plurality of pieces of different transition information comprises an instruction to immediately shift from the first mode to the second mode;
        generate a first mode change frame that includes the first plurality of pieces of different transition information; and
        individually transmit the generated first mode change frame to a first reception terminal of the plurality of reception terminals.

2. The access point according to claim 1, wherein the circuitry is further configured to generate a second plurality of pieces of different transition information regarding the duration of the first mode.

3. The access point according to claim 1, wherein
    the circuitry is further configured to generate a second plurality of pieces of different transition information regarding the duration of the first mode, and
    the first mode includes a plurality of different durations to be set.

4. The access point according to claim 1, wherein the circuitry is further configured to generate the first plurality of pieces of different transition information based on one of a buffer state reported from a communication terminal under the circuitry or a number of communication terminals under the circuitry.

5. The access point according to claim 2, wherein the circuitry is further configured to:
generate a second mode change frame that includes the second plurality of pieces of different transition information; and
individually transmit the generated second mode change frame to a second reception terminal of the plurality of reception terminals.

6. A communication method executed in an access point, the communication method comprising:
generating a plurality of pieces of different transition information related to transition from a first mode to a second mode, wherein
centralized communication implementing multi-user communication in uplink using one of multi-user multiple-input multiple-output (MU-MIMO) or orthogonal frequency division multiple access (OFDMA) is performed by the access point in the first mode,
the centralized communication is triggered by a trigger frame for a duration of the first mode, wherein
the trigger frame includes information regarding resources used for data transmission by a plurality of reception terminals, and
the trigger frame is transmitted to the plurality of reception terminals,
autonomous decentralized communication using carrier sense multiple access with collision avoidance (CSMA/CA) by the access point and the plurality of reception terminals is performed in the second mode, and
the plurality of pieces of different transition information comprises an instruction to immediately shift from the first mode to the second mode;
generating a mode change frame that includes the plurality of pieces of different transition information; and
individually transmitting the generated mode change frame to a reception terminal of the plurality of reception terminals.

7. A communication apparatus, comprising:
circuitry configured to:
receive a mode change frame, individually transmitted from an access point to the communication apparatus, containing a first plurality of pieces of different transition information related to transition from a first mode to a second mode, wherein
centralized communication implementing multi-user communication in uplink using one of multi-user multiple-input multiple-output (MU-MIMO) or orthogonal frequency division multiple access (OFDMA) is performed by the access point in the first mode,
the centralized communication is triggered by a trigger frame for a duration of the first mode, wherein
the trigger frame includes information regarding resources used for data transmission by a plurality of reception terminals including the communication apparatus, and
the trigger frame is transmitted to the plurality of reception terminals including the communication apparatus,
autonomous decentralized communication using carrier sense multiple access with collision avoidance (CSMA/CA) by the access point and the plurality of reception terminals including the communication apparatus is performed in the second mode, and
the first plurality of pieces of different transition information comprises an instruction to immediately shift from the first mode to the second mode; and
determine transition from the first mode to the second mode based on the received first plurality of pieces of different transition information contained in the mode change frame.

8. The communication apparatus according to claim 7, wherein the circuitry is further configured to:
receive a second plurality of pieces of different transition information regarding the duration of the first mode, and
end updation of the duration of the first mode based on discontinuation of the centralized communication in the first mode and the received second plurality of pieces of different transition information.

9. The communication apparatus according to claim 8, wherein
the circuitry is further configured to transmit specific information to the access point, and
the specific information indicates the transition of the first mode to the second mode based on the ended updation of the duration of the first mode.

10. A communication method, executed in a reception terminal, the communication method comprising:
receiving a mode change frame, individually transmitted from an access point to the reception terminal, comprising a plurality of pieces of different transition information related to transition from a first mode to a second mode, wherein
centralized communication implementing multi-user communication in uplink using one of multi-user multiple-input multiple-output (MU-MIMO) or orthogonal frequency division multiple access (OFDMA) is performed by the access point in the first mode,
the centralized communication is triggered by a trigger frame for a duration of the first mode, wherein
the trigger frame includes information regarding resources used for data transmission by a plurality of reception terminals including the reception terminal, and
the trigger frame is transmitted to the plurality of reception terminals including the reception terminal,
autonomous decentralized communication using carrier sense multiple access with collision avoidance (CSMA/CA) by the access point and the plurality of reception terminals including the reception terminal is performed in the second mode, and
the plurality of pieces of different transition information comprises an instruction to immediately shift from the first mode to the second mode; and
causing a processor of the reception terminal to determine transition from the first mode to the second mode based on the received plurality of pieces of different transition information contained in the mode change frame.

* * * * *